United States Patent
Zhang et al.

(10) Patent No.: US 9,107,186 B2
(45) Date of Patent: Aug. 11, 2015

(54) CARRIER AGGREGATION FOR EVOLVED MULTIMEDIA BROADCAST MULTICAST SERVICE ENHANCEMENT

(75) Inventors: Xiaoxia Zhang, San Diego, CA (US); Yongbin Wei, San Diego, CA (US); Durga Prasad Malladi, San Diego, CA (US); Jun Wang, San Diego, CA (US); Zhengwei Liu, San Diego, CA (US); Gang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 13/402,845

(22) Filed: Feb. 22, 2012

(65) Prior Publication Data

US 2012/0213130 A1 Aug. 23, 2012

Related U.S. Application Data

(60) Provisional application No. 61/445,990, filed on Feb. 23, 2011, provisional application No. 61/453,468, filed on Mar. 16, 2011.

(51) Int. Cl.
*H04W 72/00* (2009.01)
*H04L 5/00* (2006.01)
(Continued)

(52) U.S. Cl.
CPC ............. *H04W 72/005* (2013.01); *H04L 5/001* (2013.01); *H04L 5/0037* (2013.01);
(Continued)

(58) Field of Classification Search
USPC ......... 370/252–255, 312, 328–329, 400–401, 370/46; 455/3.01, 3.06, 414.1, 456.3, 63.1
See application file for complete search history.

(56) References Cited

U.S. PATENT DOCUMENTS 8,077,801 B2 12/2011 Malladi
2008/0232396 A1 9/2008 Buckley et al.
(Continued)

FOREIGN PATENT DOCUMENTS

CN 101534473 A 9/2009
EP 1734684 A1 12/2006
(Continued)

OTHER PUBLICATIONS

Alcatel-Lucent., "Signaling o f MBSFN Subframe Allocations", 3GPP Draft,R1-080210_Signalling of MBSFN_Subframe_Allocations,3rd Generation Partnership Project (3GPP), Mobile Competence Centre, 650, Routes Des Lucioles, F-06921,Sophia-Antipolis Cedex, France, vol. RAN WG2, no. Sorrento, Italy, Feb. 2, 2008,XP050138492, [ retrieved on Feb. 2, 2008]p. 1, paragraph 1-paragraph 3.

(Continued)

*Primary Examiner* — Benjamin H Elliott, IV
(74) *Attorney, Agent, or Firm* — Novak Druce Connolly Bove + Quigg LLP

(57) ABSTRACT

Carrier aggregation to enhance Evolved Multimedia Broadcast Multicast Service (eMBMS) includes transmitting unicast signaling for a unicast service on an anchor carrier to mobile entities, transmitting eMBMS signaling on a second carrier different from the anchor carrier to the mobile entities for use with the unicast signaling, and various techniques for practical application of carrier aggregation for eMBMS enhancement. In addition, allocating subframes used for MBMS on a Single Frequency Network (MBSFN) includes allocating at least a portion of one or more subframes otherwise reserved for unicast subframes on a mixed carrier to provide an increased allocation of subframes carrying MBSFN information, transmitting MBSFN signals on the increased allocation of subframes, and more detailed aspects.

62 Claims, 33 Drawing Sheets

(51) Int. Cl.
  *H04L 5/14* (2006.01)
  *H04W 48/12* (2009.01)
  *H04W 72/04* (2009.01)

(52) U.S. Cl.
  CPC .......... *H04L 5/0048* (2013.01); *H04L 5/0053* (2013.01); *H04L 5/0098* (2013.01); *H04L 5/143* (2013.01); *H04W 48/12* (2013.01); *H04W 72/042* (2013.01)

(56) References Cited

U.S. PATENT DOCUMENTS

| | | |
|---|---|---|
| 2009/0252077 A1 | 10/2009 | Khandekar et al. |
| 2009/0257371 A1 | 10/2009 | Nishio |
| 2010/0034163 A1* | 2/2010 | Damnjanovic et al. ....... 370/329 |
| 2010/0080159 A1 | 4/2010 | Hu et al. |
| 2010/0105366 A1 | 4/2010 | Zhao et al. |
| 2010/0157872 A1 | 6/2010 | Hyun et al. |
| 2010/0157919 A1* | 6/2010 | Koskinen ................. 370/329 |
| 2010/0329171 A1 | 12/2010 | Kuo et al. |
| 2011/0013554 A1* | 1/2011 | Koskinen ................. 370/315 |
| 2011/0026522 A1 | 2/2011 | Hsu |
| 2011/0076962 A1 | 3/2011 | Chen et al. |
| 2011/0103286 A1 | 5/2011 | Montojo et al. |
| 2011/0103288 A1* | 5/2011 | Lee et al. ................. 370/312 |
| 2011/0103366 A1 | 5/2011 | Morimoto et al. |
| 2011/0243056 A1 | 10/2011 | Jen |
| 2011/0268008 A1 | 11/2011 | Kim et al. |
| 2011/0280223 A1* | 11/2011 | Maeda et al. .............. 370/335 |
| 2011/0305183 A1* | 12/2011 | Hsu et al. ................. 370/312 |
| 2012/0213130 A1* | 8/2012 | Zhang et al. .............. 370/280 |
| 2012/0213143 A1 | 8/2012 | Zhang et al. |
| 2013/0188531 A1 | 7/2013 | Zhang |

FOREIGN PATENT DOCUMENTS

| | | |
|---|---|---|
| EP | 2328314 A1 | 6/2011 |
| EP | 2426957 A1 | 3/2012 |
| JP | 2010516066 A | 5/2010 |
| JP | 2010518731 A | 5/2010 |
| KR | 20090101310 A | 9/2009 |
| WO | 2008084634 A1 | 7/2008 |
| WO | 2008100116 A1 | 8/2008 |
| WO | 2008118064 A2 | 10/2008 |
| WO | 2009118640 A1 | 10/2009 |
| WO | 2010020134 A1 | 2/2010 |
| WO | 2010032850 A1 | 3/2010 |
| WO | 2010098581 A2 | 9/2010 |
| WO | 2010124415 A1 | 11/2010 |

OTHER PUBLICATIONS

HTC.,"MBMS in Carrier Aggregation", 3GPP Draft; R2-102357 LTE-A MBMS in CA DISC, 3rd Generation Partnership Project (3GPP), Mobile Competence Centre; 650, Route Des Lucioles; F-06921 Sophia-Antipolis Cedex; France, vol. RAN WG2, no. Beijing, china; Apr. 12, 2010, Apr. 6, 2010, XP050422649 [retrieved on Apr. 6, 2010].

International Search Report and Written Opinion—PCT/US2012/026379, International Search Authority—European Patent Office, Nov. 7, 2012.

LTE: Evolved Universal Terrestrial Radio Access (E-UTRA), Radio Resource Control (RRC), Protocol specification (3GPP TS 36.331 version 10.0.0 Release 10), Technical Specification, European Telecommunications Standards Institute (ETSI) , 650, Route Des Lucioles; F-06921 Sophia-Antipolis, France, vol. 3GPP RAN 2, No. V10.0.0, Jan. 1, 2011, XP014062152.

MEDIATEK.,"Acquisition of MBMS parameters", 3GPP Draft, R2-104435, 3rd Generation Partnership Project (3GPP), Mobile Competence Centre, 650, Route Des Lucioles, F-06921 Sophia-Anti Polis Cedex, France, vol. RAN WG2, no. Madrid, Spain, Aug. 23, 2010, Aug. 17, 2010, XP050451857, [retrieved on Aug. 17, 2010].

Partial International Search Report and Written Opinion—PCT/US2012/026379—ISAEPO—May 3, 2012.

3rd Generation Partnership Project; Technical Specification Group Radio Access Network; Evolved Universal Terrestrial Radio Access (E-UTRA); Radio Resource Control (RRC); Protocol specification (3GPP TS 36.331 version 10.0.0 Release 10), Technical Specification, European Telecommunications Standards Institute (ETSI), 650, Route Des Lucioles; F-06921 Sophia-Antipolis, France, vol. 3GPP RAN2, No. V10.0.0, Dec. 2010.

European Search Report—EP14192540—Search Authority—Munich—Jan. 21, 2015.

IPWireless Inc., "New SI proposal: Feasibility Study of Dedicated Carrier Operation in LTE MBMS", 3GPP TSG-RAN#48 RP-100575, 6 Pages, Internet <URL: http://www.3gpp.org/ftp/tsg_ran/TSG_RAN/TSGR_48/Docs/RP-100575. zip>, May 27, 2010.

* cited by examiner

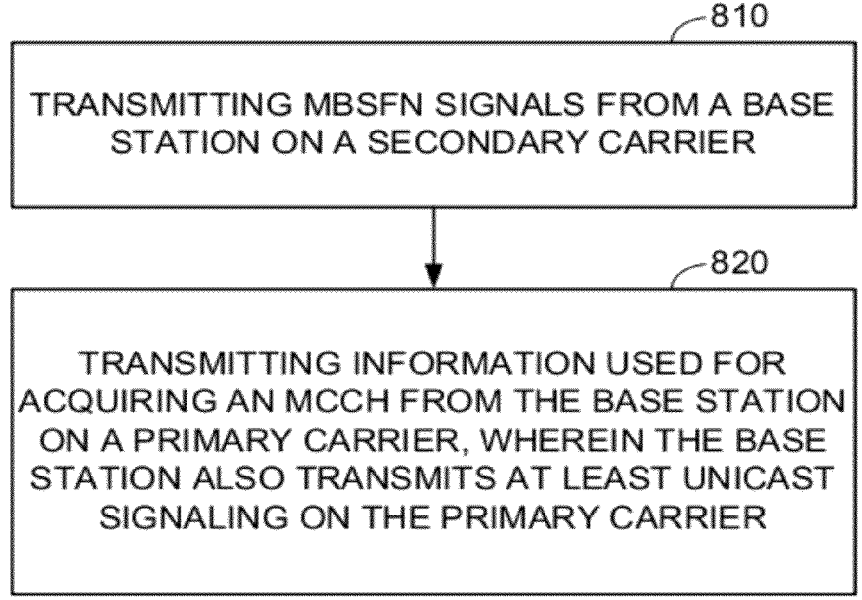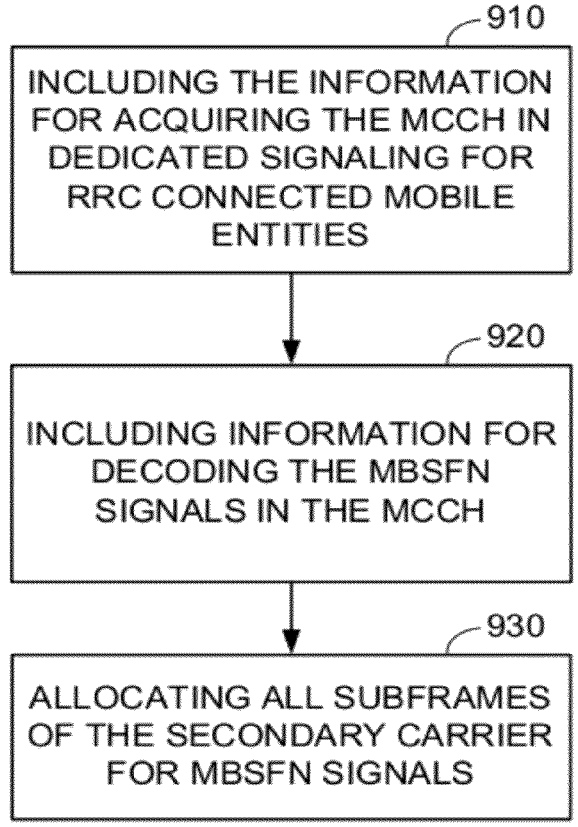

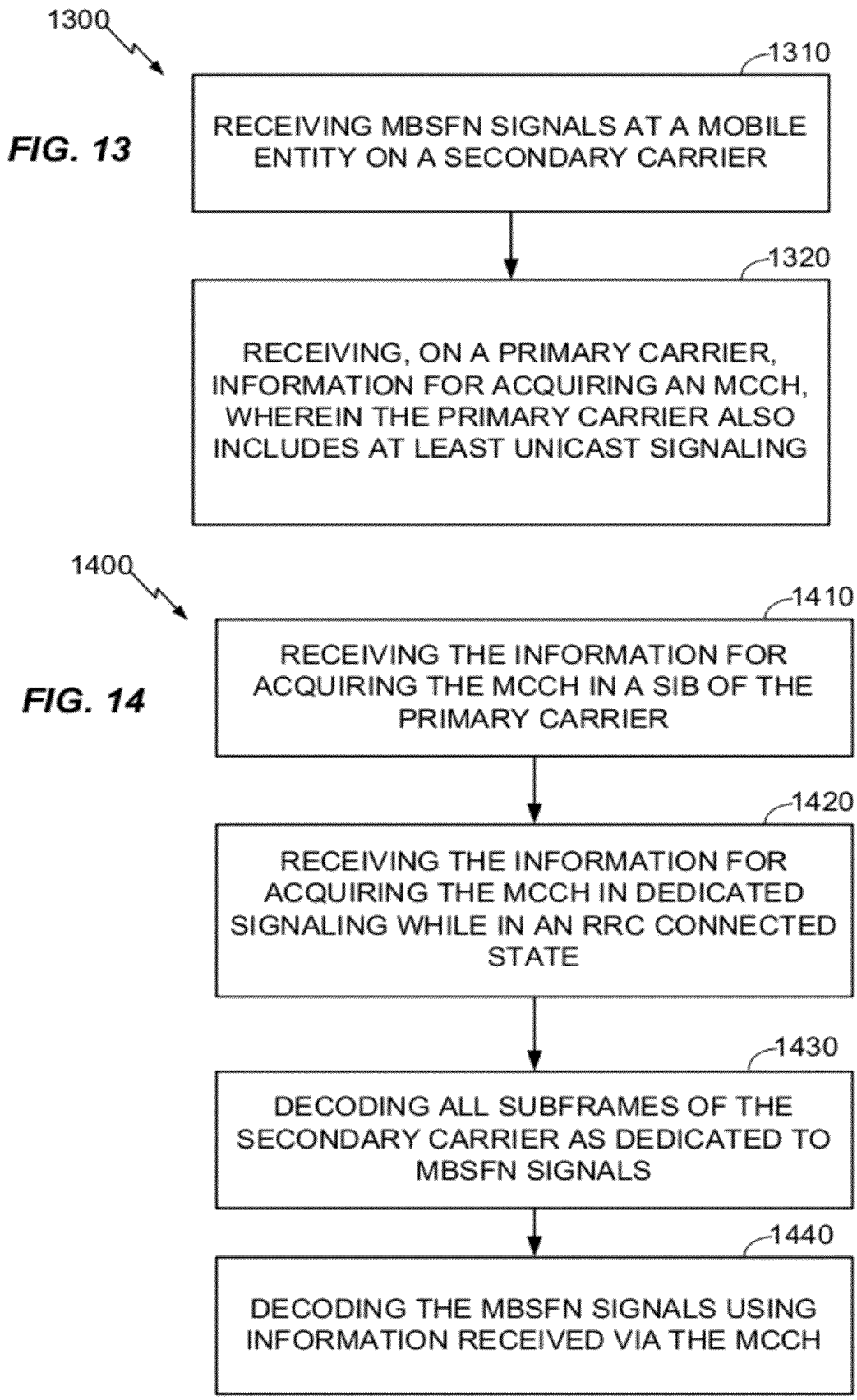

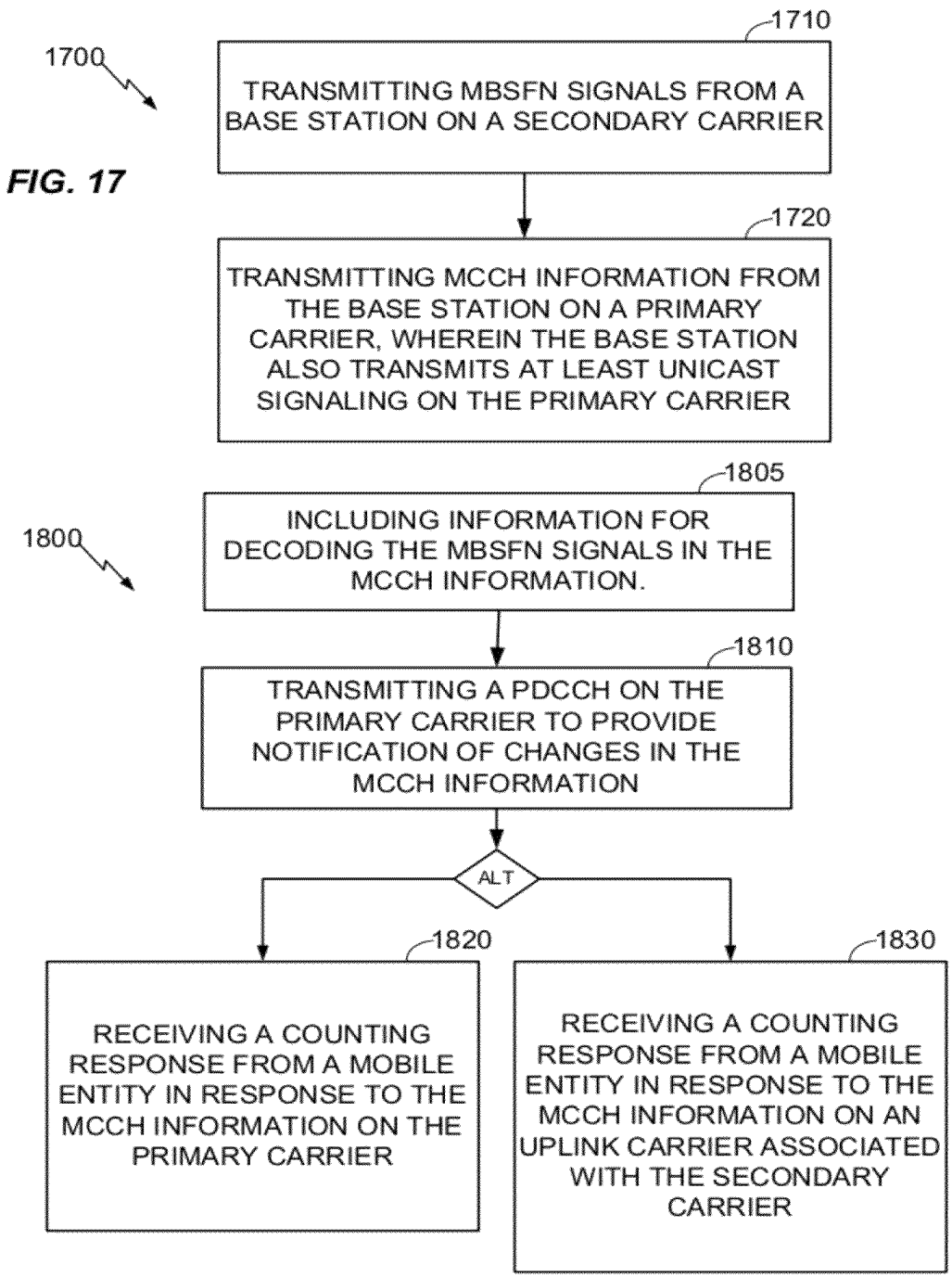

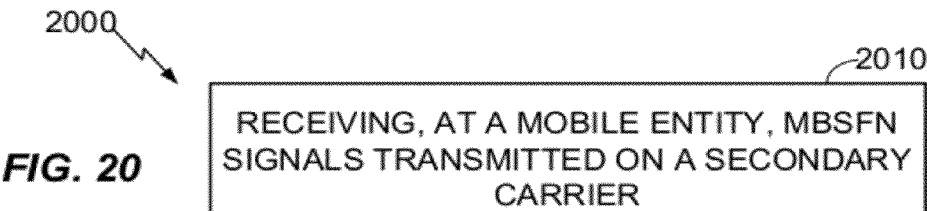

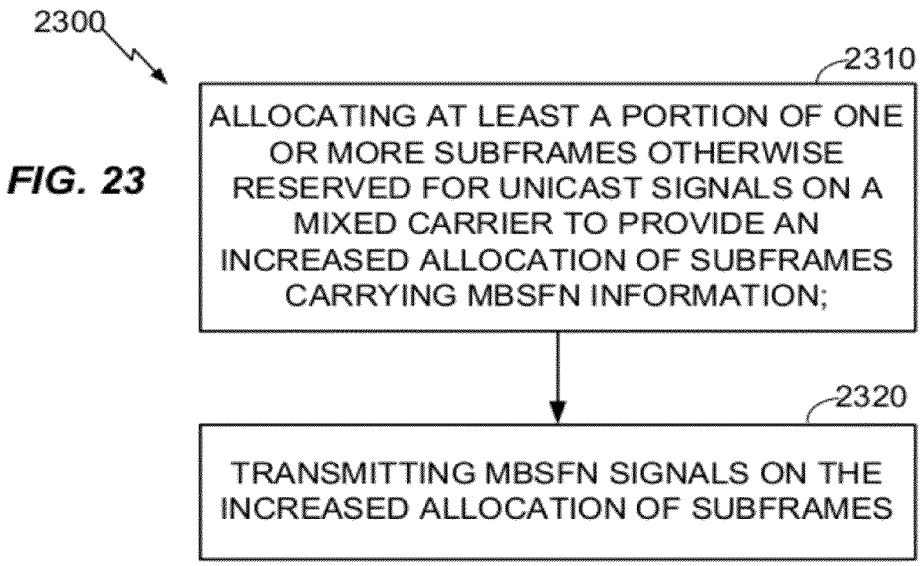
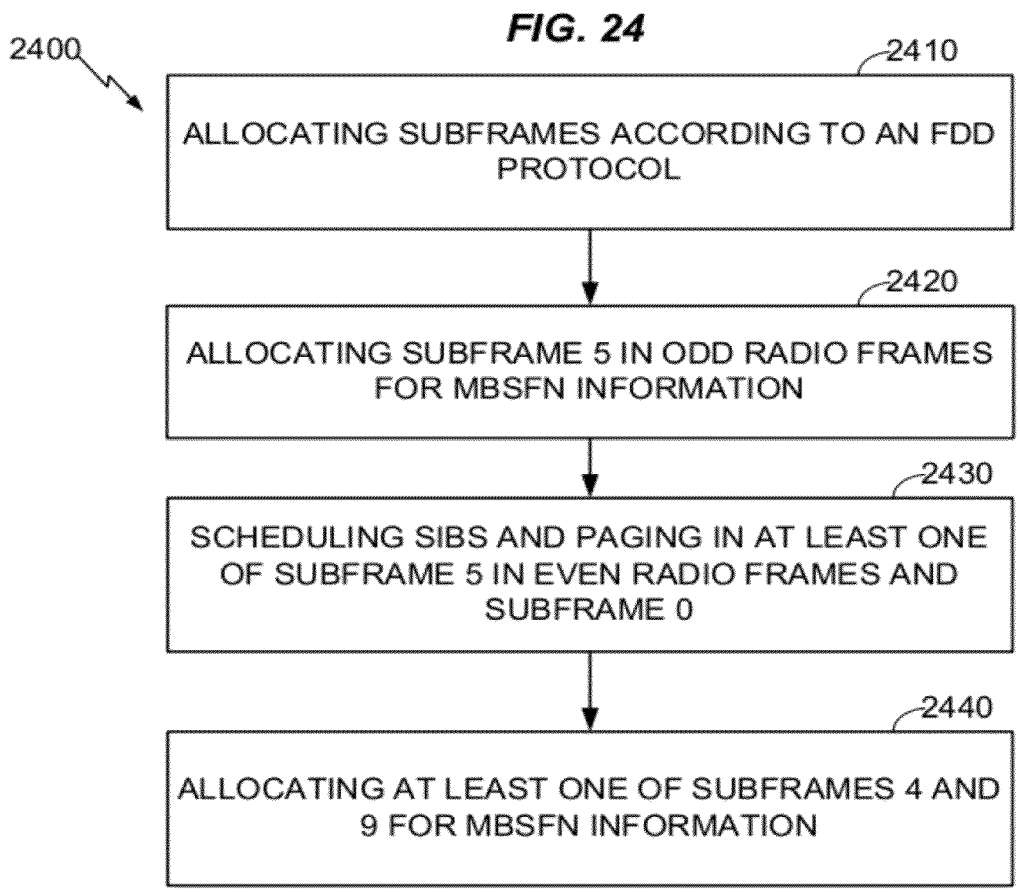

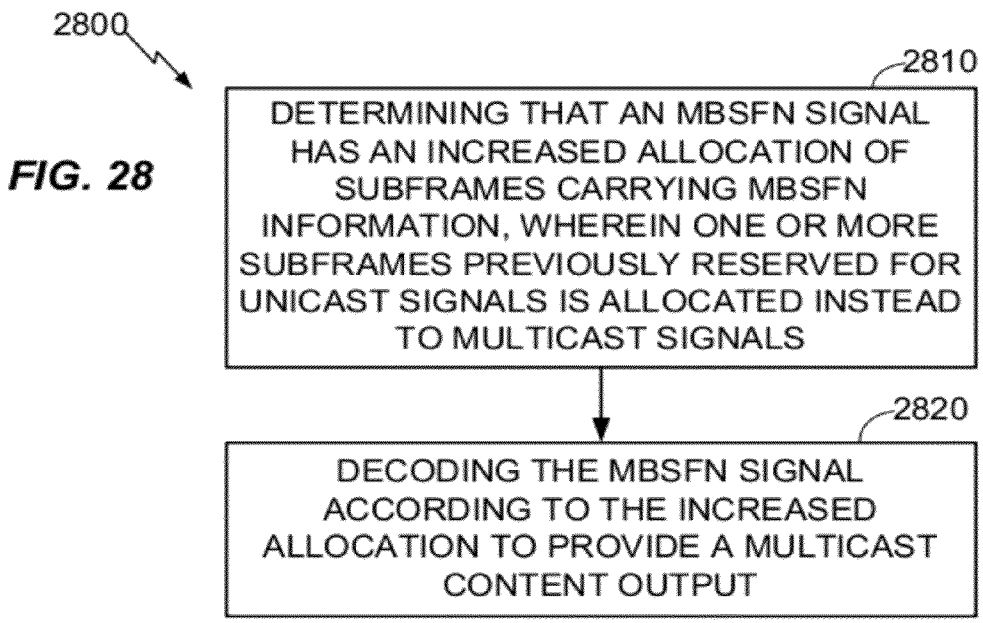
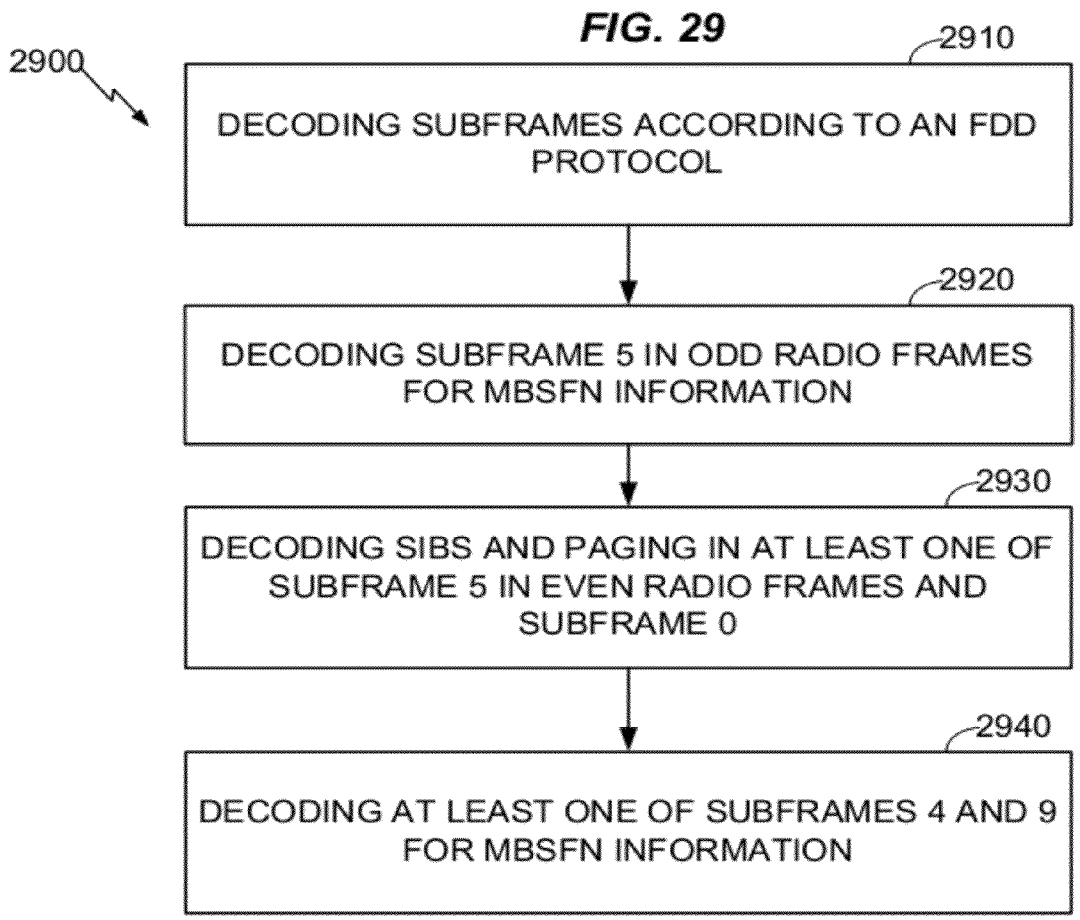

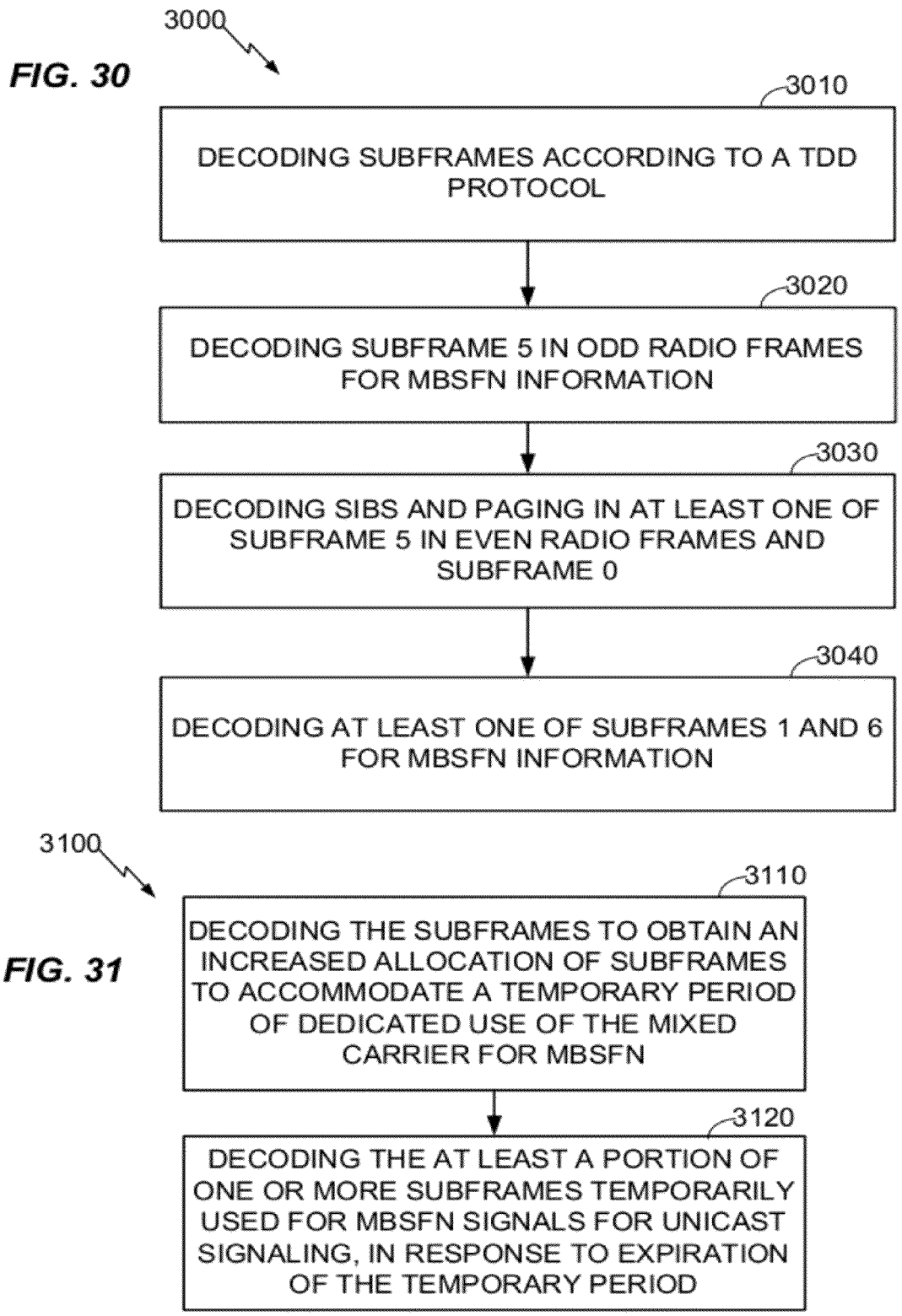

CARRIER AGGREGATION FOR EVOLVED MULTIMEDIA BROADCAST MULTICAST SERVICE ENHANCEMENT

CROSS-REFERENCE TO RELATED APPLICATION

This application claims priority pursuant to 35 U.S.C. §119 (e) to U.S. provisional application Ser. No. 61/445,990, filed Feb. 23, 2011, and to U.S. provisional application Ser. No. 61/453,468, filed Mar. 16, 2011, which applications are hereby incorporated by reference, in their entireties.

FIELD

Aspects of the present disclosure relate generally to wireless communication systems, and more particularly, to providing carrier aggregation techniques for Evolved Multimedia Broadcast/Multicast Service (eMBMS) enhancement.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As used herein, a "carrier" refers to a radio band centered on a defined frequency and used for wireless communications.

A wireless communication network may include a number of base stations that can support communication for a number of mobile entities, also called user equipment (UE). A UE may communicate with a base station via the downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to a subscriber UE. The specificity of unicast signaling enables person-to-person services such as, for example, voice calling, text messaging, or video calling.

In broadcast operation, several eNBs in a broadcast area are controlled to broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. As the demand and system capability for event-related multimedia and other broadcast services has increased, system operators have shown increasing interest in making use of broadcast operation in 3GPP networks. In the past, 3GPP LTE technology has been primarily used for unicast service, leaving opportunities for improvements and enhancements related to broadcast signaling.

SUMMARY

Methods, apparatus and systems for providing carrier aggregation techniques for eMBMS enhancement are described in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for transmitting evolved eMBMS using multiple carriers of a wireless communications system may include transmitting Multimedia Broadcast/Multicast Service (MBMS) on a Single Frequency Network (MBSFN) signals from a base station on a secondary carrier. The method may further include transmitting information used for acquiring a Multicast Control Channel (MCCH) from the base station on a primary carrier, wherein the base station also transmits at least unicast signaling on the primary carrier. The method may further include providing the information for acquiring the MCCH in dedicated signaling on the primary carrier for one or more backwardly-compatible carriers carrying eMBMS signals, while including the information for acquiring an MCCH in common signaling on the primary carrier for one or more non-backwardly compatible carriers carrying eMBMS signaling.

In a more detailed aspect, the method may include providing the information for acquiring the MCCH in a System Information Block (SIB) of the primary carrier. The SIB may be a System Information Block 13 (SIB13) of the primary carrier. System information including the MCCH acquisition information may be broadcast form the base station. In an alternative aspect, a less than entire portion of the information for acquiring the MCCH may be included in a SIB (e.g., SIB13) of the primary carrier.

In another aspect, the method may include transmitting MBSFN signaling on the second carrier using a time division duplex (TDD) protocol configured differently from a TDD protocol used for the primary carrier. The base station may configure MBSFN signaling on the primary carrier according to a first TDD protocol, and configure MBSFN signaling on the second carrier according to a second TDD protocol different from the first TDD protocol.

In a complementary aspect, a mobile entity of the wireless communications system may receive the MBSFN signals on the primary and secondary carriers, including information for acquiring the MCCH in dedicated signaling on the primary carrier, or in common signaling on the primary carrier. For example, in an aspect the mobile entity may receive information for acquiring the MCCH in a SIB, such as SIB13.

In another aspect, a method for allocating subframes used for MBSFN may be performed by a base station of a wireless communications system. The method may include allocating at least a portion of one or more subframes otherwise reserved for unicast subframes on a mixed carrier to provide an increased allocation of subframes carrying MBSFN information. The method may further include transmitting (e.g., broadcasting) MBSFN signals on the increased allocation of subframes from the base station.

The method for allocating subframes may further include allocating subframes according to a Frequency-Division Duplexing (FDD) protocol. For example, the method may include allocating subframe 5 in odd radio frames for MBSFN information. In another aspect, the method may include scheduling System Information Blocks (SIBs) and paging in at least one of subframe 5 in even radio frames and subframe 0. For further example, the method may include allocating at least one of subframes 4 and 9 for MBSFN information.

In an alternative aspect, the method for allocating subframes may further include allocating subframes according to a Time-Division Duplexing (TDD) protocol. For example, the method may include allocating at least one of subframes 1 and 6 for MBSFN information, or using specific allocation as described for the FDD protocol above.

Allocation of subframes between unicast and multicast services may be varied in response to demand or other factors. For example, the method for allocating subframes may further include allocating the subframes to provide an increased allocation of subframes to accommodate a temporary period of dedicated use of the carrier for MBSFN. In such cases, the method may further include reallocating the at least a portion of one or more subframes otherwise reserved for unicast signaling, in response to expiration of the temporary period.

In a complementary aspect, a mobile entity of a wireless communications system may perform a method for interpreting MBSFN and unicast signals in a carrier, for example a carrier with mixed MBSFM and unicast signaling allocated using a method as summarized above. The method may include determining that an MBSFN signal has an increased allocation of subframes carrying MBSFN information, wherein one or more subframes previously reserved for unicast signals is allocated instead to multicast signals decoding the MBSFN signal according to the increased allocation to provide a multicast content output. The method may include further complementary aspects to the allocation methods summarized above, for example, decoding subframe 5 in odd radio frames for MBSFN information, or SIBS and paging in at least one of subframe 5 in even radio frames and subframe 0, in an FDD or TDD protocol. For further example, the method may include decoding at least one of subframes 4 and 9 for MBSFN information in an FDD protocol, or decoding at least one of subframes 1 and 6 for MBSFN information in a TDD protocol. The mobile entity may vary its decoding based on changes in allocation between unicast and MBSFN signals in the carrier, as indicated by the base station.

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities or base stations of various types used for wireless communications. Similarly, an article of manufacture may be provided, including a non-transitory computer-readable medium holding encoded instructions, which when executed by a processor, cause a wireless communications apparatus to perform the methods and aspects of the methods as summarized above.

All of the operations of the foregoing methods may be performed by a network entity of the wireless communication system, using components as described in more detail elsewhere herein. Although any of these methods may be used to provide carrier aggregation for eMBMS enhancement, they may also be used to provide carrier aggregation using other protocols for multimedia broadcast multicast service in a cellular wireless communication system.

BRIEF DESCRIPTION OF THE DRAWINGS

FIGS. 8-11 illustrate embodiments of a methodology for transmitting eMBMS services using multiple carriers, performed at a network entity.

FIGS. 13-15 illustrate embodiments of a methodology for receiving eMBMS services using multiple carriers, performed at a mobile entity.

FIGS. 17-18 illustrate embodiments of an alternative methodology for transmitting eMBMS services using multiple carriers, performed at a network entity.

FIGS. 20-21 illustrate embodiments of an alternative methodology for receiving eMBMS services using multiple carriers, performed at a mobile entity.

FIGS. 23-26 illustrate embodiments of a methodology for allocating subframes used for eMBMS services with multiple carriers, performed at a network entity.

FIGS. 29-31 illustrate embodiments of a methodology for decoding subframes used for eMBMS services with multiple carriers, performed at a mobile entity.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
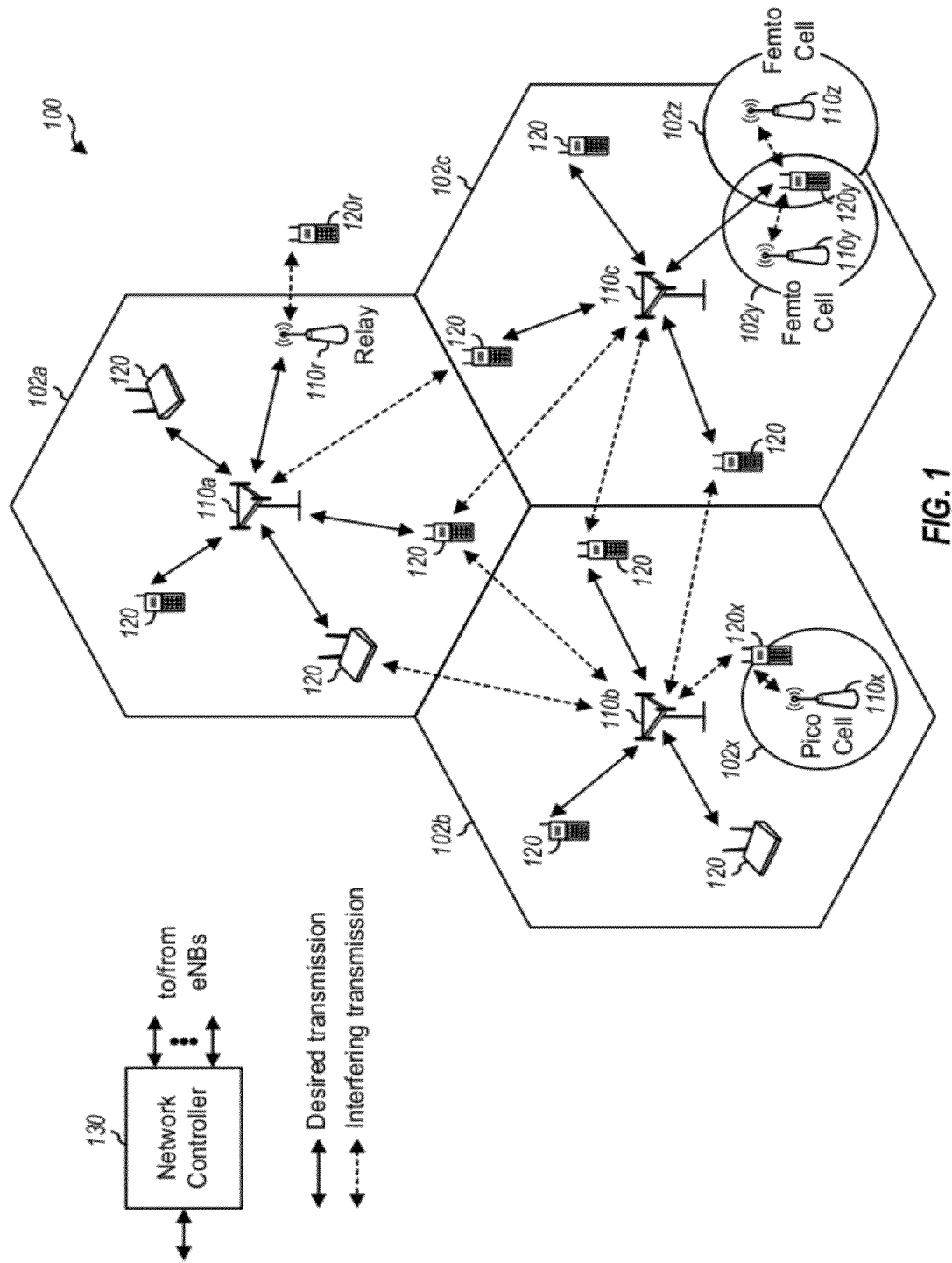
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
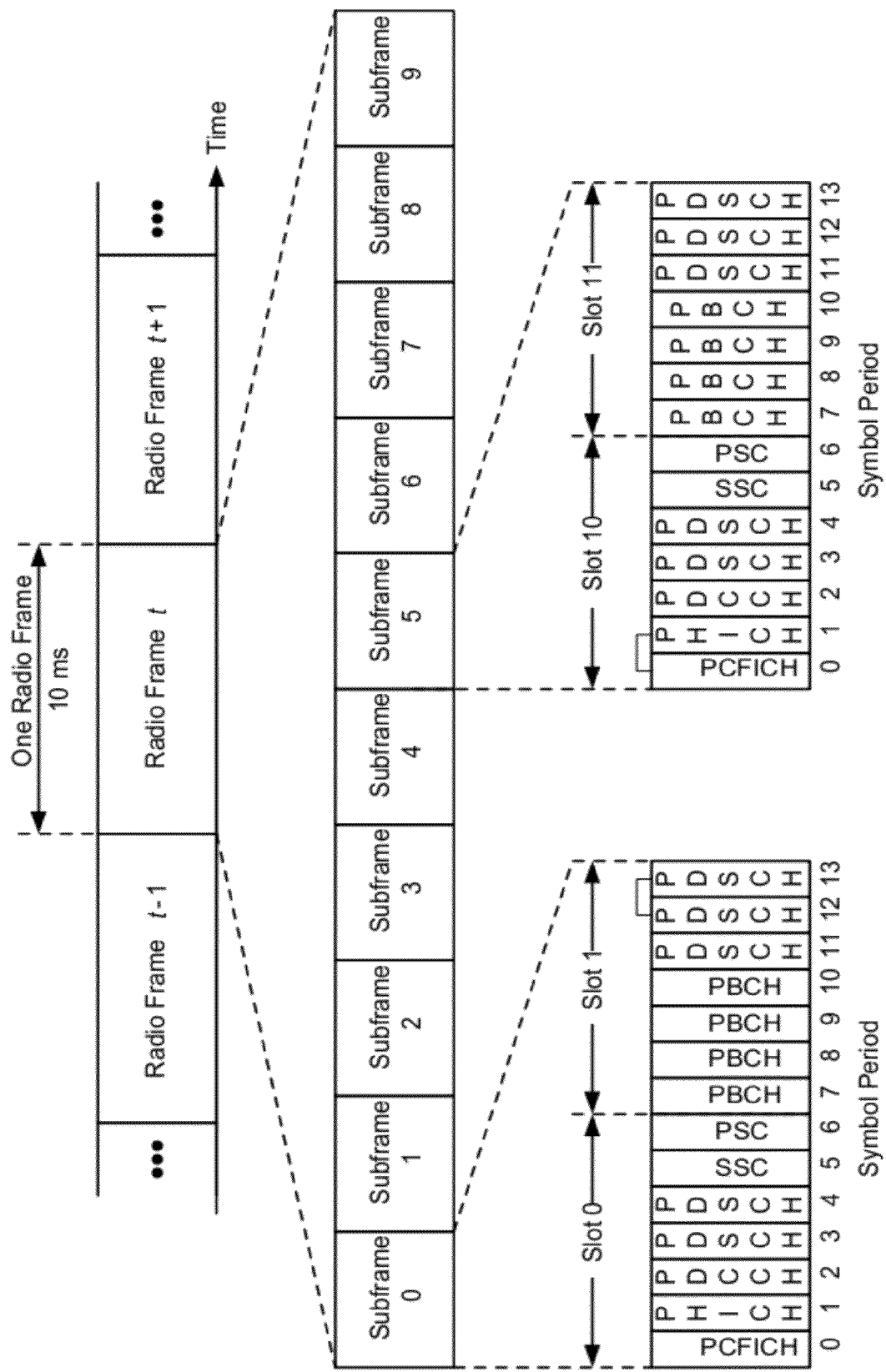
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
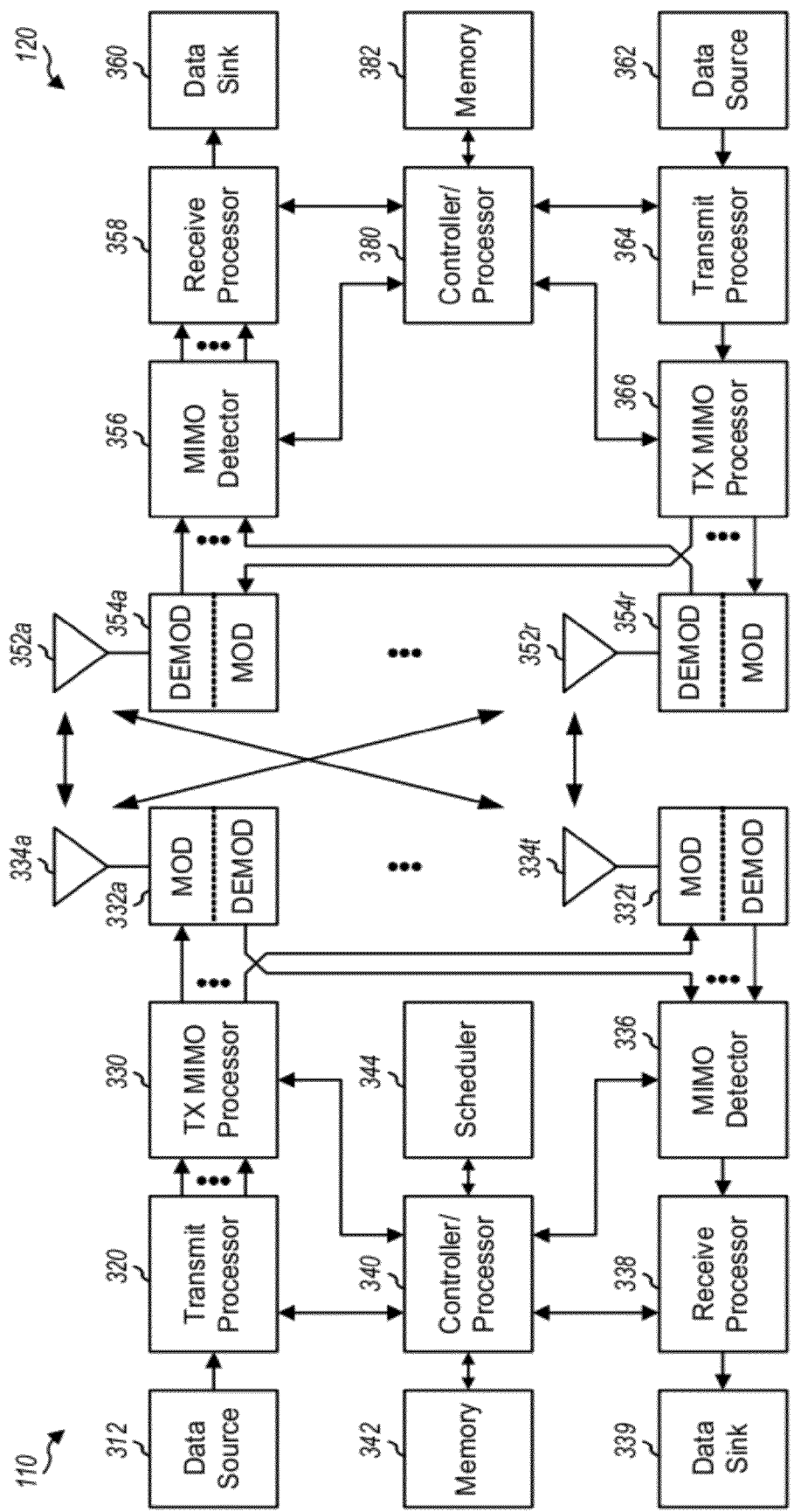
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 612 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 634t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 8-9, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Carrier Aggregation

LTE-Advanced UEs use spectrum in 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 4A:
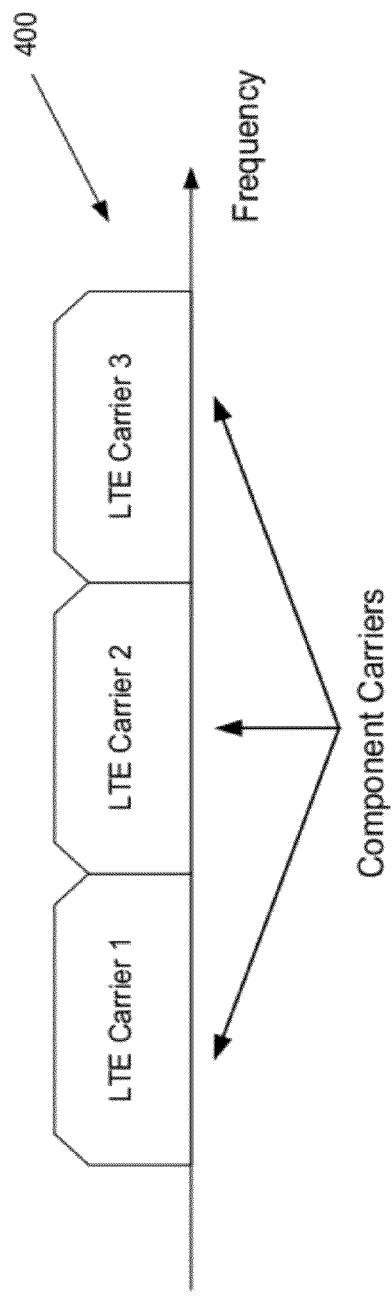
FIG. 4A discloses a continuous carrier aggregation type.
Figure 4B:
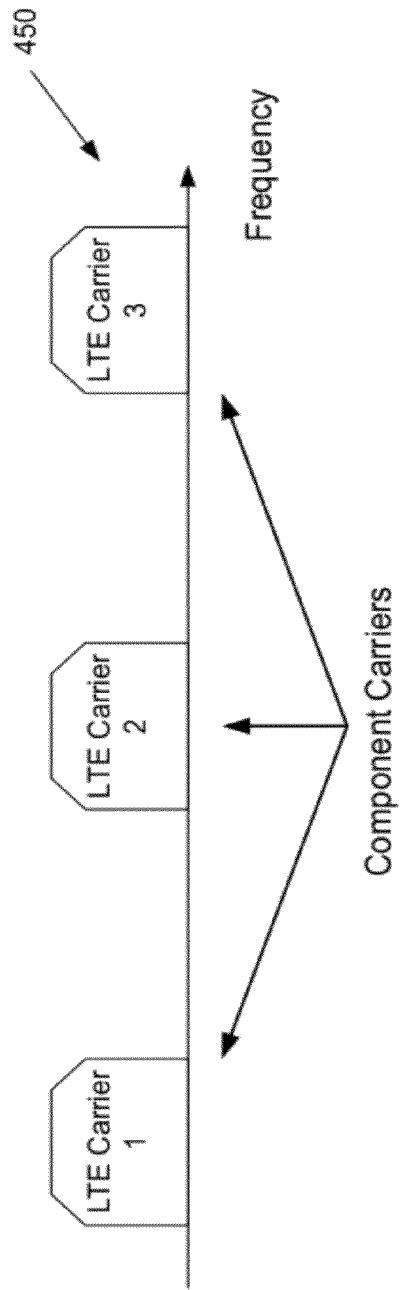
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA 450, as shown in FIG. 4B, is characterized by multiple available component carriers being separated along the frequency band. On the other hand, continuous CA 400, as shown in FIG. 4A, is characterized by multiple available component carriers being adjacent to each other. Both non-continuous CA 450 and continuous CA 400 aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Data Aggregation Schemes

Figure 5:
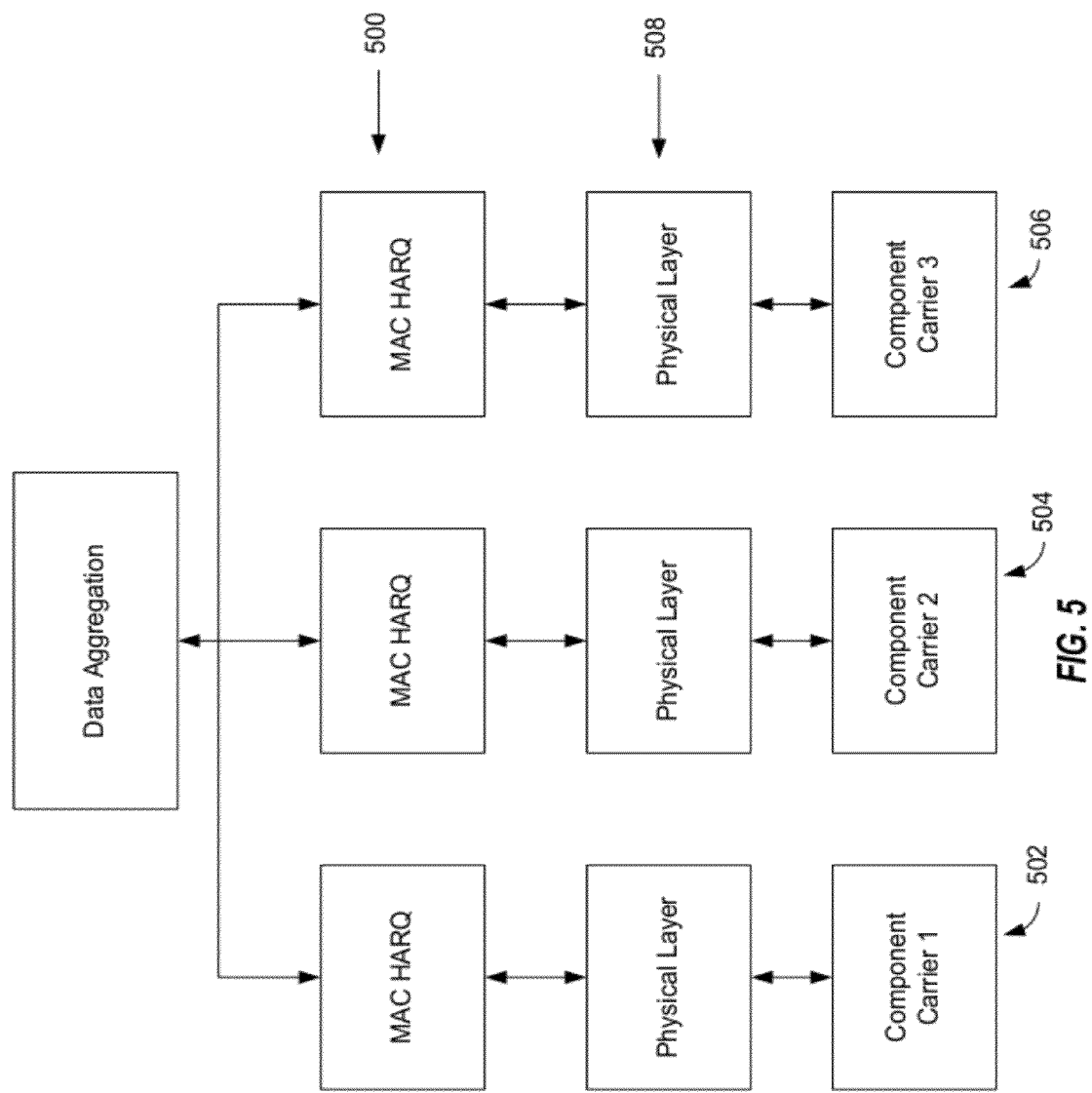
FIG. 5 discloses MAC layer data aggregation.

FIG. 5 illustrates aggregating transmission blocks (TBs) from different component carriers 502, 504, 506 at the medium access control (MAC) layer 500 for an International Mobile Telecommunications-Advanced (IMT-Advanced) system. With MAC layer data aggregation, each component carrier has its own independent hybrid automatic repeat request (HARQ) entity in the MAC layer 500 and its own transmission configuration parameters (e.g., transmitting power, modulation and coding schemes, and multiple antenna configuration) in the physical layer. Similarly, in the physical layer 508, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the target neighbor cell may be based on the measurement result of the one component carrier. Based on this estimate, the handover decision and transmission configuration may be determined.

eMBMS and Unicast Signaling in Single Frequency Networks

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) including, for example, what has recently come to be known as multimedia broadcast single frequency network (MBSFN) in the LTE context, can utilize such SFN operation. SFNs utilize radio transmitters, such as, for example, eNBs, to communicate with subscriber UEs. Groups of eNBs can transmit bi-directional information in a synchronized manner, so that signals reinforce one another rather than interfere with each other. In the context of eMBMS, there remains a need for single carrier optimization for transmitting shared content from a LTE network to multiple UEs.

In accordance with aspects of the subject of this disclosure, there is provided a wireless network (e.g., a 3GPP network) having features relating to single carrier optimization for eMBMS. Evolved MBMS provides an efficient way to transmit shared content from an LTE network to multiple mobile entities, such as, for example, UEs.

With respect a physical layer (PHY) of eMBMS for LTE FDD, the channel structure may comprise time division multiplexing (TDM) resource partitioning between an eMBMS and unicast transmissions on mixed carriers, thereby allowing flexible and dynamic spectrum utilization. As used herein, a "mixed carrier" refers to a carrier used for both eMBMS and unicast signaling. Currently, a subset of subframes (up to 60%), known as multimedia broadcast single frequency network (MBSFN) subframes, can be reserved for eMBMS transmission on a mixed carrier. As such, current eMBMS design allows at most six out of ten subframes for eMBMS.

Figure 6A:
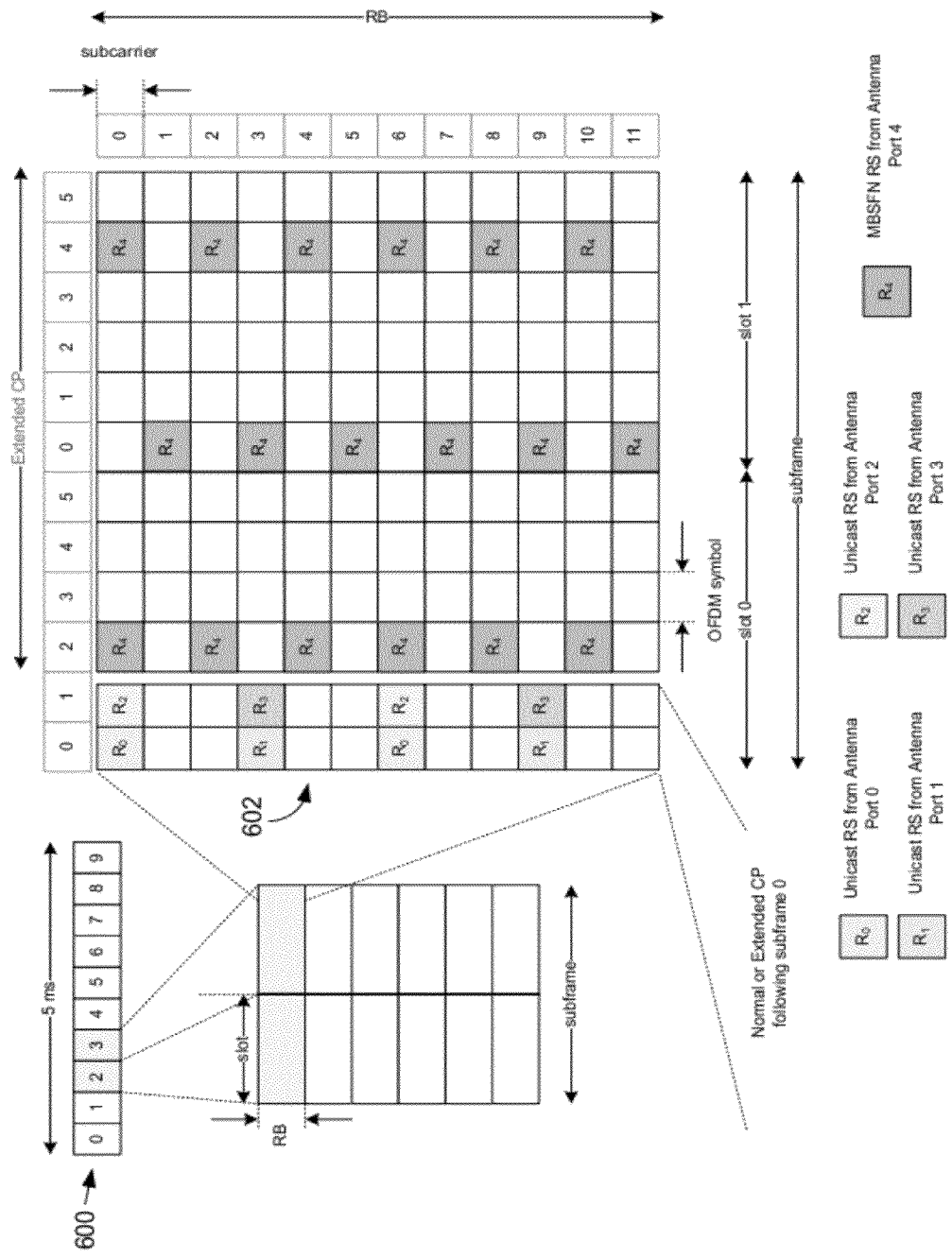
FIG. 6A illustrates an existing allocation of MBSFN reference signals on MBSFN subframes.

An example of subframe allocation for eMBMS is shown in FIG. 6A, which shows an existing allocation of MBSFN reference signals on MBSFN subframes, for a single-carrier case. Components depicted in FIG. 6A correspond to those shown in FIG. 2, with FIG. 6A showing the individual subcarriers within each slot and resource block (RB). In 3GPP LTE, a RB spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes 600 labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

Figure 6B:
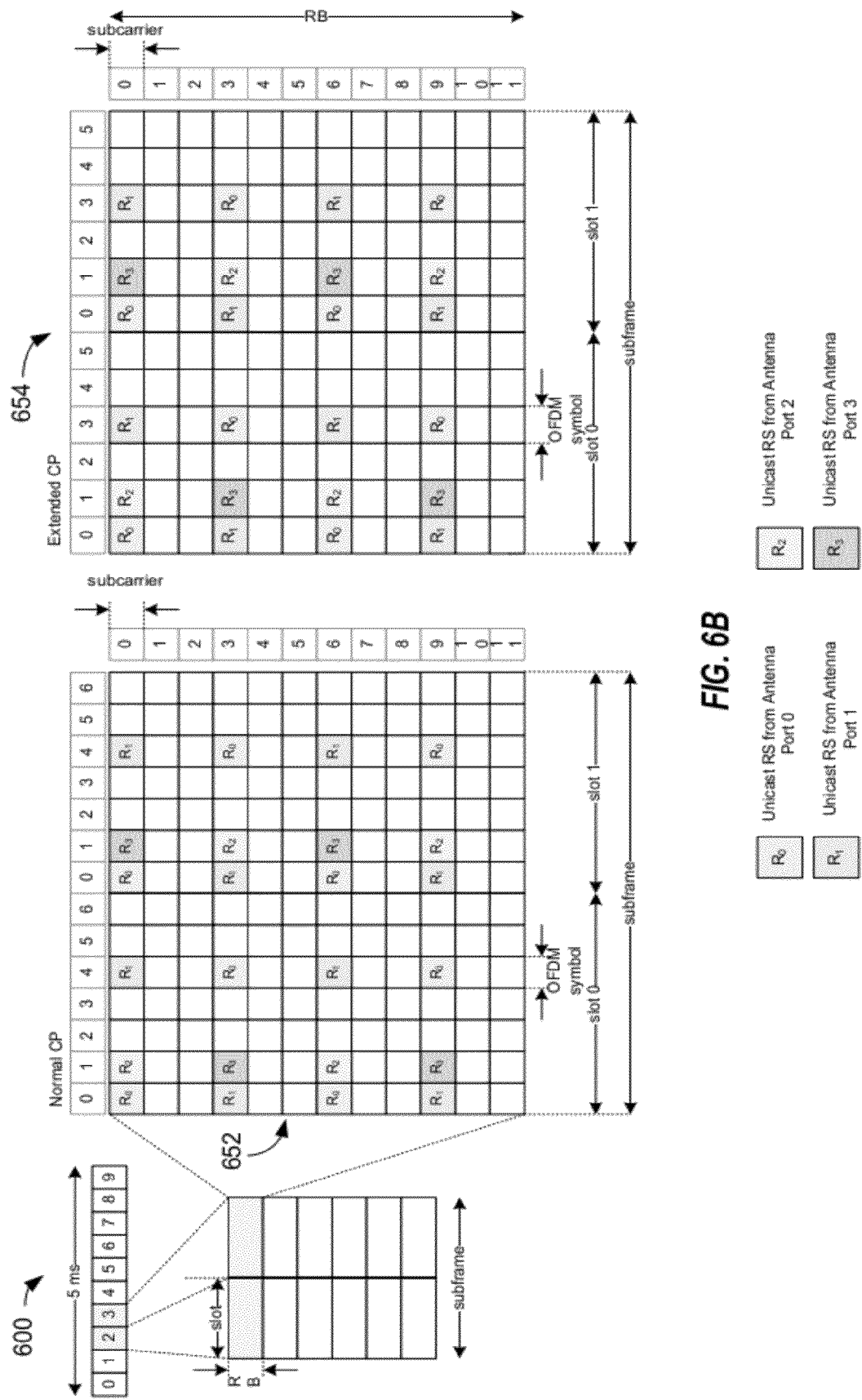
FIG. 6B illustrates an existing allocation of unicast reference signals on non-MBSFN subframes.

With continued reference to FIG. 6A, within each eMBMS subframe 602, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 6A), and separately allocating unicast RSs on non-MBSFN subframes. More specifically, as FIG. 6A shows, the extended CP of the MBSFN subframe includes MBSFN RSs but not unicast RSs. In further related aspects, the unicast RSs may be on the non-eMBMS subframes, as illustrated in the embodiment of FIG. 6B, which shows an existing allocation of unicast reference signals on non-MBSFN subframes 652, 654. As FIG. 6B shows, the normal CP 652 and/or extended CP 654 of the non-MBSFN subframes 652, 654 include unicast RSs ($R_0$, $R_1$, $R_2$, $R_3$) but not MBSFN RSs ($R_4$).

eMBMS Enhancements for Carrier Aggregation

Figure 7:
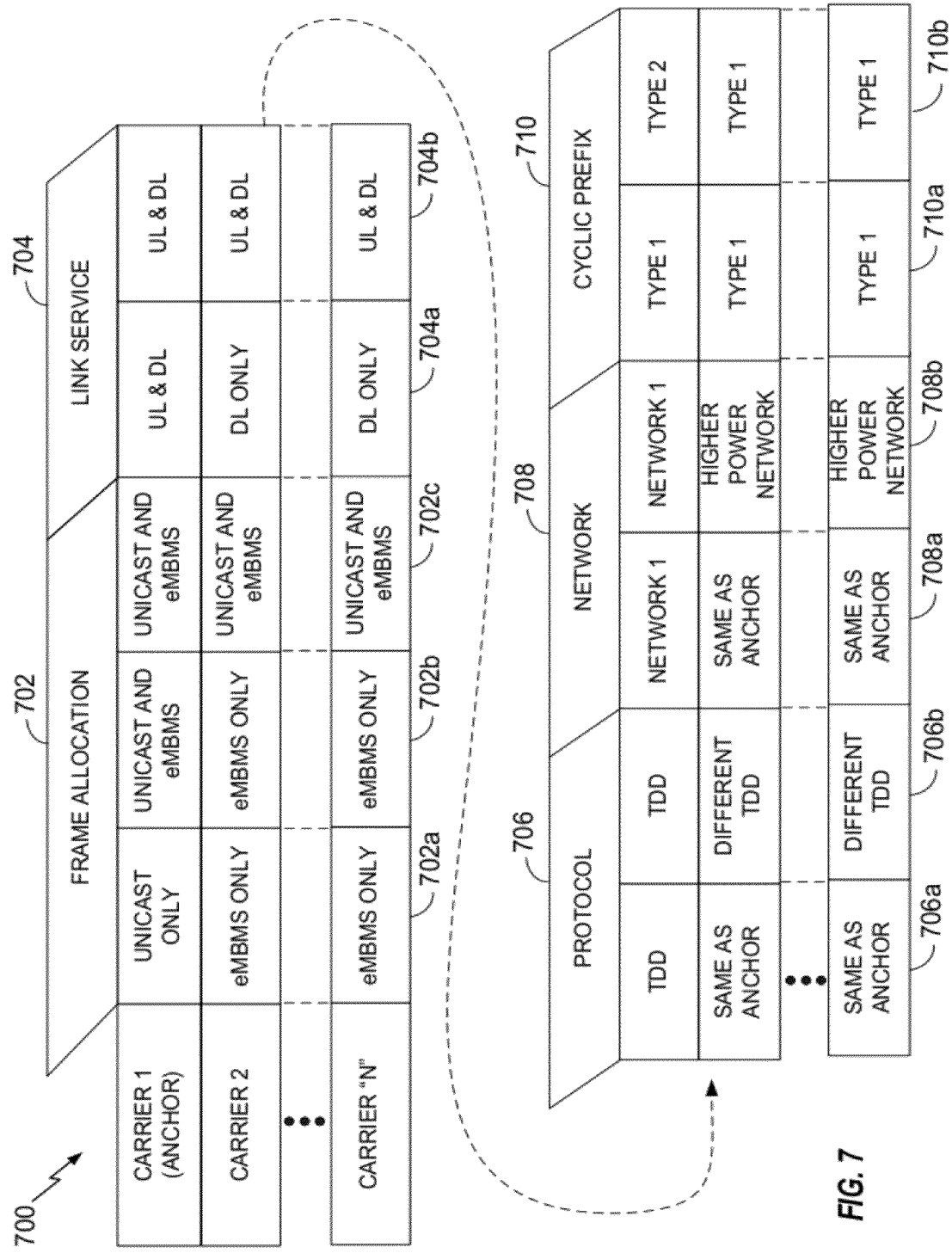
FIG. 7 illustrates embodiments of eMBMS enhancements using carrier aggregation.

As noted above, coding, modulation and transmission power for different component carriers may be different. These and other differences may be used to enhance eMBMS performance where multiple carriers are available, as described below with reference to FIG. 7. One of the multiple carriers is designated an anchor carrier, as seen in the row labels for the table 700 shown in FIG. 7. An anchor carrier may also be referred to as a "primary carrier." Additional carriers are labeled as Carrier 2 to 'N,' for example carriers 2, 3, 4, etc. The following discussion concerns an anchor carrier and a second carrier by way of example, and does not limit the use of more than two carriers for transmission to a UE. Additional carriers for eMBMS may be configured as described for the second (i.e., non-anchor) carrier.

The anchor carrier is characterized by carrying the PSS, SSS, PBCH and paging signaling, as described above. Frame allocation 702 may be configured variously for the anchor carrier and second carrier. In an embodiment 702a, the anchor carrier may be configured exclusively for unicast signaling while the second carrier is configured exclusively for eMBMS signaling. Configuring exclusively for unicast signaling includes not allocating any subframes of the carrier for eMBMS signaling. Configuring exclusively for eMBMS signaling includes not allocating any subframes of the carrier for unicast signaling. Therefore, for example, the second carrier can be used for eMBMS signaling without the 0/4/5/9 or 0/1/5/6 subframes allocated for unicast signaling. In another embodiment 702b, the anchor carrier is allocated for both unicast and eMBMS signaling, as described in the foregoing section, while the second carrier is allocated exclusively for eMBMS signaling. In yet another embodiment 702c, both the anchor carrier and second carrier are allocated for both unicast and eMBMS signaling.

In embodiments where all subframes of a carrier are allocated for eMBMS signaling, no control symbols need to be reserved for unicast signaling. Unicast signaling can be carried in the anchor carrier, with the cross-carrier uplink grant and PCICH for the uplink transmissions (if any) carried in the carrier dedicated for eMBMS signaling. This results in a lower overhead for eMBMS subframes. In addition, better channel estimation can be achieved in embodiments where all subframes of a carrier are allocated for eMBMS signaling. Channel estimation can use eMBMS reference signals from neighbor eMBMS subframes to obtain higher processing gain, because all sub frames with eMBMS reference signals are contiguous.

In addition to various frame allocations, link service 704 may be configured differently for the anchor carrier and second carrier. In an embodiment 704a, the anchor carrier is configured for both uplink (UL) and downlink (DL) signaling, while the second carrier is configured for downlink signaling only. In an alternative embodiment 704b, both the anchor carrier and the second carrier are configured for both uplink and downlink signaling. Note that uplink signaling on an eMBMS carrier could be used for various broadcast enhancements, for example interactive features.

In addition to various frame allocations and link services, where a TDD transmission protocol 706 is used, it may be configured variously for the anchor carrier and second carrier. In an embodiment 706a, the TDD protocol may be configured identically in the anchor carrier and second carrier. In an alternative embodiment 706b, the TDD protocol in the second carrier used exclusively for eMBMS is configured in a downlink-heavy configuration, i.e., with more subframes allocated for downlink, to improve eMBMS capacity.

Mixed Carrier Configuration Under Rel. 10

Carrier aggregation has been introduced in 3GPP LTE Release 10, also referred to herein as Release 10, to improve system capacity using a configuration as follows. All component carriers are Release 8 compatible, so older UEs can receive all component carriers. Mixed component carriers, i.e., carriers using a mixture of unicast and multicast signaling, are exclusively supported in Release 10. Conversely, Release 10 does not support carriers dedicated eMBMS signaling. A carrier dedicated to eMBMS signaling is sometimes referred to herein as a dedicated eMBMS carrier or dedicated component carrier.

When in an RRC_IDLE state, mobile entities may camp on the primary carrier, which is also sometimes referred to herein as the anchor carrier. When in an RRC_CONNECTED state, mobile entities may acquire system information about the secondary (i.e., non-primary) carrier(s), by using cross-carrier signaling in the primary carrier. For example, under Release 10, system information for secondary carriers is conveyed by dedicated cross-carrier signaling in the primary carrier. Mobile entities typically do not monitor any System Information Block (SIB) information in any secondary carrier.

Accordingly, to acquire MBMS parameters for a secondary carrier, each mobile entity needs to stay connected on the primary carrier to receive the dedicated control signals (e.g., RRCConnectionReconfiguration messages) needed to obtain system information for the secondary carriers. Under Release 10, secondary carriers only include the MBSFN subframe configuration list, which is limited to identifying the secondary carrier's MBSFN subframe allocation. Information about the MBSFN subframe allocation is not sufficient for accessing the MBSFN information on the secondary carriers. Therefore a connection to the primary carrier may be required to access MBMS information on secondary carriers. For example, parameters for acquiring the Multicast Control Channel (MCCH) as found in SIB 13 are not available in the secondary carriers. The SIB 13 may be as described in more detail in 3GPP2 T.S. 36.331. Therefore, an RRC_IDLE mobile entity can receive MBSFN service only on the primary carrier, even if it is otherwise capable of supporting MBMS on multiple carriers. Since there are advantages to mobile entities and to the wireless system in maintaining UE's in an RRC_IDLE state when not using unicast services, these limitations of Rel. 10 may be disadvantageous.

For example, the primary carrier is specific to each UE; and conversely, different UEs may use different primary carriers. In addition, a particular service may not be available on all primary carriers, because eMBMS service on a particular carrier is typically carrier specific. Therefore a mobile entity in an RRC_IDLE state may not be able to receive a particular eMBMS service of interest, unless the mobile entity maintains a RRC_CONNECTED state; or in the alternative, the mobile entity scans all available primary carriers to locate the carrier transmitting the eMBMS service of interest and camps on that carrier. Either approach may lead to inefficient use of system resources and impaired responsiveness in accessing desired eMBMS services. In addition, even when in a connected state, the mobile entity may not be able to obtain information regarding an eMBMS service of interest on a secondary carrier, in SIB 13 broadcast by the primary carrier.

Improved Acquisition of MBMS Parameters

To overcome the foregoing disadvantages, configuration changes as discussed below may be implemented. According to an alternative for RRC_CONNECTED mobile entities, SIB 13 information for available secondary carriers may be included in the dedicated control signals (e.g., RRCConnectionReconfiguration messages) transmitted from the network entity on the primary carrier. The UE can thereby obtain all necessary system information for using MBMS information on the secondary carriers from the primary carrier. No further control acquisition activity is required, so operation of the UE is simplified and acquisition time for MBMS information can be reduced.

According to an alternative for RRC_IDLE mobile entities, MBMS parameters for secondary carriers are conveyed using common control signaling (e.g., the Broadcast Control Channel (BCCH)) on the primary carrier, instead of (or in addition to) using dedicated control signaling. One method for doing this may be to expand the SIB 13 on the primary carrier to include SIB 13 information for one or more secondary carriers. In the alternative, a new SIB may be introduced on the primary carrier to convey eMBMS related parameters for the secondary carriers. Note that up to 32 different SIBs are allowed in Release 10, with 13 are currently defined, leaving 19 more available. A new SIB may include additional eMBMS parameters for eMBMS enhancement (e.g., service continuity, etc.), for example as summarized herein above.

From the mobile perspective, the UE obtains all information needed to access MBMS services on the secondary carriers from the BCCH signaling on the primary carrier. The Physical Downlink Control Channel (PDCCH) for signaling MCCH changes (needed for decoding the Multicast Traffic Channel (MTCH)) can therefore be transmitted on the primary carrier or a secondary carrier. This eliminates the need for the UE to stay in an RRC_CONNECTED state or to report its interest in a particular MBMS service to a network entity. Therefore RRC_IDLE mobile entities may receive MBMS service on any available secondary carrier, just as easily as RRC_CONNECTED mobile entities.

To improve backward compatibility, the following measures may be taken. For older mobile entities, dedicated signaling on the primary carrier may be maintained as currently specified in Release 10. Therefore an older UE may obtain all system information of available backward-compatible secondary carriers using the dedicated signaling, albeit subject to the disadvantages noted above. It is contemplated that one or more secondary carriers may not be backwardly-compatible. For non-backwardly compatible secondary carriers, common signaling on the primary carrier as disclosed above may be adopted.

Improvements in Multicast Control Channel

Currently, the MCCH on each carrier is sent separately, as is the PDCCH used to provide notification of MCCH changes to the mobile entities. In an aspect, the MCCH for all carriers may be aggregated together and transmitted exclusively on the primary carrier. Likewise, the PDCCH, which provides notification of MCCH changes, may also be aggregated for all carriers and transmitted exclusively on the primary carrier. Consequently, the UE no longer needs to monitor the PDCCH on the secondary carriers. Instead, the UE monitors the PDCCH for MCCH changes only on the primary carrier, and acquires the MCCH from the primary carrier. If the UE locates an MBMS service or interest on a particular secondary carrier, the UE tunes to that secondary carrier. If there is no MBMS service of interest on a secondary carrier, the UE does not need to monitor that carrier. However, an increase in MCCH and PDCCH overhead on the primary carrier may result. Increased overhead may be outweighed by the advantage of eliminating the need to monitor the PDCCH on the secondary carriers and enabling acquisition of the MCCH for all carriers on the primary carrier, as described above.

To reduce UE wake up time, the PDCCH may be configured so that MCCH change notification is allocated to MBSFN subframes, rather than to unicast subframes.

Counting Response Messages

To the extent that the MCCH information is aggregated on the primary carrier, the counting response message, being an MCCH message, follows the MCCH. The following options may be used by a UE to report the counting response message. In a first option, the UE reports the counting response message on the uplink primary carrier. In a second option, the UE reports the counting response message on an uplink carrier that is associated with the downlink carrier on which the MBMS service of interest is available. This associated uplink carrier may be distinct from the primary carrier.

Increased MBSFN Allocation on Secondary Carrier

To the extent that it is not necessary to maintain backward compatibility in a secondary carrier, subframe allocation on the secondary carrier may be configured to increase the amount of subframes used for MBSFN signaling. In a backward compatible carrier, a maximum of 60% of subframes can be allocated to MBSFN in a Frequency Division Duplex (FDD) protocol. The remaining subframes may be allocated to provide for the Primary Synchronization Signal (PSS), Secondary Synchronization Signal (SSS), Physical Broadcast Channel (PBCH), paging, and SIBs. PSS and SSS are transmitted on subframes 0 and 5, while PBCH is transmitted on subframe 0. Paging may be transmitted in subframes 0, 4, 5 and 9; therefore these subframes are not available for MBSFN signals.

To increase subframe allocation for MBSFN signaling in FDD, subframe 5 in odd radio frames may be allocated for the Physical Multicast Channel (PMCH), provided that the last two symbols of subframe 5 are reserved for PSS/SSS symbols. Subframe 5 in even radio frames may remain available for PSS/SSS and SIB 1 signals. Subframes 4 and 9 in even radio frames, odd radio frames, or both, may be allocated to MBSFN signals, provided that SIB information and paging are scheduled on subframe 0 or subframe 5 in even radio frames. By making these configuration changes, an allocation to MBSFN signals of up to about 85% may be achieved. Subframe 0 and subframe 5 in even radio frames remain available for non-MBSFN uses.

Similarly, in Time Division Duplex (TDD) protocols for a backward compatible carrier, a maximum of 60% of subframes can be allocated to MBSFN because subframes 0, 1 5 and 6 are allocated to PSS, SSS, PBCH, paging and SIB information. To increase subframe allocation for MBSFN signaling in TDD, subframe 5 in odd radio frames may be allocated for the PMCH, provided that the last symbol of subframe 5 is reserved for SSS symbols. Subframe 5 in even radio frames may remain allocated to paging and SIB signals. Subframes 1 and 6 in even radio frames, odd radio frames, or both, may be allocated to MBSFN signals, provided that the first three symbols are reserved for PSS and unicast control signaling. By making these configuration changes, an allocation to MBSFN signals of up to about 85% may be achieved. Subframe 0 and subframe 5 in even radio frames remain available for non-MBSFN uses.

Other Enhancements for Dedicated eMBMS Carriers

Although a dedicated eMBMS carrier is not supported in Rel. 10, in a future release, a dedicated eMBMS secondary carrier may be aggregated with the primary carrier. In such case, a dedicated eMBMS carrier may use a 16.67 μs CP length with a 15 KHz carrier spacing. All subframes within a radio frame of the dedicated carrier may be allocated to MBSFN. Control symbols within a MBSFN subframe may be eliminated, with appropriate adjustments to the MBSFN RS pattern compatible with all control symbols being dedicated to MBSFN. A secondary carrier need not be exclusively dedicated to MBSFN service; instead, a secondary carrier may be allocated to unicast service in whole or in part, based on demand for MBSFN services in a particular area.

When a secondary carrier is dedicated to eMBMS use, no downlink acquisition signals (e.g., PSS/SSS or PBCH) need be sent on the secondary carrier. Likewise, the dedicated carrier need not be used for SIB, paging, or the Physical Downlink Shared Channel (PDSCH). Instead, certain eMBMS parameters may be allocated to the primary carrier. As noted above, SIB 13 in the primary carrier can be expanded to include information for secondary carriers. In the alternative, a new SIB may be introduced such that only interested UEs need acquire eMBMS information for the secondary carriers carried in the new SIB (for example, SIB 14). The PDCCH of the primary carrier may be used to notify UEs of MCCH changes.

Eliminating control symbols in MBSFN subframes of the dedicated carrier provides additional link efficiency on downlink-only spectrum such as, for example, Forward Link Only (FLO) spectrum. Cross-carrier signaling from the primary carrier or other secondary carriers can be used to support unicast transmission on the dedicated carrier.

Mobile entities that do not support simultaneous unicast and eMBMS or multi-carrier reception may tune to the primary carrier to acquire MBMS system parameters, and then switch to the secondary carrier for eMBMS signaling.

In addition to the variations described above, the network(s) 708 used for the anchor carrier and second carrier may be configured in various ways. In an embodiment 708*a*, the same network or networks may be used for both carriers. In an alternative embodiment 708*b*, different networks may coexist and be used to transmit different carriers. In particular, the higher-powered one of the available networks may be used to transmit the eMBMS carrier, e.g., the second carrier. For example, a pico-cell network may be controlled to transmit MBSFN/eMBMS via an X2 interface for intercellular coordination, while a femto-cell network may be controlled to transmit unicast data in the anchor carrier without X2 coordination. Because of different propagation times, different networks may experience different delay spreads. For example, a first network may require a CP of 16.67 µs because of its delay spread, while a second network may require a longer CP of 33.33 µs. Accordingly, cyclic prefix 710 may also be configured in various ways. In an embodiment 710*a*, the anchor carrier and second carrier may both use a CP type (e.g., "Type 1") having the longest CP of the different networks. In an alternative embodiment 710*b*, the anchor carrier may transmit unicast and eMBMS signaling on the network using a second CP type ("Type 2"), for example, a long CP (16.67 µs) type. The second carrier may transmit eMBMS signaling using the first CP type different from the second CP type, for example, a longer CP (33.33 µs) type.

Example Methodologies and Apparatus

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

FIG. 8 shows a method 800 for transmitting evolved Multimedia Broadcast/Multicast Service (MBMS) on a Single Frequency Network (MBSFN) services using multiple carriers of a wireless communications system using at least one network entity of a wireless communications system. The network entity may be an eNB, or other base station (e.g., Home Node B, etc.) of a wireless communications network. The method 800 may include the network entity transmitting, at 810, MBSFN signals on a secondary carrier to one or more mobile entities. The mobile entities may each be a UE associated with a subscriber of the wireless communication system. The method 800 may further include the network entity transmitting, at 820, information used for acquiring a Multicast Control Channel (MCCH) from the base station on a primary carrier, wherein the base station also transmits at least unicast signaling on the primary carrier. All described transmissions are performed wirelessly in accordance with one or more protocols described herein.

Figure 10:
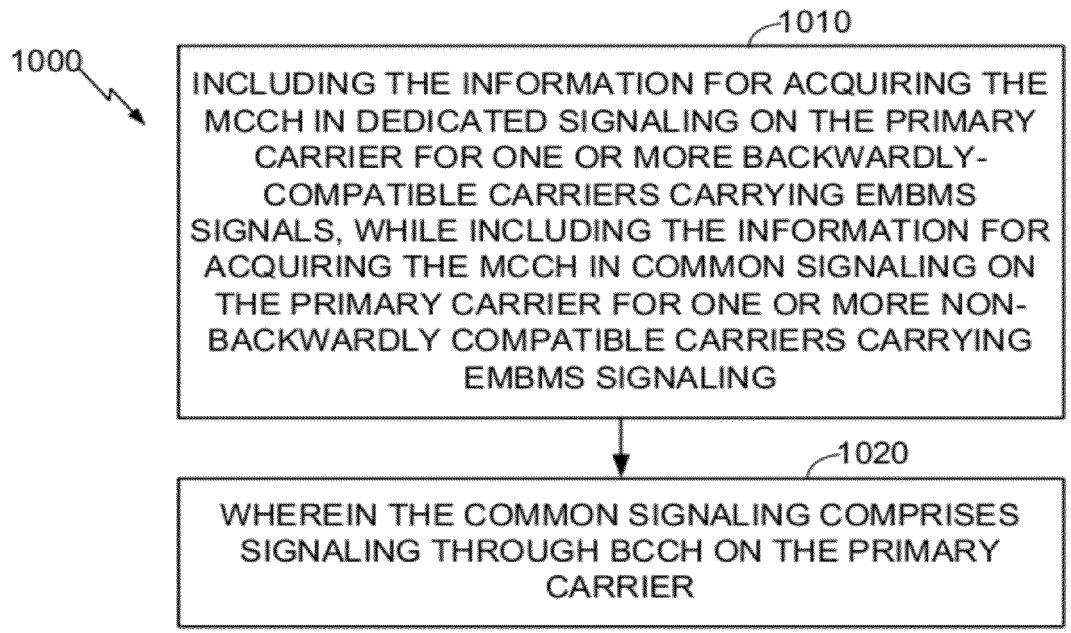
Figure 11:
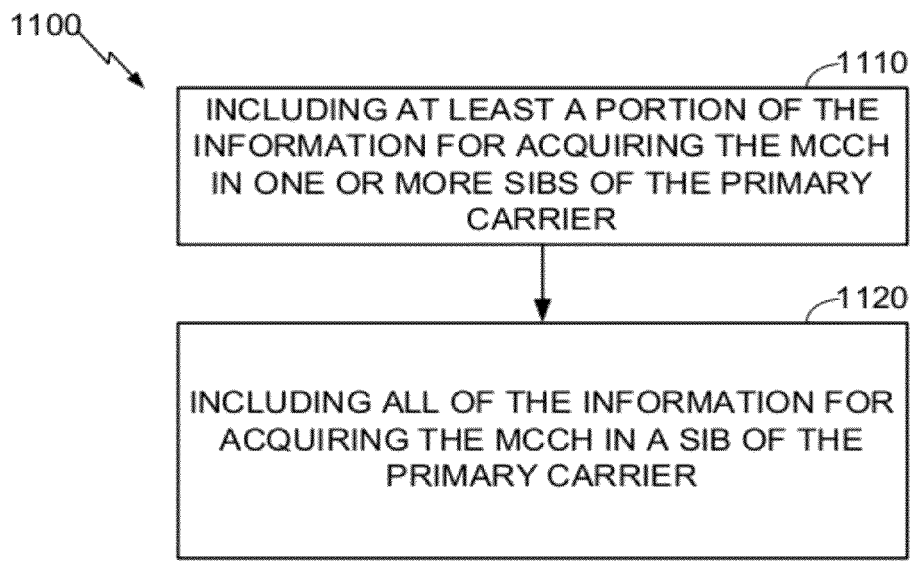

FIGS. 9-11 shows further optional operations or aspects 900, 1000, and 1100 that may be performed by the source base station in conjunction with the method 800 for transmitting eMBMS services using multiple carriers. The operations shown in FIGS. 9-11 are not required to perform the method 800. Operations 900, 1000 and 1100 can be independently performed and are not mutually exclusive. Therefore any one of such operations may be performed regardless of whether another downstream or upstream operation is performed. If the method 800 includes at least one operation of FIGS. 9-11, then the method 800 may terminate after the at least one operation, without necessarily having to include any subsequent downstream operation(s) that may be illustrated.

Referring to FIG. 9, the method 800 may further include, at 910, the base station including the information for acquiring the MCCH in dedicated signaling for Radio Resource Control (RRC) connected mobile entities. The method 800 may further include, at 920, the base station including information for decoding the MBSFN signals in the MCCH. The method 800 may further include, at 930, allocating all subframes of the secondary carrier to the MBSFN signals.

Referring to FIG. 10, the method 800 may further include, at 1010, the base station including the information for acquiring the MCCH in dedicated signaling on the primary carrier for one or more backwardly-compatible carriers carrying eMBMS signals, while including the information for acquiring an MCCH in common signaling on the primary carrier for one or more non-backwardly compatible carriers carrying eMBMS signaling. The method 810 may further include, at 1020, the common signaling comprising signaling through BCCH on the primary carrier.

In another aspect, the method 800 may further include the operations 1100 as shown in FIG. 11. Specifically, the method 800 may further include, at 1110, the base station including at least a portion of the information for acquiring the MCCH in one or more SIBs of the primary carrier. For example, the base station may include at least a portion of the information for acquiring the MCCH in a SIB13 of the primary carrier. The base station may include a different portion of the information in a different SIB, for example, SIB 3 or in a new SIB numbered greater than 13, for example a new SIB 14. In an alternative, or in addition, the method 800 may include, at 1120, the base station including all of the information for acquiring the MCCH in a SIB of the primary carrier, for example, in a SIB 13 of the primary carrier.

Figure 12:
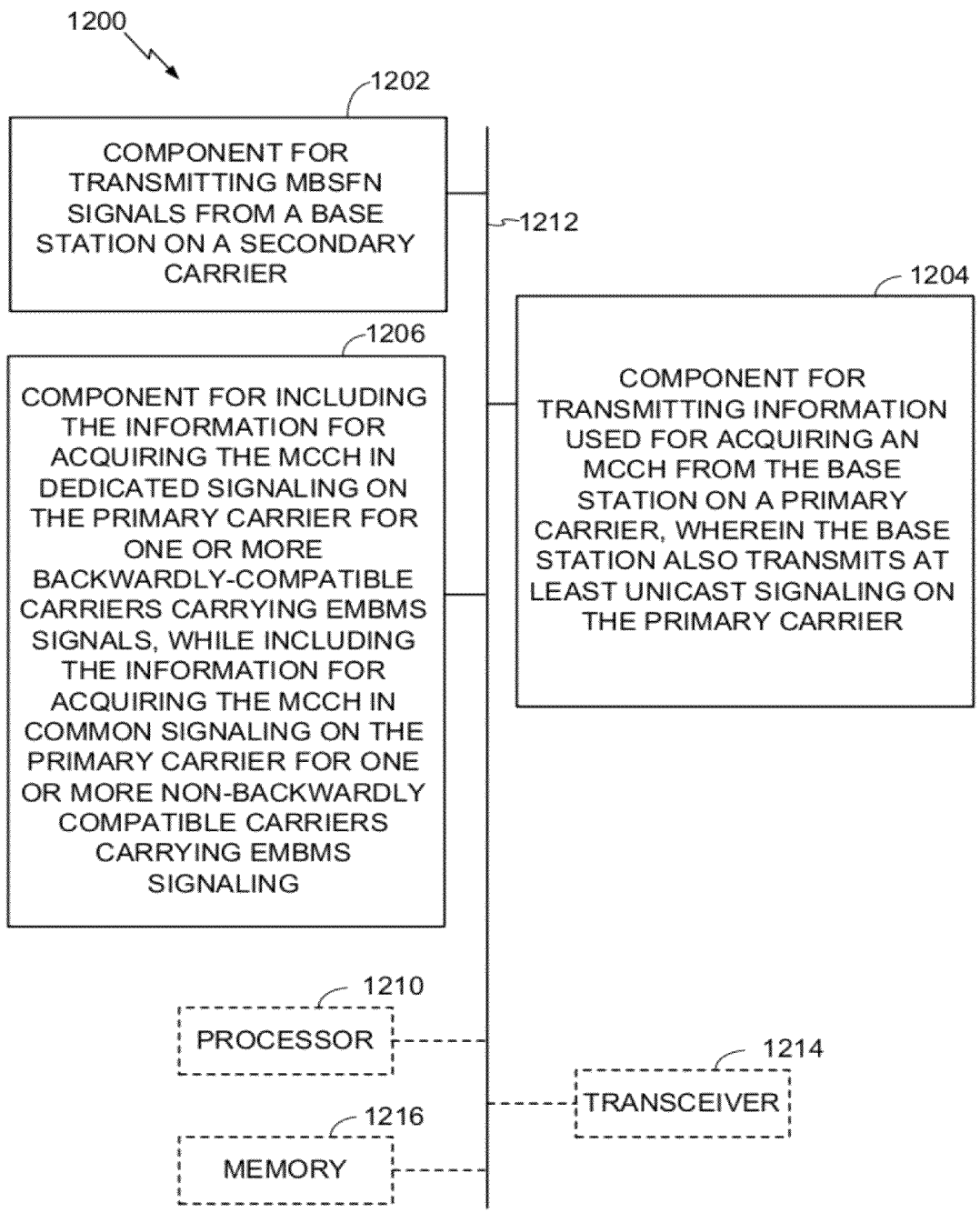
FIG. 12 illustrates an embodiment of an apparatus for transmitting eMBMS services using multiple carriers, in accordance with the methodologies of FIGS. 8-11.

With reference to FIG. 12, there is provided an exemplary apparatus 1200 that may be configured as a network entity in a wireless network, or as a processor or similar device for use within the network entity, for providing eMBMS. The apparatus 1200 may include functional blocks that can represent functions implemented by a processor, software, or combination thereof (e.g., firmware).

As illustrated, in one embodiment, the apparatus 1200 may include an electrical component or module 1202 for transmitting MBSFN signals from a base station to mobile entities on a secondary carrier. For example, the electrical component 1202 may include at least one control processor coupled to a transceiver or the like and to a memory with instructions for transmitting the MBSFN signals on the secondary carrier. The electrical component 1202 may be, or may include, a means for transmitting MBSFN signals from a base station to mobile entities on a secondary carrier. Said means may include the control processor executing an algorithm. The algorithm may include, for example, preparing a multicast data stream for a secondary carrier, modulating a signal according to an MBSFN protocol, and transmitting the signal wirelessly on the secondary carrier.

The apparatus 1200 may include an electrical component 1204 for transmitting information used for acquiring the MCCH from the base station on a primary carrier, wherein the base station also transmits at least unicast signaling on the primary carrier. For example, the electrical component 1204 may include at least one control processor coupled to a transceiver or the like and to a memory holding instructions for transmitting information used for acquiring the MCCH using the primary carrier. The electrical component 1202 may be, or may include, a means for transmitting information used for acquiring the MCCH from the base station on a primary carrier, wherein the base station also transmits at least unicast signaling on the primary carrier. Said means may include the control processor executing an algorithm. The algorithm may include, for example, transmitting unicast signals on a primary carrier, obtaining information for acquiring the MCCH of the secondary carrier, and transmitting the information for acquiring the MCCH wirelessly on the primary carrier.

The apparatus 1200 may include an electrical component or means 1206 for including the information for acquiring the MCCH in dedicated signaling on the primary carrier for one or more backwardly-compatible carriers carrying eMBMS signals, while including the information for acquiring an MCCH in common signaling on the primary carrier for one or more non-backwardly compatible carriers carrying eMBMS signaling. The electrical component or means 1206 may be, or may include, a at least one control processor coupled to a transceiver and to a memory holding an algorithm in the form of encoded instructions, with the at least one control processor executing the algorithm. The algorithm may include, for example, obtaining first information for acquiring the MCCH for each of the one or more backwardly-compatible carriers carrying eMBMS signals, and including the first information for acquiring the MCCH in dedicated signaling transmitted on the primary carrier. The algorithm may further include, for example, obtaining second information for acquiring the MCCH for each of the one or more non-backwardly compatible carriers carrying eMBMS signals, and including the second information in common signaling transmitted on the primary carrier.

The apparatus 1200 may include similar electrical components for performing any or all of the additional operations 900-1100 described in connection with FIGS. 9-11, which for illustrative simplicity are not shown in FIG. 12.

In related aspects, the apparatus 1200 may optionally include a processor component 1210 having at least one processor, in the case of the apparatus 1200 configured as a network entity. The processor 1210, in such case, may be in operative communication with the components 1202-1206 or similar components via a bus 1212 or similar communication coupling. The processor 1210 may effect initiation and scheduling of the processes or functions performed by electrical components 1202-1206. The processor 1210 may encompass the components 1202-1206, in whole or in part. In the alternative, the processor 1210 may be separate from the components 1202-1206, which may include one or more separate processors.

In further related aspects, the apparatus 1200 may include a radio transceiver component 1214. A stand alone receiver and/or stand alone transmitter may be used in lieu of or in conjunction with the transceiver 1214. In the alternative, or in addition, the apparatus 1200 may include multiple transceivers or transmitter/receiver pairs, which may be used to transmit and receive on different carriers. The apparatus 1200 may optionally include a component for storing information, such as, for example, a memory device/component 1216. The computer readable medium or the memory component 1216 may be operatively coupled to the other components of the apparatus 1200 via the bus 1212 or the like. The memory component 1216 may be adapted to store computer readable instructions and data for performing the activity of the components 1202-1206, and subcomponents thereof, or the processor 1210, the additional aspects 1100, or the methods disclosed herein. The memory component 1216 may retain instructions for executing functions associated with the components 1202-1206. While shown as being external to the memory 1216, it is to be understood that the components 1202-1206 can exist within the memory 1216.

A mobile entity receiving signals from a base station performing the method 800 may perform a method 1300 to make use of information from the base station, as shown in FIG. 13. The mobile entity may comprise an entity of any of the various forms described herein, for example, a UE. The method 1300 may include the mobile entity receiving, at 1310, MBSFN signals from a base station on a secondary carrier. The method 1300 may further include the mobile entity receiving, at 1320, information used for acquiring an MCCH from the base station on a primary carrier, wherein the primary carrier also includes at least unicast signaling.

Figure 15:
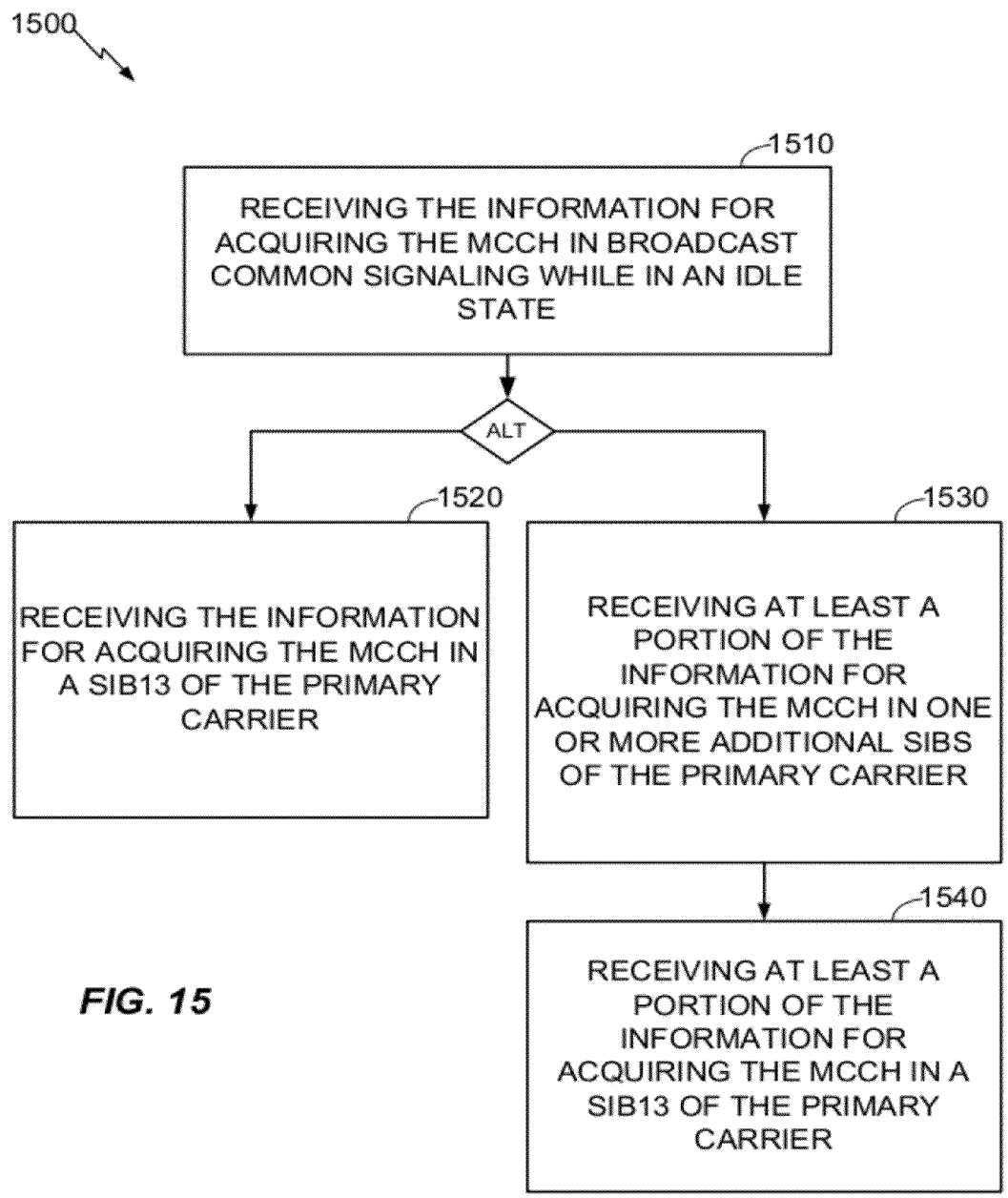

FIGS. 14-15 shows further optional operations or aspects 1400, 1500 that may be performed by the mobile entity in conjunction with the method 1300 for receiving eMBMS information using multiple carriers of a wireless communications system. The operations shown in FIGS. 14-15 are not required to perform the method 1300. Unless positioned directly on opposing branches off of an "in the alternative" diamond, operations can be independently performed and not mutually exclusive. Therefore any one of such operations may be performed regardless of whether another downstream or upstream operation is performed. If the method 1300 includes at least one operation of FIGS. 14-15, then the method 1300 may terminate after the at least one operation, without necessarily having to include any subsequent downstream operation(s) that may be illustrated. Conversely, operations that are positioned directly on opposing branches off of an "in the alternative" diamond are expected to be mutually exclusive alternatives in any particular instance of the method.

Referring to FIG. 14, method 1300 may include one or more of the additional operations 1400. The method 1300 may further include, at 1410, the mobile entity receiving information for acquiring an MCCH in a SIB of the primary carrier. The method 1300 may further include, at 1420, the mobile entity receiving the information for acquiring the MCCH in dedicated signaling while in an RRC_CONNECTED state. The method 1300 may further include, at 1430, the mobile entity decoding all subframes of the secondary carrier as dedicated to MBSFN signals. The method 1300 may further include, at 1440, the mobile entity decoding the MBSFN signals using information received via the MCCH.

Referring to FIG. 15, the method 1300 may include one or more of the additional operations 1500. The method 1300 may further include, at 1510, the mobile entity receiving information for acquiring the MCCH in broadcast common signaling, while the mobile entity is in an RRC_IDLE state. The method 1300 may further include, at 1520, the mobile entity receiving the information for acquiring the MCCH in a SIB 13 of the primary carrier. In the alternative, the method 1300 may further include, at 1530, the mobile entity receiving at least a portion of the information for acquiring the MCCH in one or more additional SIBs of the primary carrier. In the alternative, the method 1300 may further include, at 1540, the mobile entity receiving at least a portion of the information for acquiring the MCCH in a SIB 13 of the primary carrier. The mobile entity may receive a different portion of the information in another SIB, for example, SIB 3 or a new SIB numbered higher than 13, for example a new SIB 14.

Figure 16:
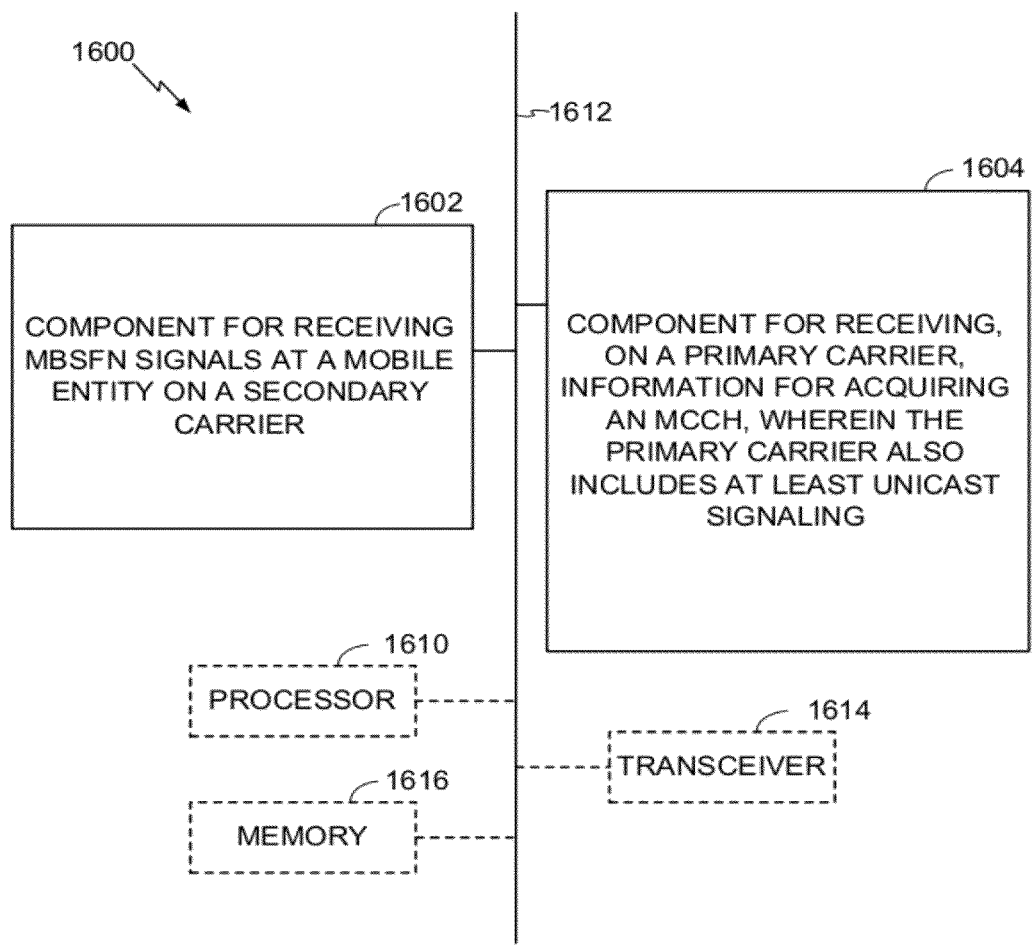
FIG. 16 illustrates an embodiment of an apparatus for receiving eMBMS services using multiple carriers, in accordance with the methodologies of FIGS. 13-15.

With reference to FIG. 16, there is provided an exemplary apparatus 1600 that may be configured as a mobile entity or UE in a wireless network, or as a processor or similar device for use within the ME or UE, for receiving an eMBMS on a secondary carrier. The apparatus 1600 may include functional blocks that can represent functions implemented by a processor, software, or combination thereof (e.g., firmware).

In one embodiment, the apparatus 1600 may include an electrical component or module 1602 for receiving MBSFN signals at a mobile entity on a secondary carrier. For example, the electrical component 1602 may include at least one control processor coupled to a transceiver or the like and to a memory with instructions for receiving and processing MBSFN signaling over a secondary one of multiple carriers. The electrical component 1602 may be, or may include, a means for receiving MBSFN signals at a mobile entity on a secondary carrier. Said means may include the control processor executing an algorithm. The algorithm may include, for example, receiving a signal on a secondary carrier, and demodulating the signal according to an MBSFN protocol to obtain demodulated data.

The apparatus 1600 may include an electrical component 1604 for receiving information used for acquiring an MCCH on a primary carrier, wherein the primary carrier also includes at least unicast signaling. For example, the electrical component 1604 may include at least one control processor coupled to a transceiver or the like and to a memory holding instructions for acquiring the MCCH on the anchor carrier. The electrical component 1604 may be, or may include, a means for receiving information used for acquiring an MCCH on a primary carrier, wherein the primary carrier also includes at least unicast signaling. Said means may include the control processor executing an algorithm. The algorithm may include, for example, receiving unicast signaling on a primary carrier, receiving control signaling on the primary carrier, and identifying the information for acquiring the secondary carrier MCCH in the control signaling. The MCCH itself may be broadcast on the secondary carrier. The apparatus 1600 may include similar electrical components for performing any or all of the additional operations 1400 or 1500 described in connection with FIGS. 14-15, which for illustrative simplicity are not shown in FIG. 16.

In related aspects, the apparatus 1600 may optionally include a processor component 1610 having at least one processor, in the case of the apparatus 1600 configured as a mobile entity. The processor 1610, in such case, may be in operative communication with the components 1602-1604 or similar components via a bus 1612 or similar communication coupling. The processor 1610 may effect initiation and scheduling of the processes or functions performed by electrical components 1602-1604. The processor 1610 may encompass the components 1602-1604, in whole or in part. In the alternative, the processor 1610 may be separate from the components 1602-1604, which may include one or more separate processors.

In further related aspects, the apparatus 1600 may include a radio transceiver component 1614. A stand alone receiver and/or stand alone transmitter may be used in lieu of or in conjunction with the transceiver 1614. In the alternative, or in addition, the apparatus 1600 may include multiple transceivers or transmitter/receiver pairs, which may be used to transmit and receive on different carriers. The apparatus 1600 may optionally include a component for storing information, such as, for example, a memory device/component 1616. The computer readable medium or the memory component 1616 may be operatively coupled to the other components of the apparatus 1600 via the bus 1612 or the like. The memory component 1616 may be adapted to store computer readable instructions and data for performing the activity of the components 1602-1604, and subcomponents thereof, or the processor 1610, or the additional aspects 1400 or 1500, or the methods disclosed herein. The memory component 1616 may retain instructions for executing functions associated with the components 1602-1604. While shown as being external to the memory 1616, it is to be understood that the components 1602-1604 can exist within the memory 1616.

A network entity may also perform a method 1700 for transmitting MBSFN signals on a secondary carrier, as shown in FIG. 17. The network entity may be, for example, an eNB, Home Node B, or other base station for a wireless communications system. The method 1700 may include, at 1710, transmitting MBSFN signals from a base station on a secondary carrier. The method 1700 may further include, at 1720, transmitting the MCCH information from the base station on a primary carrier, wherein the base station also transmits at least unicast signaling on the primary carrier.

FIG. 18 shows further optional operations or aspects 1800 that may be performed by the network entity in conjunction with the method 1700 for transmitting eMBMS information using multiple carriers of a wireless communications system. The operations shown in FIG. 18 are not required to perform the method 1700. Unless positioned directly on opposing branches off of an "in the alternative" diamond, operations can be independently performed and are not mutually exclusive. Therefore any one of such operations may be performed regardless of whether another downstream or upstream operation is performed. If the method 1700 includes at least one operation of FIG. 18, then the method 1700 may terminate after the at least one operation, without necessarily having to include any subsequent downstream operation(s) that may be illustrated. Conversely, operations that are positioned directly on opposing branches off of an "in the alternative" diamond are expected to be mutually exclusive alternatives in any particular instance of the method.

Referring to FIG. 18, the method 1700 may further include, at 1805, the base station including information for decoding the MBSFN signals in the MCCH information. The method 1700 may further include, at 1810, the base station transmitting a PDCCH on the primary carrier to provide notification of changes in the MCCH information. The method 1700 may further include, at 1820, the base station receiving a counting response from a mobile entity in response to the MCCH information on the primary carrier. That is, the base station may receive the counting response on the primary carrier, because the mobile entity transmits it there. In the alternative, the method 1700 may include, at 1830, the base station receiving a counting response from the mobile entity in response to the MCCH information on an uplink carrier that is associated with the secondary carrier. That is, the base station may receive the response on some uplink carrier (not the anchor carrier) that is associated with the secondary carrier.

Figure 19:
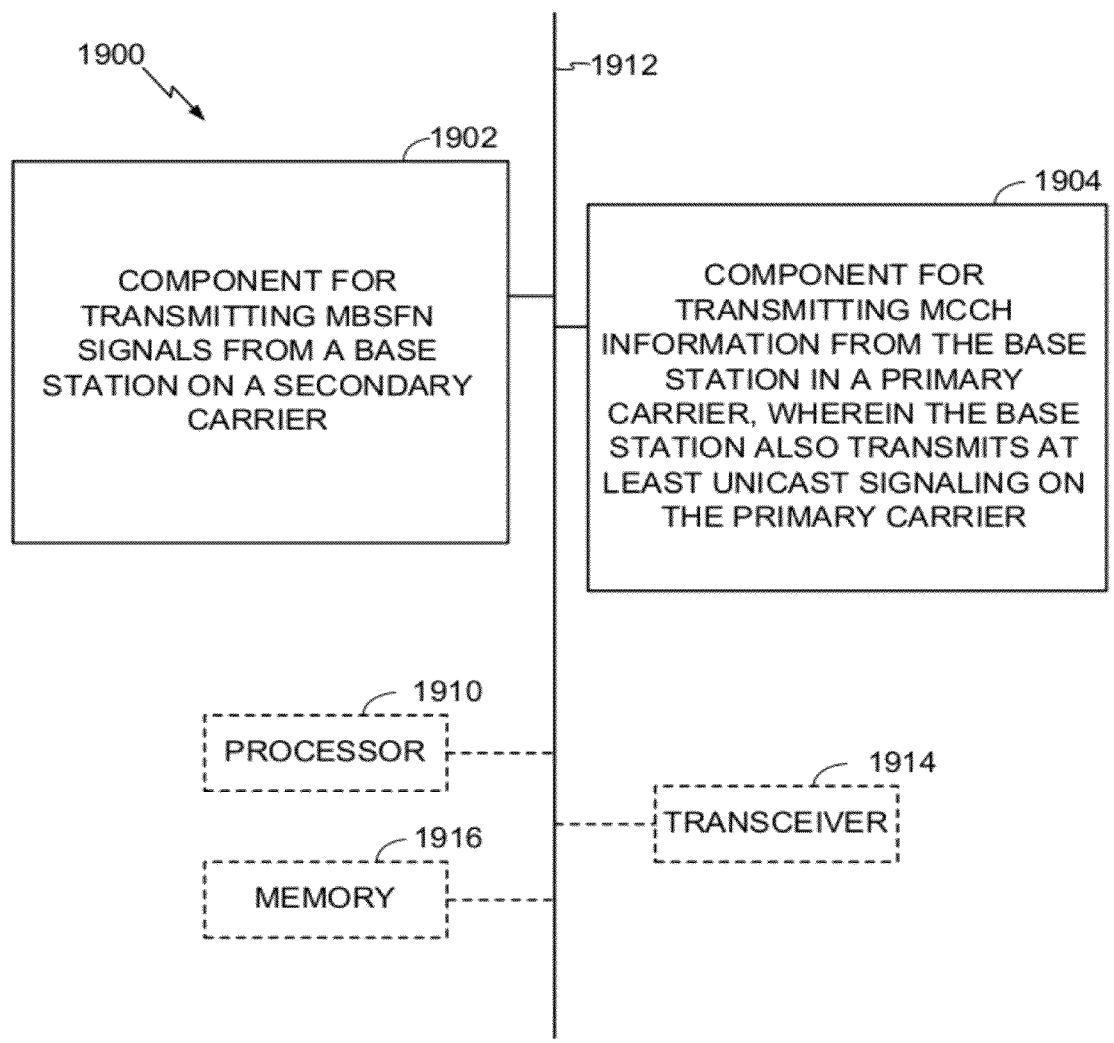
FIG. 19 illustrates an embodiment of an apparatus for transmitting eMBMS services using multiple carriers, in accordance with the methodologies of FIGS. 17-18.

With reference to FIG. 19, there is provided an exemplary apparatus 1900 that may be configured as a network entity in a wireless network, or as a processor or similar device for use within the network entity, for providing eMBMS. The apparatus 1900 may include functional blocks that can represent functions implemented by a processor, software, or combination thereof (e.g., firmware).

As illustrated, in one embodiment, the apparatus 1900 may include an electrical component or module 1902 for transmitting MBSFN signals from a base station to mobile entities on a secondary carrier. For example, the electrical component 1902 may include at least one control processor coupled to a transceiver or the like and to a memory with instructions for transmitting the MBSFN signals on the secondary carrier. The electrical component 1902 may be, or may include, a means for transmitting the MBSFN signals on the secondary carrier. Said means may include the control processor executing an algorithm. The algorithm may include, for example, preparing a multicast data stream for a secondary carrier, modulating a signal according to an MBSFN protocol, and transmitting the signal wirelessly on the secondary carrier.

The apparatus 1900 may include an electrical component 1904 for transmitting MCCH information from the base station on a primary carrier, wherein the base station also transmits at least unicast signaling on the primary carrier. For example, the electrical component 1904 may include at least one control processor coupled to a transceiver or the like and to a memory holding instructions for transmitting the MCCH information using the primary carrier. The electrical component 1904 may be, or may include, a means for transmitting MCCH information from the base station on a primary carrier, wherein the base station also transmits at least unicast signaling on the primary carrier. Said means may include the control processor executing an algorithm. The algorithm may include, for example, transmitting unicast signals on a primary carrier, obtaining the MCCH information of the secondary carrier, and transmitting the MCCH information wirelessly on the primary carrier. The apparatus 1900 may include similar electrical components for performing any or all of the additional operations 1800 described in connection with FIG. 18, which for illustrative simplicity are not shown in FIG. 19.

In related aspects, the apparatus 1900 may optionally include a processor component 1910 having at least one processor, in the case of the apparatus 1900 configured as a network entity. The processor 1910, in such case, may be in operative communication with the components 1902-1904 or similar components via a bus 1912 or similar communication coupling. The processor 1910 may effect initiation and scheduling of the processes or functions performed by electrical components 1902-1904. The processor 1910 may encompass the components 1902-1904, in whole or in part. In the alternative, the processor 1910 may be separate from the components 1902-1904, which may include one or more separate processors.

In further related aspects, the apparatus 1900 may include a radio transceiver component 1914. A stand alone receiver and/or stand alone transmitter may be used in lieu of or in conjunction with the transceiver 1914. In the alternative, or in addition, the apparatus 1900 may include multiple transceivers or transmitter/receiver pairs, which may be used to transmit and receive on different carriers. The apparatus 1900 may optionally include a component for storing information, such as, for example, a memory device/component 1916. The computer readable medium or the memory component 1916 may be operatively coupled to the other components of the apparatus 1900 via the bus 1912 or the like. The memory component 1916 may be adapted to store computer readable instructions and data for performing the activity of the components 1902-1904, and subcomponents thereof, or the processor 1910, the additional aspects 1800, or the methods disclosed herein. The memory component 1916 may retain instructions for executing functions associated with the components 1902-1904. While shown as being external to the memory 1916, it is to be understood that the components 1902-1904 can exist within the memory 1916.

A mobile entity may perform a method 2000 for receiving MBSFN signals on a secondary carrier, as shown in FIG. 20. The method 2000 may include, at 2010, a mobile entity receiving MBSFN signals transmitting from a base station on a secondary carrier. The method 2000 may further include, at 2020, receiving the MCCH information from the base station on a primary carrier, wherein the primary carrier also includes at least unicast signaling.

FIG. 21 shows further optional operations or aspects 2100 that may be performed by the mobile entity in conjunction with the method 2000 for receiving eMBMS information using multiple carriers of a wireless communications system. The operations shown in FIG. 21 are not required to perform the method 2000. Unless positioned directly on opposing branches off of an "in the alternative" diamond, operations can be independently performed and not mutually exclusive. Therefore any one of such operations may be performed regardless of whether another downstream or upstream operation is performed. If the method 2000 includes at least one operation of FIG. 20, then the method 2000 may terminate after the at least one operation, without necessarily having to include any subsequent downstream operation(s) that may be illustrated. Conversely, operations that are positioned directly on opposing branches off of an "in the alternative" diamond are expected to be mutually exclusive alternatives in any particular instance of the method.

Referring to FIG. 21, the method 2000 may further include, at 2105, the mobile entity decoding the MBSFN signals using the MCCH information. The method 2000 may further include, at 2110, the mobile entity receiving a PDCCH on the primary carrier to obtain notification of changes in the MCCH information. The method 2000 may further include, at 2120, the mobile entity transmitting a counting response to the base station in response to the MCCH information on the primary carrier. That is, the mobile entity may transmit the counting response on the primary carrier. In the alternative, the method 2000 may include, at 2130, the mobile entity transmitting a counting response to the base station in response to the MCCH information on an uplink carrier that is associated with the secondary carrier. That is, the mobile entity may transmit the response on some uplink carrier (not the anchor carrier) that is associated with the secondary carrier.

In general, with reference to FIGS. 15, 18 and 21, decision functionality associated with logical branching operations, like other operations depicted in these figures, may be implemented by software, hardware, a combination thereof or any other suitable means (e.g., device, system, process, or component). Thus, for example, branching decisions may be made during execution by an entity performing other aspects of the described method, may be predetermined by design prior to execution of other operations, or may be accomplished by some combination of the foregoing over the various branching operations.

Figure 22:
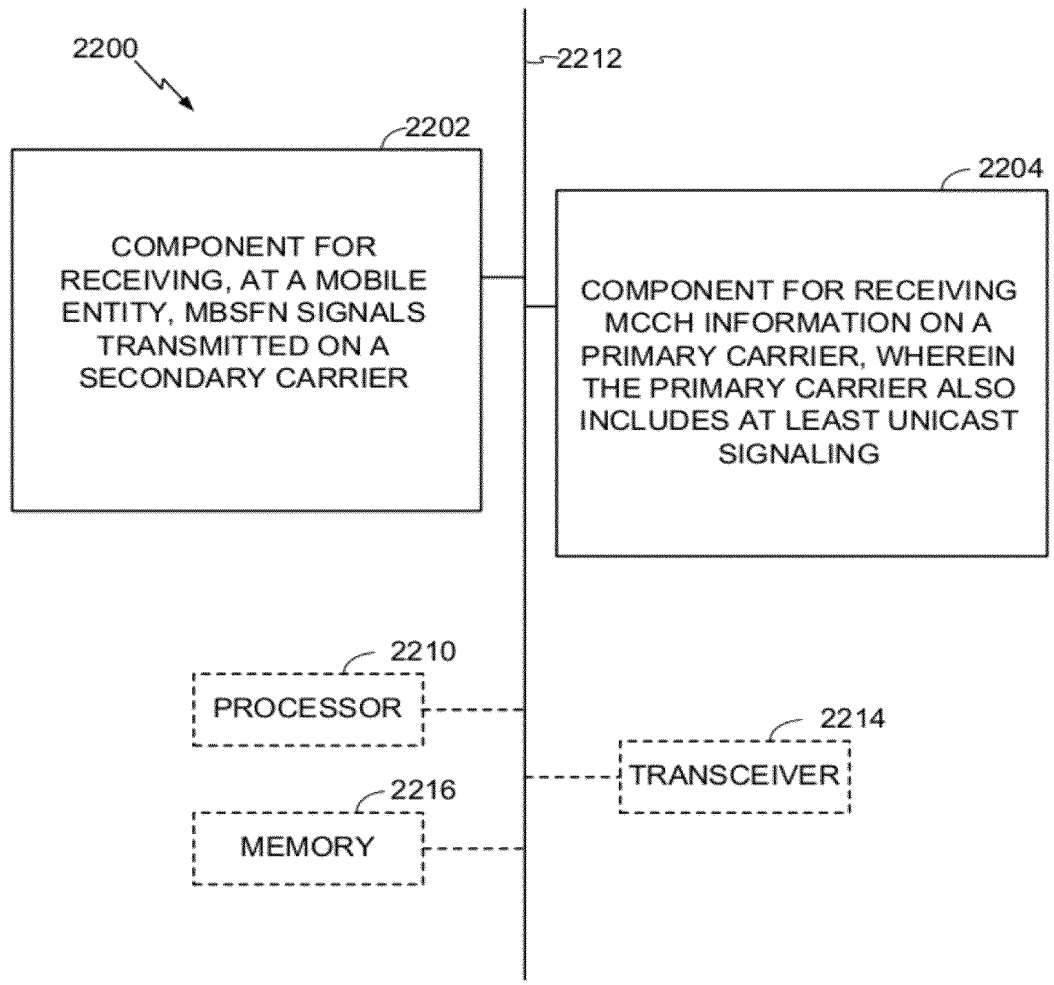
FIG. 22 illustrates an embodiment of an apparatus for receiving eMBMS services using multiple carriers, in accordance with the methodologies of FIGS. 20-21.

With reference to FIG. 22, there is provided an exemplary apparatus 2200 that may be configured as a mobile entity or UE in a wireless network, or as a processor or similar device for use within the ME or UE, for receiving an eMBMS on a secondary carrier. The apparatus 2200 may include functional blocks that can represent functions implemented by a processor, software, or combination thereof (e.g., firmware).

In one embodiment, the apparatus 2200 may include an electrical component or module 2202 for receiving MBSFN signals at a mobile entity on a secondary carrier. For example, the electrical component 2202 may include at least one control processor coupled to a transceiver or the like and to a memory with instructions for receiving and processing eMBMS signaling over a secondary one of multiple carriers. The electrical component 2202 may be, or may include, a means for receiving MBSFN signals at a mobile entity on a secondary carrier. Said means may include the control processor executing an algorithm. The algorithm may include, for example, receiving a signal on a secondary carrier, and demodulating the signal according to an MBSFN protocol to obtain demodulated data.

The apparatus 2200 may include an electrical component 2204 for receiving MCCH information on a primary carrier, wherein the primary carrier also includes at least unicast signaling. For example, the electrical component 2204 may include at least one control processor coupled to a transceiver or the like and to a memory holding instructions for receiving the MCCH information on the anchor carrier. The electrical component 2204 may be, or may include, a means for receiving MCCH information on a primary carrier, wherein the primary carrier also includes at least unicast signaling. Said means may include the control processor executing an algorithm. The algorithm may include, for example, receiving unicast signaling on a primary carrier, receiving control signaling on the primary carrier, and identifying the MCCH information for the secondary carrier MCCH in the control signaling. The apparatus 2200 may include similar electrical components for performing any or all of the additional operations 2100 described in connection with FIG. 21, which for illustrative simplicity are not shown in FIG. 22.

In related aspects, the apparatus 2200 may optionally include a processor component 2210 having at least one processor, in the case of the apparatus 2200 configured as a mobile entity. The processor 2210, in such case, may be in operative communication with the components 2202-2204 or similar components via a bus 2212 or similar communication coupling. The processor 2210 may effect initiation and scheduling of the processes or functions performed by electrical components 2202-2204. The processor 2210 may encompass the components 2202-2204, in whole or in part. In the alternative, the processor 2210 may be separate from the components 2202-2204, which may include one or more separate processors.

In further related aspects, the apparatus 2200 may include a radio transceiver component 2214. A stand alone receiver and/or stand alone transmitter may be used in lieu of or in conjunction with the transceiver 2214. In the alternative, or in addition, the apparatus 2200 may include multiple transceivers or transmitter/receiver pairs, which may be used to transmit and receive on different carriers. The apparatus 2200 may optionally include a component for storing information, such as, for example, a memory device/component 2216. The computer readable medium or the memory component 2216 may be operatively coupled to the other components of the apparatus 2200 via the bus 2212 or the like. The memory component 2216 may be adapted to store computer readable instructions and data for performing the activity of the components 2202-2204, and subcomponents thereof, or the processor 2210, or the additional aspects 2100, or the methods disclosed herein. The memory component 2216 may retain instructions for executing functions associated with the components 2202-2204. While shown as being external to the memory 2216, it is to be understood that the components 2202-2204 can exist within the memory 2216.

Certain aspects may also relate to optimizing subframe allocation when multiple carriers are used for carrying MBSFN information. To this end, a network entity may perform a method 2300 for subframe allocation, as shown in FIG. 23. The network entity may be, for example, an eNB, Home Node B, or other base station for a wireless communications system. The method 2300 may include, at 2310, the base station allocating at least a portion of one or more subframes otherwise reserved for unicast signals on a mixed carrier, to provide an increased allocation of subframes carrying MBSFN information. The method 2300 may further comprise, at 2320, the base station transmitting MBSFN signals using the increased allocation.

Figure 25:
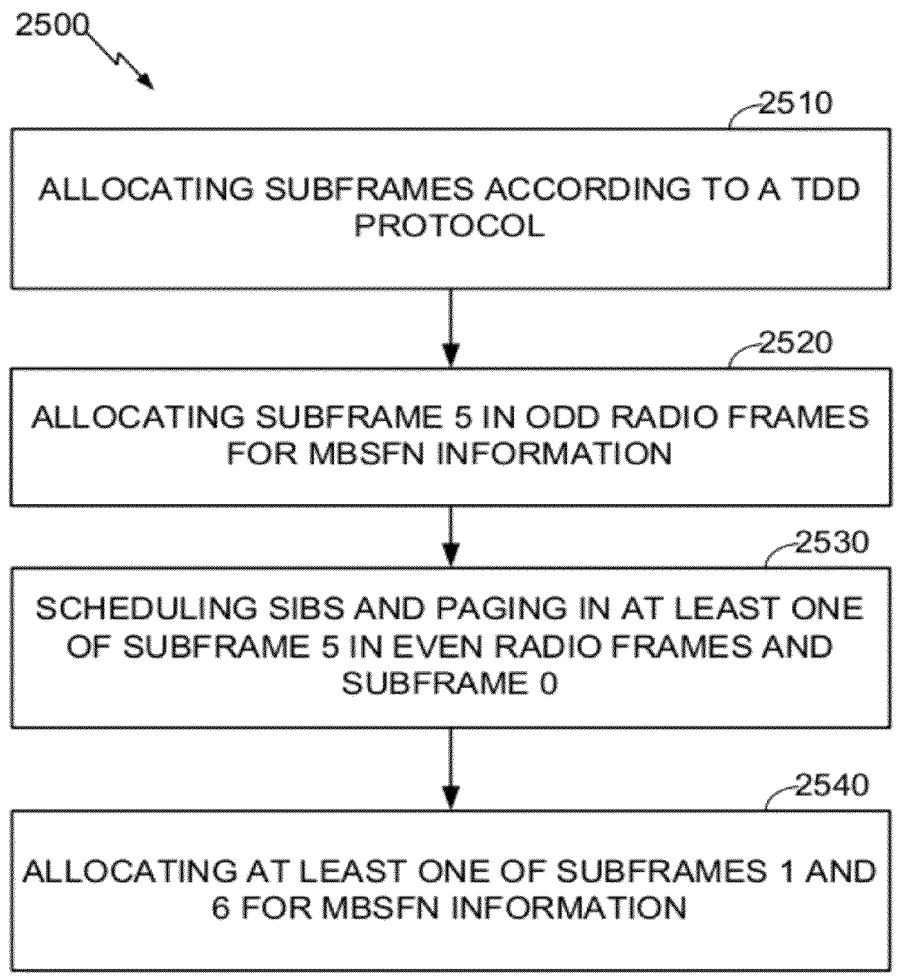
Figure 26:
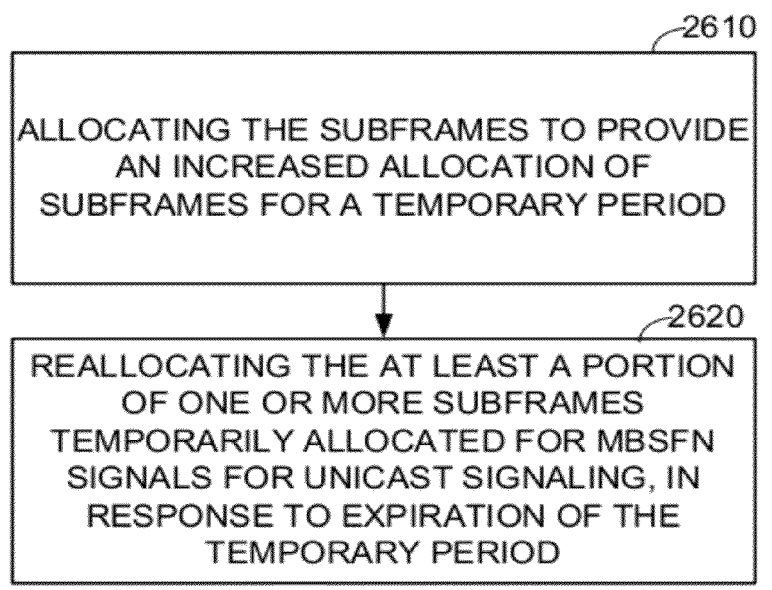

FIGS. 24-26 shows further optional operations or aspects 2400, 2500, 2600 that may be performed by the source base station in conjunction with the method 2300 for subframe allocation. The operations shown in FIGS. 24-26 are not required to perform the method 2300. The operations 2400, 2500 or 2600 can be independently performed and are not mutually exclusive. Therefore any one of such operations may be performed regardless of whether another downstream or upstream operation is performed. If the method 2300 includes at least one operation of FIGS. 24-26, then the method 2300 may terminate after the at least one operation, without necessarily having to include any subsequent downstream operation(s) that may be illustrated.

FIG. 24 provides more specific examples of subframe allocation operations 2400 as defined more generally at the operation 2310. The operations 2400 are adapted for use with a Frequency Division Duplex (FDD) protocol. The method 2300 may include, at 2410, allocating subframes according to an FDD protocol. The method 2300 may include, at 2420, allocating subframe 5 in odd-numbered FDD radio frames for MBSFN information. The method 2300 may include, at 2430, scheduling SIBs and paging in at least one of: subframe 5 in even-numbered radio frames and subframe 0. The method 2300 may include, at 2440, allocating at least one of subframes 4 and 9 for MBSFN information.

In the alternative, or in addition, the method 2300 may implement subframe allocation as shown in FIG. 25, using the operations 2500 adapted for a Time Division Duplex (TDD) protocol. The method 2300 may include, at 2510, allocating subframes according to a TDD protocol. The method 2300 may include, at 2520, allocating subframe 5 in odd-numbered TDD radio frames for MBSFN information. The method 2300 may include, at 2530, scheduling SIBs and paging in at least one of: subframe 5 in even-numbered radio frames and subframe 0. The method 2300 may include, at 2540, allocating at least one of subframes 1 and 6 for MBSFN information.

Release 10 does not support aggregation of FDD and TDD protocols. Therefore, the method 2300 if practiced under Release 10 may include operations 2400 for the FDD protocol or operations 2500 for the TDD protocol, but generally will not include operations for both TDD and FDD protocols at the same network entity. Future releases may support aggregating support for FDD and TDD protocols, in which the network entity may use either of, or both of, FDD and TDD protocols for different carriers, different times, or different locations. In such implementations, the operations 2400 and 2500 may be selected to match the protocol used for a particular carrier at a particular time or place.

Method 2300 may further include additional operations 2600 as shown in FIG. 26. The method 2300 may further include, at 2610, allocating the subframes to provide an increased allocation of subframes for MBSFN use for a temporary period. For example, a base station may receive a signal indicating that a mixed carrier should increase subframes allocated for MBSFN for a defined time period. The base station may perform the operation 2610 at initiation of the defined time period. The method 2300 may further include, at 2620, reallocating the at least a portion of one or more subframes otherwise reserved for unicast and temporarily allocated to MBSFN signals for unicast signaling, in response to expiration of the temporary period.

The method 2300 includes providing an increased allocation of subframes carrying MBSFN information. The increased allocation is not necessarily static, and the network entity may increase or decrease the allocation in response to various factors such as relative demand for unicast or multicast services, for example as indicated by the operations 2610 and 2620 described above. Accordingly, the network entity may transmit signals for informing mobile entities of current subframe allocation for a particular carrier. According to a first alternative for use in single-carrier embodiments, the network entity may transmit MBSFN allocation through SIB2 and the actual MBMS service allocation through SIB13 and later on via MCCH/MSI. In the alternative, for use in multiple carrier embodiments, the network entity may transmit SIB2 signaling on secondary carriers through dedicated signaling, while transmitting the actual MBMS service allocation through SIB13 and later on via MCCH/MSI on the primary carrier, as in single-carrier embodiments.

Figure 27:
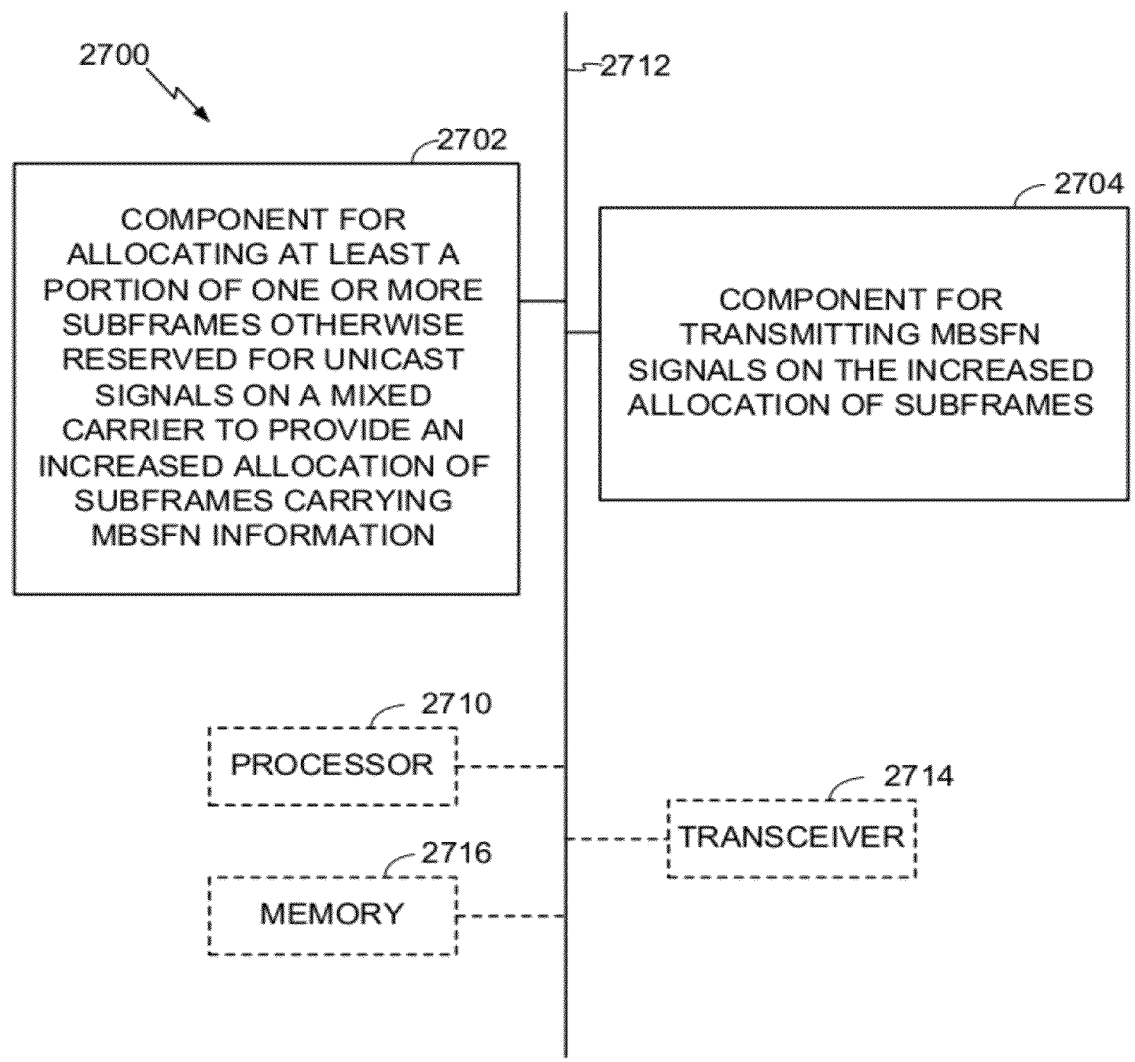
FIG. 27 illustrates an embodiment of an apparatus for allocating subframes used for eMBMS services, in accordance with the methodologies of FIGS. 23-26.

With reference to FIG. 27, there is illustrated an exemplary apparatus 2700 that may be configured as a network entity in a wireless network, or as a processor or similar device for use within the network entity, for providing eMBMS. The apparatus 2700 may include functional blocks that can represent functions implemented by a processor, software, or combination thereof (e.g., firmware).

As illustrated, in one embodiment, the apparatus 2700 may include an electrical component or module 2702 for allocating at least a portion of one or more subframes otherwise reserved for unicast signals on a mixed carrier to provide an increased allocation of subframes carrying MBSFN information. For example, the electrical component 2702 may include at least one control processor coupled to a transceiver or the like and to a memory with instructions for allocating the subframes. The electrical component 2702 may be, or may include, a means for allocating at least a portion of one or more subframes otherwise reserved for unicast signals on a mixed carrier to provide an increased allocation of subframes carrying MBSFN information. Said means may include the control processor executing an algorithm. The algorithm may include, for example, allocating subframes according to a TDD or FDD protocol, and allocating MBSFN information to selected subframes based on whether an FDD or TDD protocol is used. The algorithm may further include, for example, allocating subframes according to any of the more detailed algorithms disclosed above, for example, at blocks 2420, 2430, 2440, 2520, 2530, or 2540.

The apparatus 2700 may include an electrical component 2704 for transmitting MBSFN signals using the increased allocation. For example, the electrical component 2704 may include at least one control processor coupled to a transceiver or the like and to a memory holding instructions for transmitting the MBSFN signals. The electrical component 2704 may be, or may include, a means for transmitting MBSFN signals using the increased allocation. Said means may include the control processor executing an algorithm. The algorithm may include, for example, providing subframes with the increased allocation to a transmit chain of a primary carrier, and transmitting the subframes using the transmit chain. The apparatus 2700 may include similar electrical components for performing any or all of the additional operations 2400-2600 described in connection with FIGS. 24-26, which for illustrative simplicity are not shown in FIG. 27.

In related aspects, the apparatus 2700 may optionally include a processor component 2710 having at least one processor, in the case of the apparatus 2700 configured as a network entity. The processor 2710, in such case, may be in operative communication with the components 2702-2704 or similar components via a bus 2712 or similar communication coupling. The processor 2710 may effect initiation and scheduling of the processes or functions performed by electrical components 2702-2704. The processor 2710 may encompass the components 2702-2704, in whole or in part. In the alternative, the processor 2710 may be separate from the components 2702-2704, which may include one or more separate processors.

In further related aspects, the apparatus 2700 may include a radio transceiver component 2714. A stand alone receiver and/or stand alone transmitter may be used in lieu of or in conjunction with the transceiver 2714. In the alternative, or in addition, the apparatus 2700 may include multiple transceivers or transmitter/receiver pairs, which may be used to transmit and receive on different carriers. The apparatus 2700 may optionally include a component for storing information, such as, for example, a memory device/component 2716. The computer readable medium or the memory component 2716 may be operatively coupled to the other components of the apparatus 2700 via the bus 2712 or the like. The memory component 2716 may be adapted to store computer readable instructions and data for performing the activity of the components 2702-2704, and subcomponents thereof, or the processor 2710, the additional aspects 2400, 2500, or 2600, or the methods disclosed herein. The memory component 2716 may retain instructions for executing functions associated with the components 2702-2704. While shown as being external to the memory 2716, it is to be understood that the components 2702-2704 can exist within the memory 2716.

A mobile entity may perform a method 2800 for decoding a subframe allocation, as shown in FIG. 28. The method 2800 may include, at 2810, the mobile entity determining that an MBSFN signal has an increased allocation of subframes carrying MBSFN information, wherein one or more subframes previously reserved for unicast signals is allocated instead to multicast signals. Subframe allocation for the MBSFN signal may change in response to various factors, as noted above. According to a first alternative for use in single-carrier embodiments, the mobile entity may determine MBSFN allocation from SIB2 and the actual MBMS service allocation from SIB13 and later via MCCH/MSI. In the alternative, for use in multiple carrier embodiments, the mobile entity may decode SIB2 signaling received on secondary carriers via dedicated signaling to determine the subframe allocation, while obtaining the actual MBMS service allocation through SIB13 and later via MCCH/MSI on the primary carrier. The method 2800 may further comprise, at 2820, the mobile entity decoding the MBSFN signal according to the increased allocation to provide a multicast content output.

FIGS. 29-31 show further optional operations or aspects 2900, 3000, 3100 that may be performed by the mobile entity in conjunction with the method 2800 for using subframe allocation. The operations shown in FIGS. 29-31 are not required to perform the method 2800. The operations 2900, 3000 and 3100 can be independently performed and are not mutually exclusive. Therefore any one of such operations may be performed regardless of whether another downstream or upstream operation is performed. If the method 2800 includes at least one operation of FIGS. 29-31, then the method 2800 may terminate after the at least one operation, without necessarily having to include any subsequent downstream operation(s) that may be illustrated.

FIG. 29 illustrates specific examples of decoding subframes according to an increased MBSFN allocation in a mixed carrier, using the operations 2900 for an FDD protocol. The method 2800 may include, at 2910, decoding subframes according to an FDD protocol. The method 2800 may include, at 2920, decoding subframe 5 in odd-numbered FDD radio frames for MBSFN information. The method 2800 may include, at 2930, decoding SIBs and paging in at least one of: subframe 5 in even-numbered radio frames and subframe 0.

The method 2800 may include, at 2940, decoding at least one of subframes 4 and 9 for MBSFN information.

In the alternative, or in addition, the method 2800 may implement subframe allocation as shown in FIG. 30, using the operations 3000 for a TDD protocol. The method 2800 may include, at 3010, decoding subframes according to a TDD protocol. The method 2800 may include, at 3020, decoding subframe 5 in odd-numbered TDD radio frames for MBSFN information. The method 2800 may include, at 3030, decoding SIBs and paging in at least one of: subframe 5 in even-numbered radio frames and subframe 0. The method 2800 may include, at 3040, decoding at least one of subframes 1 and 6 for MBSFN information.

As noted above, Release 10 does not support aggregation of FDD and TDD protocols. Therefore, the method 2800 if practiced under Release 10 may include operations 2900 for the FDD protocol or operations 3000 for the TDD protocol, but generally will not include operations for both TDD and FDD protocols at the same mobile entity. Future releases may support aggregating support for FDD and TDD protocols, in which the mobile entity may use either of, or both of, FDD and TDD protocols for different carriers, different times, or different locations. In such implementations, the operations 2900 and 3000 may be selected to match the protocol used for a particular carrier at a particular time or place.

Method 2800 may further include additional operations 3100 as shown in FIG. 31. The method 2800 may further include, at 3110, decoding the subframes to obtain an increased allocation of subframes to the MBSFN signals to accommodate a temporary period of dedicated use of the mixed carrier for MBSFN. The method 2800 may further include, at 3120, decoding the at least a portion of one or more subframes otherwise reserved for unicast signals and temporarily allocated to the MBSFN signals for unicast signaling, in response to expiration of the temporary period.

Figure 32:
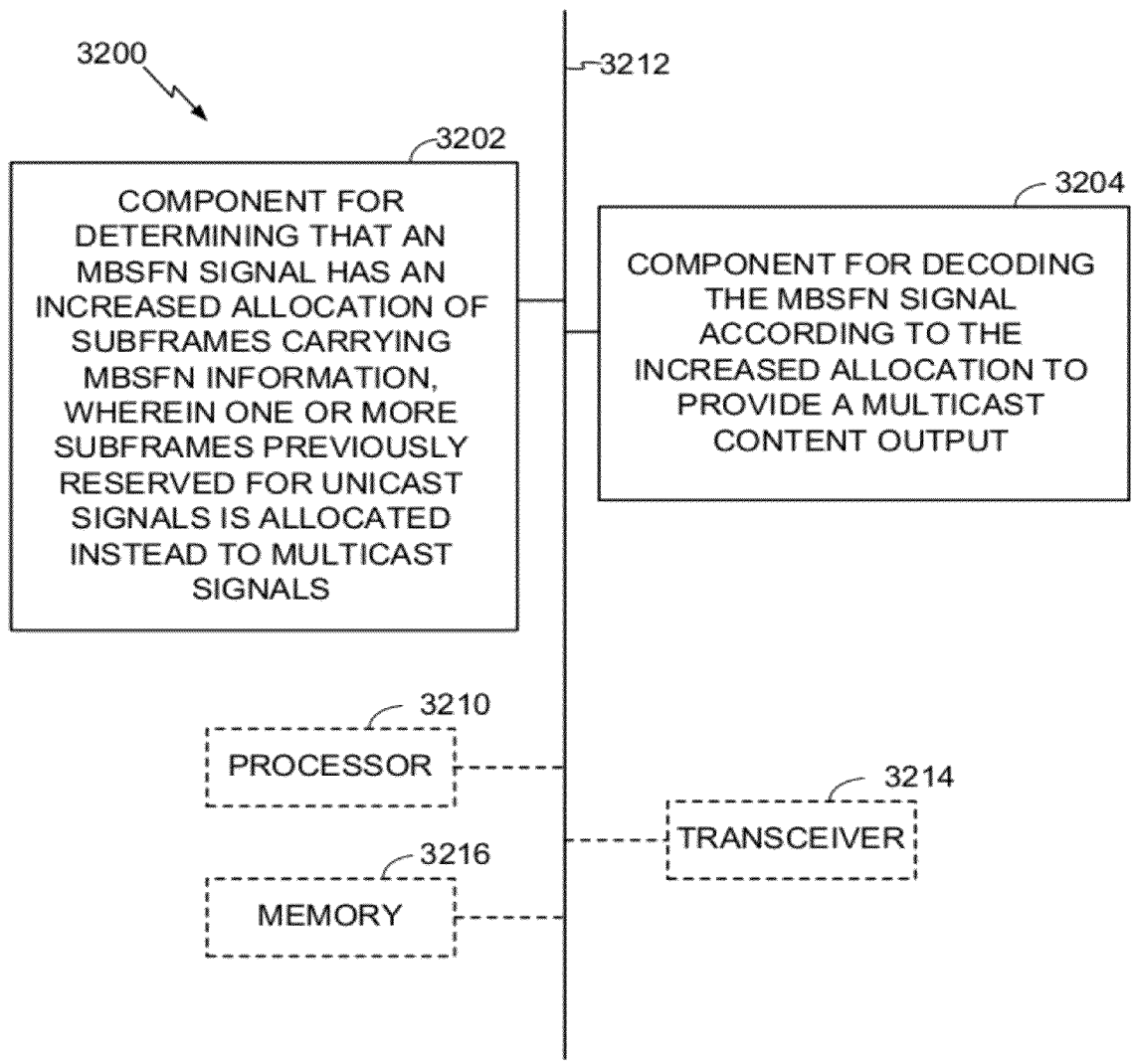
FIG. 32 illustrates an embodiment of an apparatus for decoding subframes used for eMBMS services, in accordance with the methodologies of FIGS. 29-31.

With reference to FIG. 32, there is provided an exemplary apparatus 3200 that may be configured as a mobile entity in a wireless network, or as a processor or similar device for use within the mobile entity, for decoding eMBMS subframes. The apparatus 3200 may include functional blocks that can represent functions implemented by a processor, software, or combination thereof (e.g., firmware).

As illustrated, in one embodiment, the apparatus 3200 may include an electrical component or module 3202 for determining that an MBSFN signal has an increased allocation of subframes carrying MBSFN information, wherein one or more subframes previously reserved for unicast signals is allocated instead to multicast signals. For example, the electrical component 3202 may include at least one control processor coupled to a transceiver or the like and to a memory with instructions for determining a subframe allocation for an MBSFN signal. The electrical component 3202 may be, or may include, a means for determining that an MBSFN signal has an increased allocation of subframes carrying MBSFN information, wherein one or more subframes previously reserved for unicast signals is allocated instead to multicast signals. Said means may include the control processor executing an algorithm. The algorithm may include, for example, receiving a multicast control signal on the primary carrier, interpreting the control signal as an instruction that the MBSFN signal will change to an increased allocation for multicast signal state at a particular time, and detecting the time.

The apparatus 3200 may include an electrical component 3204 for decoding the MBSFN signal according to the increased allocation to provide a multicast content output. For example, the electrical component 3204 may include at least one control processor coupled to a transceiver or the like and to a memory holding instructions for decoding the MBSFN signals to provide output, e.g., audio-video output of the MBMS content. The electrical component 3204 may be, or may include, a means for decoding the MBSFN signal according to the increased allocation to provide a multicast content output. Said means may include the control processor executing an algorithm. The algorithm may include, for example, receiving a MBSFN signal via a receive chain, and decoding MBSFN information from selected subframes based on whether an FDD or TDD protocol is used. The algorithm may further include, for example, decoding subframes according to any of the more detailed algorithms disclosed above, for example, at blocks 2920, 2930, 2940, 3020, 3030, or 3040. The apparatus 3200 may include similar electrical components for performing any or all of the additional operations 2900-3100 described in connection with FIGS. 29-31, which for illustrative simplicity are not shown in FIG. 32.

In related aspects, the apparatus 3200 may optionally include a processor component 3210 having at least one processor, in the case of the apparatus 3200 configured as a mobile entity. The processor 3210, in such case, may be in operative communication with the components 3202-3204 or similar components via a bus 3212 or similar communication coupling. The processor 3210 may effect initiation and scheduling of the processes or functions performed by electrical components 3202-3204. The processor 3210 may encompass the components 3202-3204, in whole or in part. In the alternative, the processor 1210 may be separate from the components 3202-3204, which may include one or more separate processors.

In further related aspects, the apparatus 3200 may include a radio transceiver component 3214. A stand alone receiver and/or stand alone transmitter may be used in lieu of or in conjunction with the transceiver 3214. In the alternative, or in addition, the apparatus 3200 may include multiple transceivers or transmitter/receiver pairs, which may be used to transmit and receive on different carriers. The apparatus 3200 may optionally include a component for storing information, such as, for example, a memory device/component 3216. The computer readable medium or the memory component 3216 may be operatively coupled to the other components of the apparatus 3200 via the bus 3212 or the like. The memory component 3216 may be adapted to store computer readable instructions and data for performing the activity of the components 3202-3204, and subcomponents thereof, or the processor 3210, the additional aspects 2900, 3000, or 3100, or the methods disclosed herein. The memory component 3216 may retain instructions for executing functions associated with the components 3202-3204. While shown as being external to the memory 3216, it is to be understood that the components 3202-3204 can exist within the memory 3216.

Figure 33:
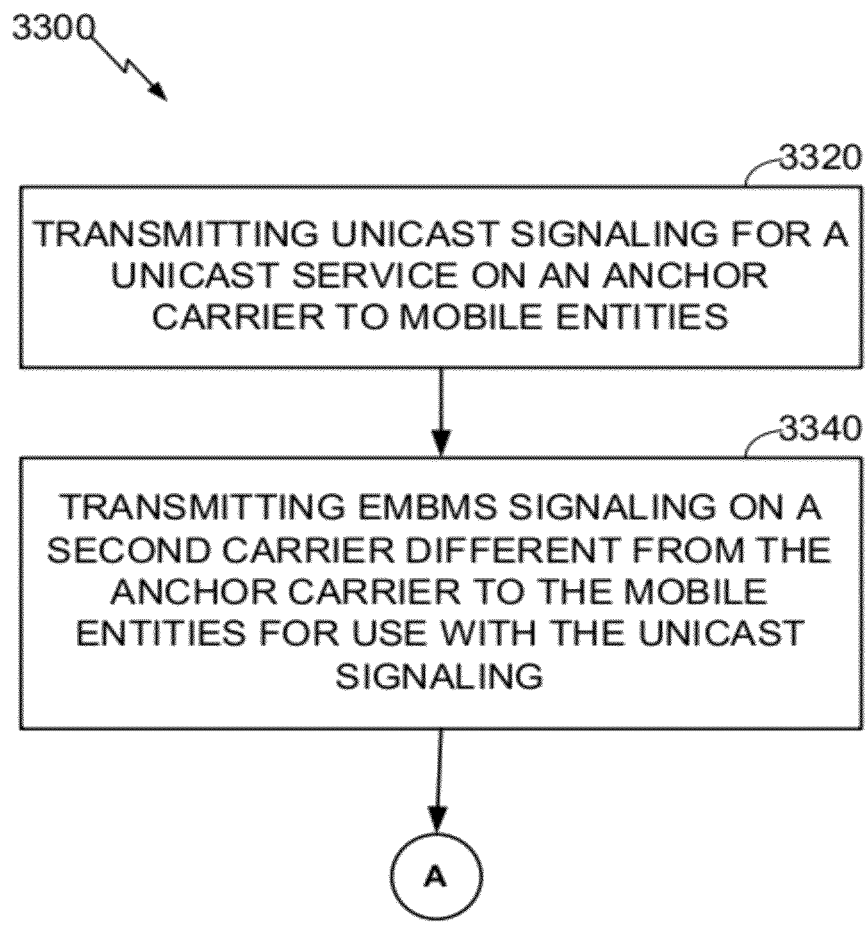
FIG. 33 illustrates an embodiment of a methodology for eMBMS enhancements using carrier aggregation, performed at a network entity.

FIG. 33 shows a method 3300 for providing eMBMS using at least one network entity of a wireless communications system. The network entity may include an eNB of any of the various forms described herein. The method 3300 may include the network entity transmitting, at 3320, unicast signaling for a unicast service on an anchor carrier to mobile entities. The mobile entities may each comprise a UE associated with a subscriber of the wireless communication system. The method 3300 may further include the network entity transmitting, at 3340, eMBMS signaling on a second carrier different from the anchor carrier to the mobile entities for use with the unicast signaling. All described transmissions may be performed wirelessly in accordance with one or more protocols described herein.

Figure 34:
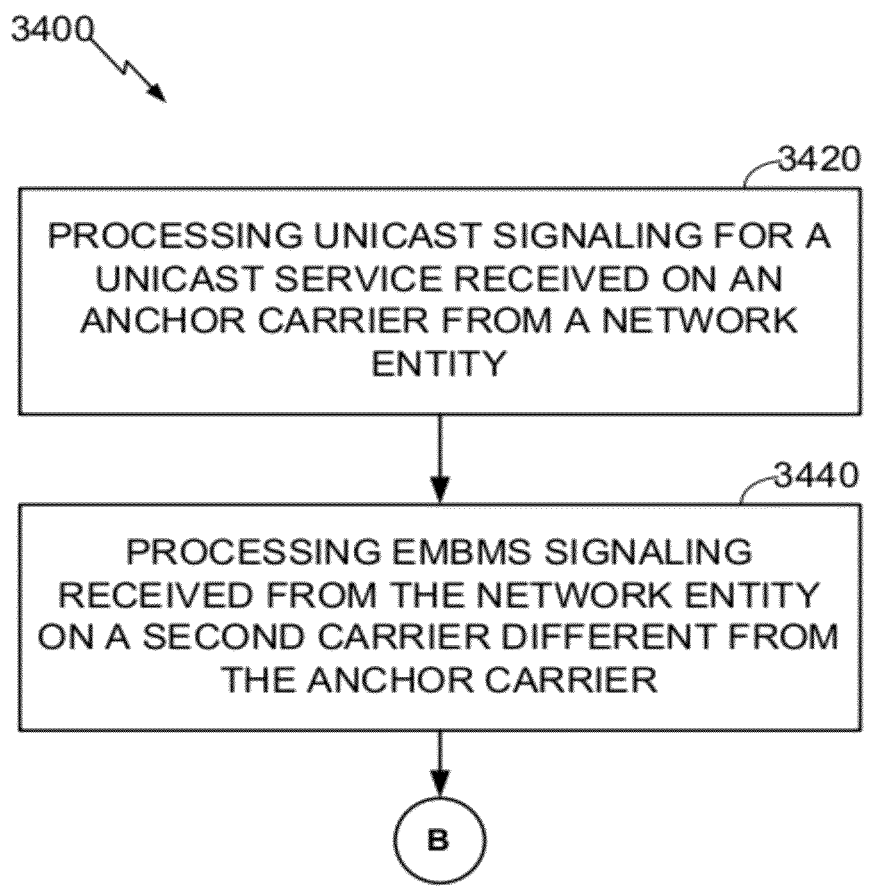
FIG. 34 illustrates an embodiment of a methodology for eMBMS enhancements using carrier aggregation, performed at a mobile entity.

Correspondingly, FIG. 34 shows a method 3400 for receiving eMBMS using at least one mobile entity of a wireless communications system. The mobile entity may include a UE associated with a subscriber of the wireless communication system. The method 3400 may include the mobile entity processing, at 3420, unicast signaling for a unicast service received on an anchor carrier from a network entity. The network entity may comprise a node B of any of the various forms described herein. The method 3400 may further include the mobile entity processing, at 3440, eMBMS signaling received from the network entity on a second carrier different from the anchor carrier. The mobile entity may receive all signaling wirelessly in accordance with one or more protocols described herein.

Figure 35A:
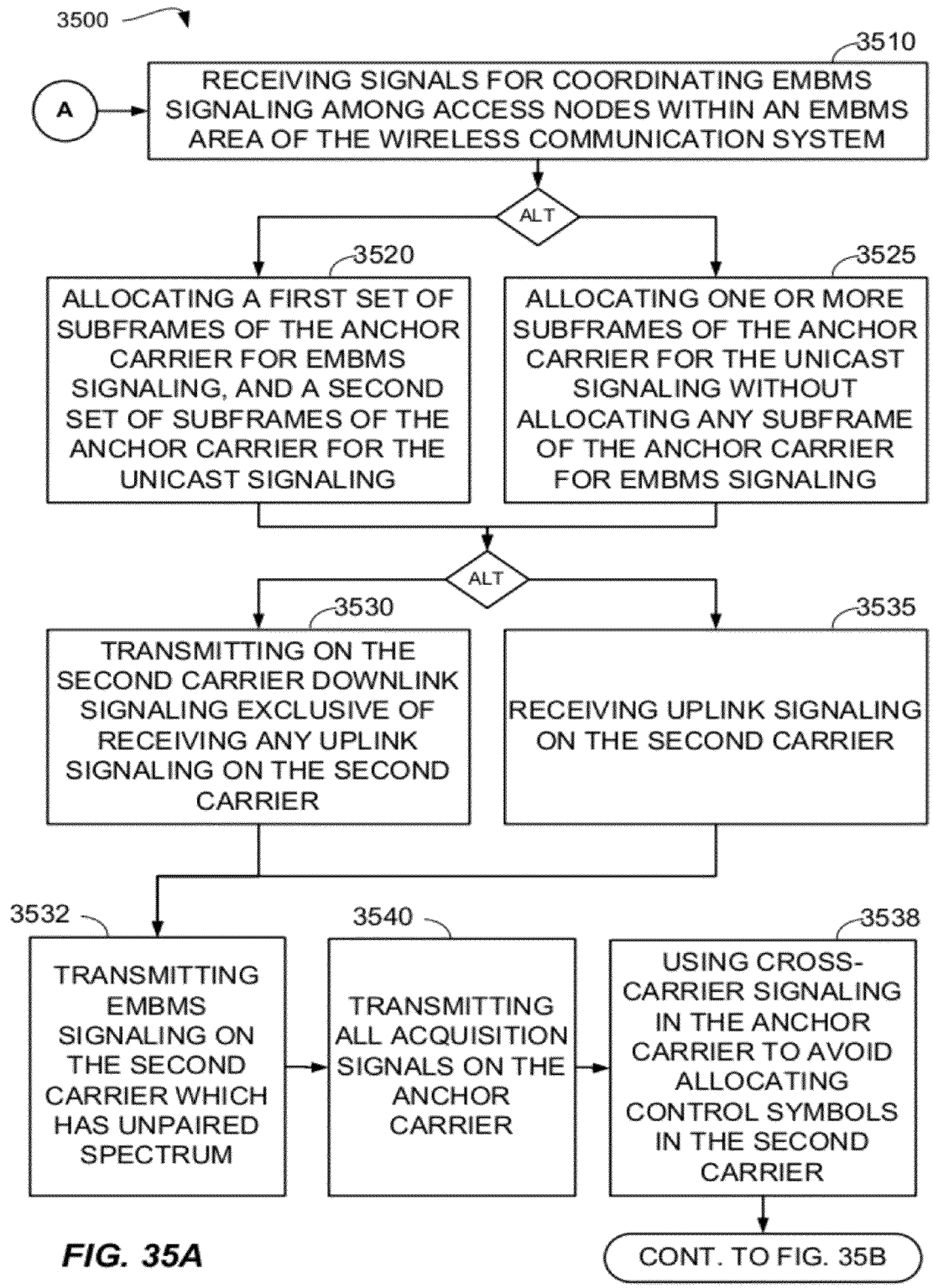
FIGS. 35A-B show further aspects of the methodology of FIG. 33.
Figure 35B:
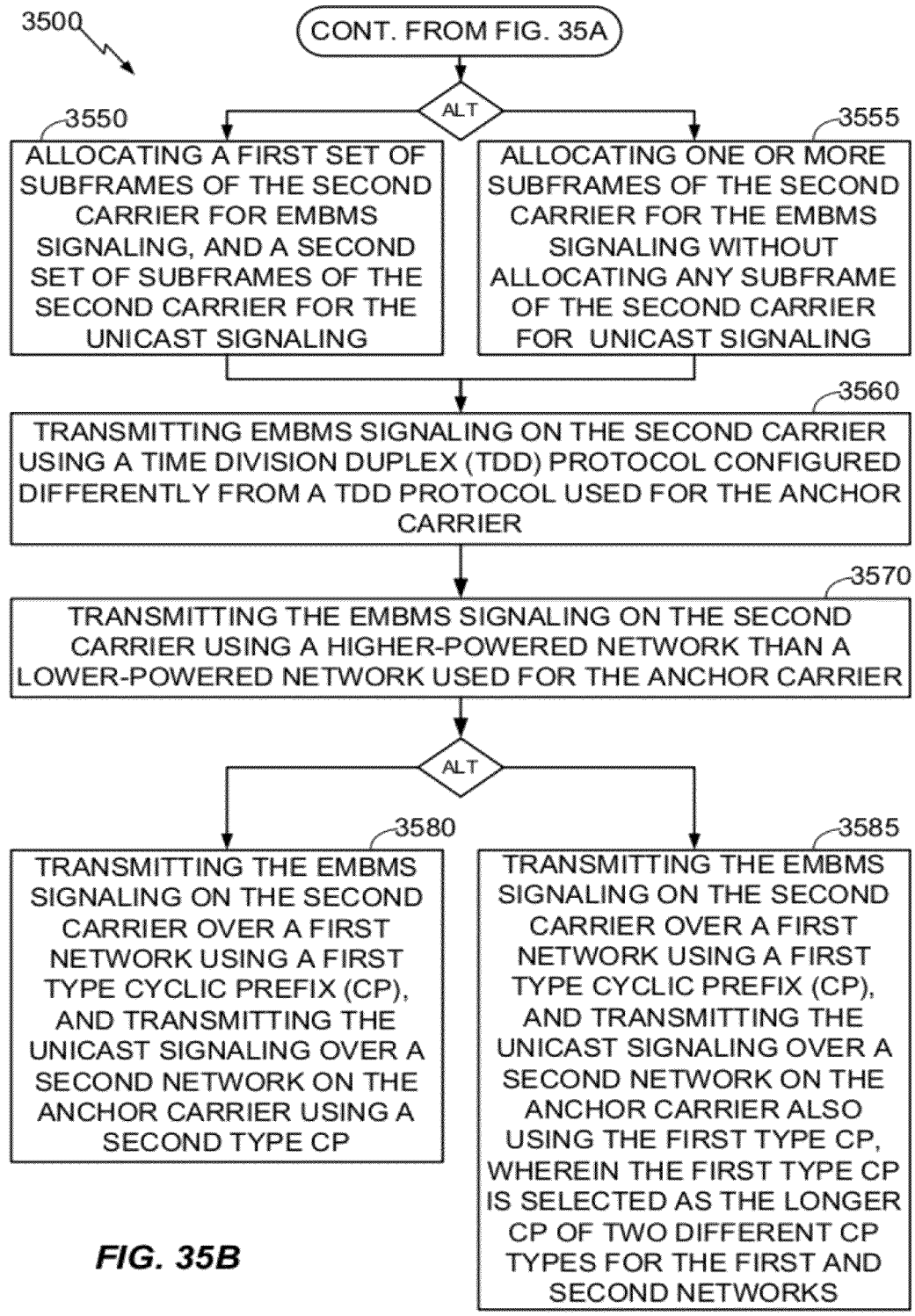

FIGS. 35A and 35B show further optional operations or aspects 3500 that may be performed by the network entity in conjunction with the method 3300 for providing eMBMS using at least one network entity of a wireless communications system. The blocks shown in FIGS. 35A and 35B are not required to perform the method 3300. Unless positioned directly on opposing branches off of an "in the alternative" diamond, blocks can be independently performed and are not mutually exclusive. Therefore any one of such blocks may be performed regardless of whether another downstream or upstream block is performed. If the method 3300 includes at least one block of FIGS. 35A and 35B, then the method 3300 may terminate after the at least one block, without necessarily having to include any subsequent downstream block(s) that may be illustrated. Conversely, blocks that are positioned directly on opposing branches off of an "in the alternative" diamond are expected to be mutually exclusive alternatives in any particular instance of the method.

The method 3300 may further include, at 3510, the network entity receiving signals for coordinating eMBMS signaling among access nodes within an eMBMS area of the wireless communication system. The method 3300 may further include, at 3520, the network entity allocating a first set of subframes of the anchor carrier for eMBMS signaling, and a second set of subframes of the anchor carrier for the unicast signaling. The first set of subframes and the second set of subframes should not share any common members. In the alternative to block 3520, the method 3300 may further include, at 3525, the network entity allocating subframes of the anchor carrier for the unicast signaling without allocating any subframe of the anchor carrier for eMBMS signaling. These alternatives are configurable by the network entity (e.g., an eNB) and delivered to the mobile entity, for example, via a Paging Control Channel (PCCH) broadcast in system information block 13.

In addition to either case of blocks 3520 and 3530, according to another alternative 3528, the method 3300 may further include, at 3530, the network entity transmitting on the second carrier downlink signaling exclusive of receiving any uplink signaling on the second carrier. Conversely, in the alternative to block 3530, the method 3300 may further include, at 3535, the network entity receiving uplink signaling on the second carrier.

Compatible with either of the foregoing cases 3530 or 3535, the method 3300 may include, at 3532, the network entity transmitting eMBMS signaling on the second carrier which has unpaired spectrum. As used herein, an "unpaired spectrum" refers to radio spectrum that does not use separately allocated spectrum for uplink and downlink signaling, and therefore uses the same spectrum for uplink, downlink, or both. This is in contrast to paired spectrum, which uses different spectrum for uplink and downlink. In the alternative to 3532, the network entity does not transmit eMBMS signaling on the second carrier. In the alternative, or in addition, the method 3300 may further include, at 3538, using cross-carrier signaling in the anchor carrier to avoid allocating control symbols in the second carrier. In the alternative, or in addition, the method 3300 may further include, at 3540, the network entity transmitting all acquisition signals on the anchor carrier.

Referring now to FIG. 35B, according to a first alternative, the method 3300 may further include, at 3550, the network entity allocating a first set of subframes of the second carrier for eMBMS signaling, and a second set of subframes of the second carrier for the unicast signaling. The first set of subframes and the second set of subframes should not share any common members. In the alternative 3552 to block 3550, the method 3300 may further include, at 3555, the network entity allocating subframes of the second carrier for the eMBMS signaling without allocating any subframe of the second carrier for unicast signaling. The method 3300 may further include, at 3560, the network entity transmitting eMBMS signaling on the second carrier using a time division duplex (TDD) protocol configured differently from a TDD protocol used for the anchor carrier. This may be done to increase downlink capacity of the second carrier. The method 3300 may further include, at 3570, the network entity transmitting the eMBMS signaling on the second carrier using a higher-powered network than a lower-powered network used for the anchor carrier.

In another alternative, the method 3300 may further include, at 3580, the network entity transmitting the eMBMS signaling on the second carrier over a first network using a first type cyclic prefix (CP), and transmitting the unicast signaling over a second network on the anchor carrier using a second type CP, different from the first type CP. In the alternative to block 3580, the method 3300 may further include, at 3585, the network entity transmitting the eMBMS signaling on the second carrier over a first network using a first type cyclic prefix (CP), and transmitting the unicast signaling over a second network on the anchor carrier also using the first type CP, wherein the first type CP is selected as the longer CP of two different CP types for the first and second networks.

Figure 36A:
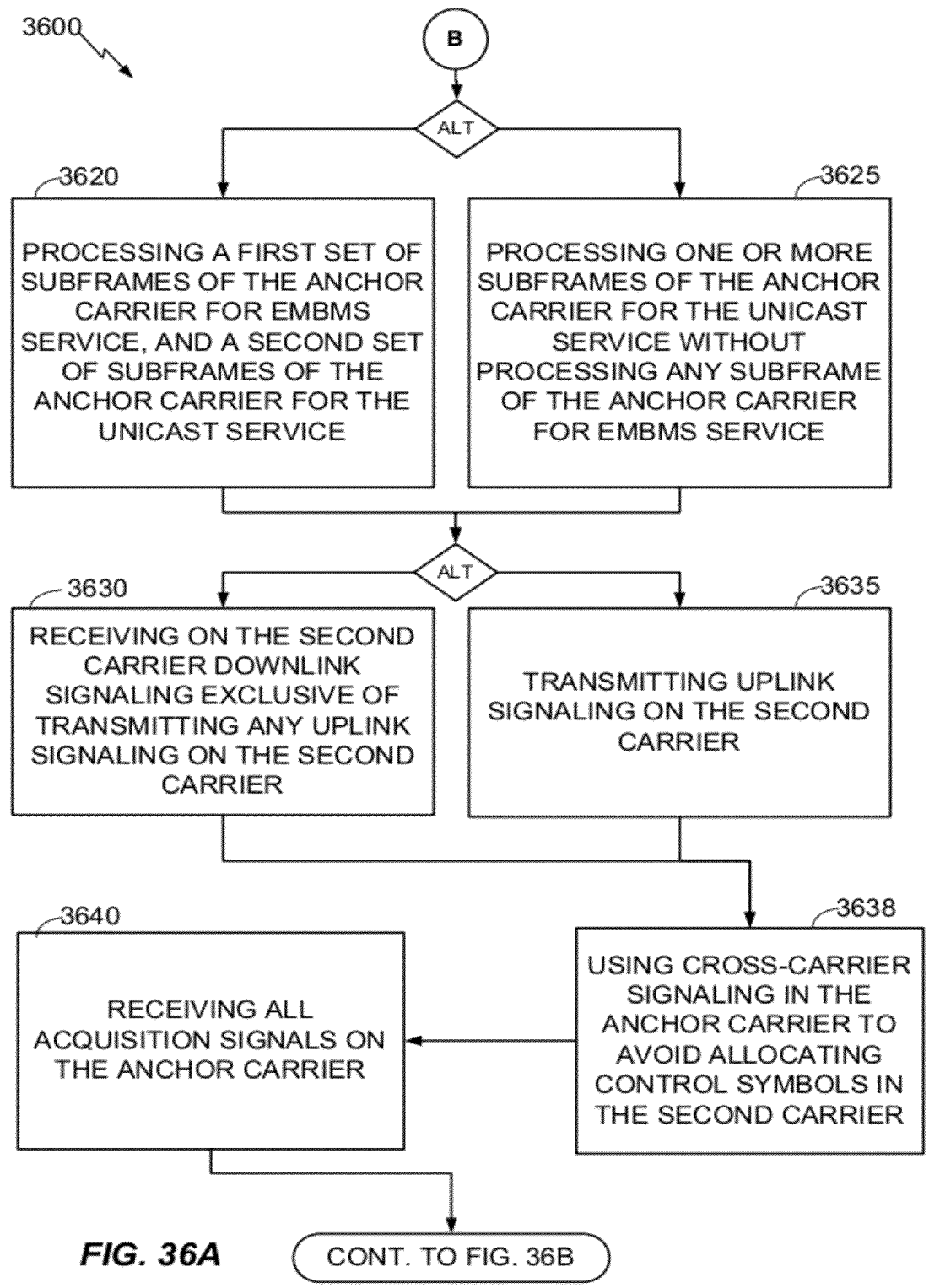
FIGS. 36A-B and 37 show further aspects of the methodology of FIG. 34.
Figure 36B:
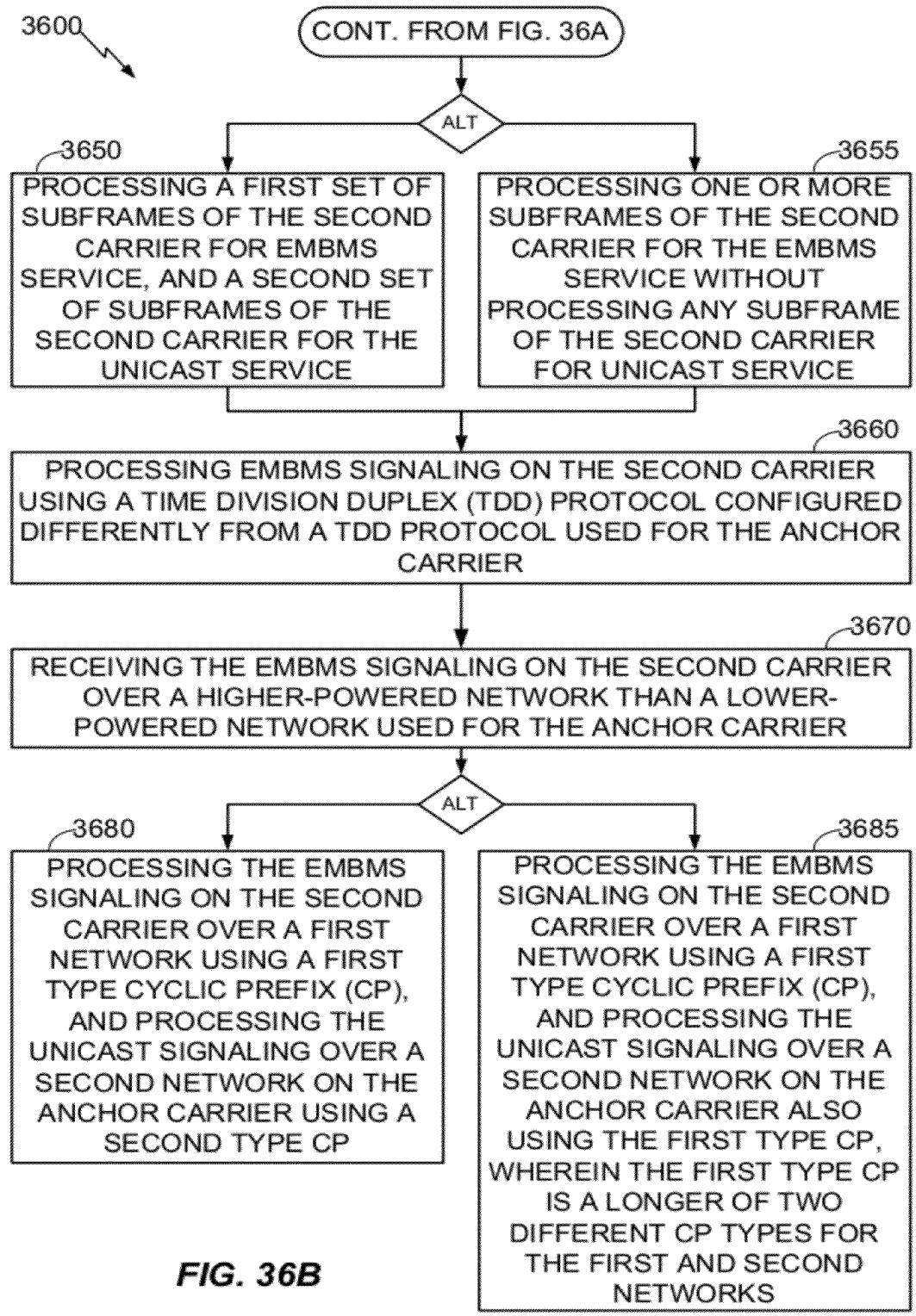

Correspondingly, FIGS. 36A and 36B show further optional operations or aspects 3600 that may be performed by the mobile entity in conjunction with the method 3400 for using eMBMS at least one mobile entity of a wireless communications system. The blocks shown in FIGS. 36A and 36B are not required to perform the method 3400. Unless positioned directly on opposing branches off of an "in the alternative" diamond, blocks can be independently performed and are not mutually exclusive. Therefore any one of such blocks may be performed regardless of whether another downstream or upstream block is performed. If the method 13300 includes at least one block of FIGS. 36A and 36B, then the method 3400 may terminate after the at least one block, without necessarily having to include any subsequent downstream block(s) that may be illustrated. Conversely, blocks that are positioned directly on opposing branches off of an "in the alternative" diamond are expected to be mutually exclusive alternatives in any particular instance of the method.

The method 3400 may further include, at 3620, the mobile entity processing a first set of subframes of the anchor carrier for eMBMS service, and a second set of subframes of the anchor carrier for the unicast service. The first set of subframes and the second set of subframes should not share any common members. In the alternative to block 3620, the method 3400 may further include, at 3625, the mobile entity processing subframes of the anchor carrier for the unicast service without processing any subframe of the anchor carrier for eMBMS service. These alternatives are configurable by the network entity (e.g., an eNB), which may be delivered to the mobile entity, for example, via a PCCH broadcast in system information block 13.

The method 3400 may further include, at 3630, the mobile entity receiving on the second carrier downlink service exclusive of receiving any uplink service on the second carrier. In the alternative to block 3630, the method 3400 may further include, at 3635, the mobile entity transmitting uplink signaling on the second carrier. In case of transmitting uplink service 3635, the method 3400 may further include, at 3638, using cross-carrier service in the anchor carrier to avoid processing control symbols in the second carrier. In addition, the method 3400 may further include, at 3640, the mobile entity receiving all acquisition signals on the anchor carrier.

Referring to FIG. 36B, the method 3400 may further include, at 3650, the mobile entity processing a first set of subframes of the second carrier for eMBMS service, and a second set of subframes of the second carrier for the unicast service. The first set of subframes and the second set of subframes should not share any common members. In the alternative to block 3650, the method 3400 may further include, at 3655, the mobile entity processing subframes of the second carrier for the eMBMS service without processing any subframe of the second carrier for unicast service. The method 3400 may further include, at 3660, the mobile entity processing eMBMS service on the second carrier using a TDD protocol configured differently from a TDD protocol used for the anchor carrier. This may be done to increase downlink capacity of the second carrier. The method 3400 may further include, at 3670, the mobile entity receiving the eMBMS service on the second carrier over a higher-powered network than a lower-powered network used for the anchor carrier.

The method 3400 may further include, at 3680, the mobile entity processing the eMBMS signaling received on the second carrier over a first network using a first type cyclic prefix (CP), and processing the unicast signaling received over a second network on the anchor carrier using a second type CP, different from the first type CP. In the alternative to block 3680, the method 3400 may further include, at 3685, the mobile entity processing the eMBMS signaling received on the second carrier over a first network using a first type cyclic prefix (CP), and processing the unicast signaling received over a second network on the anchor carrier also using the first type CP, wherein the first type CP is selected as the longer CP of two different CP types for the first and second networks.

Figure 37:
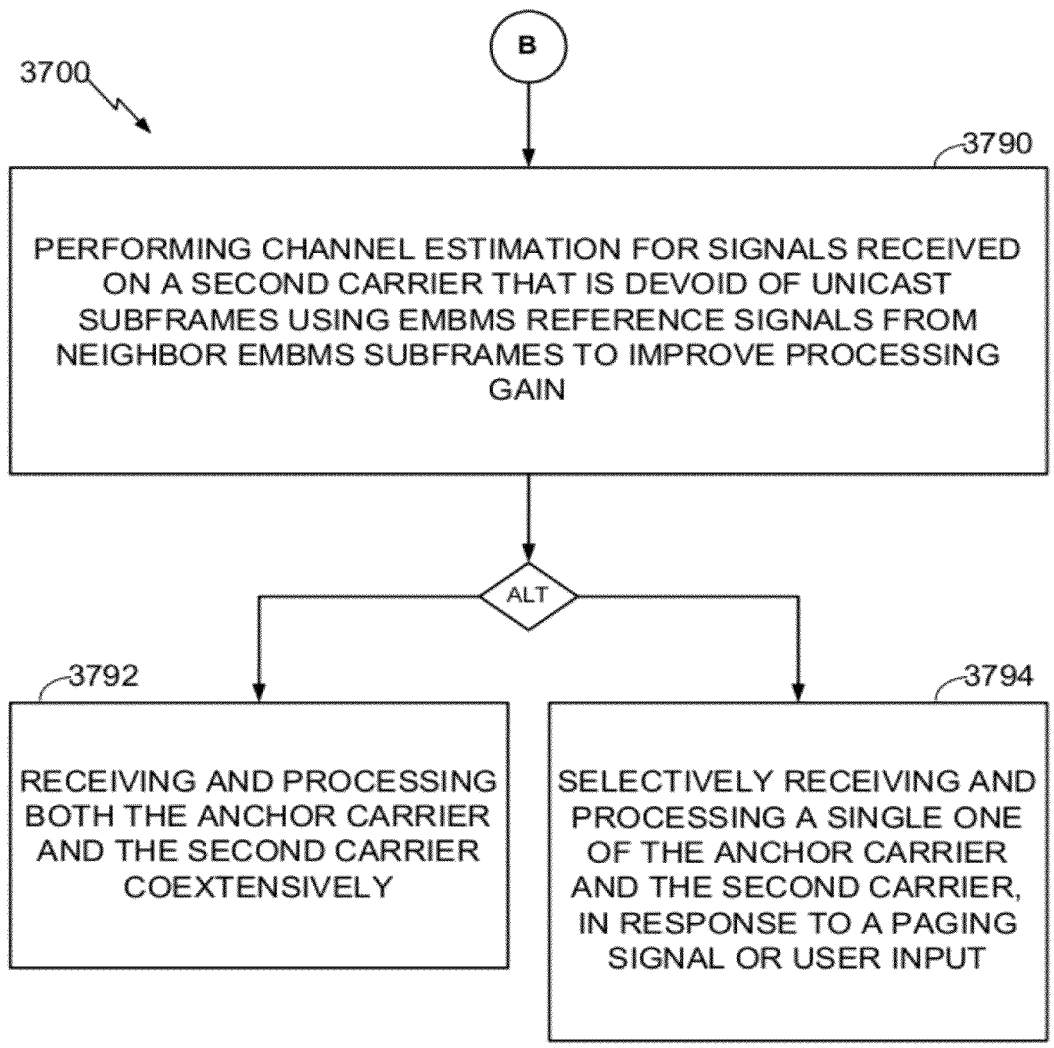

Referring to FIG. 37, in an aspect, the method 3400 may further include, at 3790, the mobile entity performing channel estimation for signals received on a second carrier that is devoid of unicast subframes using eMBMS reference signals from neighbor eMBMS subframes to improve processing gain. The method 3400 may further include, at 3792, the mobile entity receiving and processing both the anchor carrier and the second carrier coextensively, e.g., in parallel or concurrently. In the alternative to block 3792, the method 3400 may further include, at 3794, the mobile entity selectively receiving and processing a single one of the anchor carrier and the second carrier, in response to a paging signal or user input.

In general, with reference to FIGS. 35A-B and 36A-B, decision functionality associated with the branching blocks 3518, 35368, 3552, 3578, 3618, 3628, 3648, 3688, or 3698, like other blocks depicted in these figures, may be implemented by software, hardware, a combination thereof or any other suitable means (e.g., device, system, process, or component). Thus, for example, branching decisions may be made during execution by an entity performing other aspects of the described method, may be predetermined by design prior to execution of other blocks, or may be accomplished by some combination of the foregoing over the various branching blocks.

Figure 38:
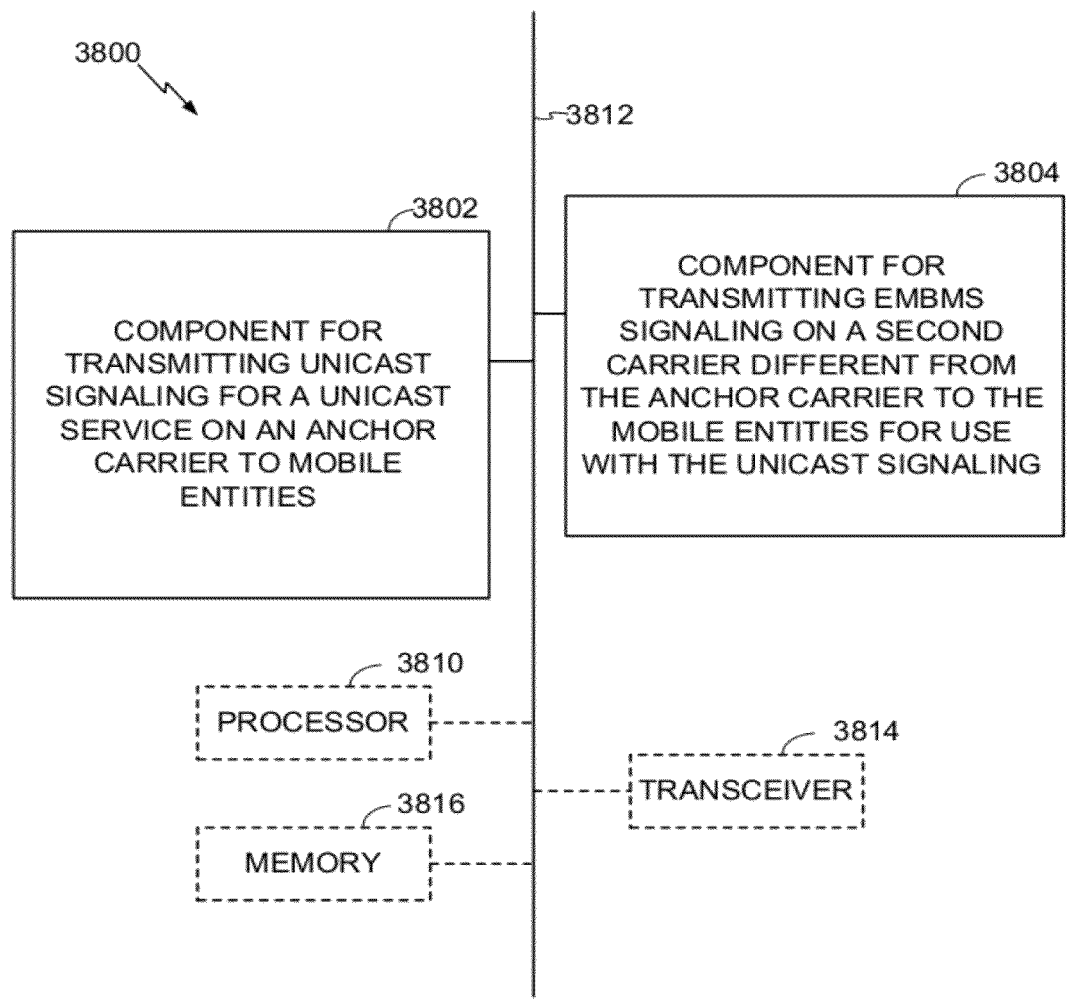
FIG. 38 illustrates an embodiment of an apparatus for eMBMS enhancements using carrier aggregation, in accordance with the methodologies of FIGS. 33 and 35A-B.

With reference to FIG. 38, there is provided an exemplary apparatus 3800 that may be configured as a network entity or Node B in a wireless network, or as a processor or similar device for use within the network entity or node B, for providing eMBMS. The apparatus 3800 may include functional blocks that can represent functions implemented by a processor, software, or combination thereof (e.g., firmware).

As illustrated, in one embodiment, the apparatus 3800 may include an electrical component or module 3802 for transmitting unicast signaling for a unicast service on an anchor carrier to mobile entities. For example, the electrical component 3802 may include at least one control processor coupled to a transceiver or the like and to a memory with instructions for transmitting the unicast signaling on an anchor carrier. The electrical component 3802 may be, or may include, a means for transmitting unicast signaling for a unicast service on an anchor carrier to mobile entities. Said means may include the control processor executing an algorithm. The algorithm may include, for example, modulating information according to a unicast protocol, and transmitting the modulated information on the anchor carrier.

The apparatus 3800 may include an electrical component 3804 for transmitting eMBMS signaling on a second carrier different from the anchor carrier to the mobile entities for use with the unicast signaling. For example, the electrical component 3804 may include at least one control processor coupled to a transceiver or the like and to a memory holding instructions for transmitting the eMBMS signaling on a second carrier. The electrical component 3804 may be, or may include, a means for transmitting eMBMS signaling on a second carrier different from the anchor carrier to the mobile entities for use with the unicast signaling. Said means may include the control processor executing an algorithm. The algorithm may include, for example, preparing second information for transmitting via a second transmit chain on the second carrier. The algorithm may further include, for example, one or more of the more detailed operations disclosed in connection with FIG. 35A or 35B. The apparatus 3800 may include similar electrical components for performing any or all of the additional operations 3500 described in connection with FIGS. 35A and 35B, which for illustrative simplicity are not shown in FIG. 38.

In related aspects, the apparatus 3800 may optionally include a processor component 3810 having at least one processor, in the case of the apparatus 3800 configured as a network entity. The processor 3810, in such case, may be in operative communication with the components 3802-3804 or similar components via a bus 3812 or similar communication coupling. The processor 3810 may effect initiation and scheduling of the processes or functions performed by electrical components 3802-3804.

In further related aspects, the apparatus 3800 may include a radio transceiver component 3814. A stand alone receiver and/or stand alone transmitter may be used in lieu of or in conjunction with the transceiver 3814. The apparatus 3800 may optionally include a component for storing information, such as, for example, a memory device/component 3816. The computer readable medium or the memory component 3816 may be operatively coupled to the other components of the apparatus 3800 via the bus 3812 or the like. The memory component 3816 may be adapted to store computer readable instructions and data for performing the activity of the components 3802-3804, and subcomponents thereof, or the processor 3810, the additional aspects 3500, or the methods disclosed herein. The memory component 3816 may retain instructions for executing functions associated with the components 3802-3804. While shown as being external to the memory 3816, it is to be understood that the components 3802-3804 can exist within the memory 3816.

Figure 39:
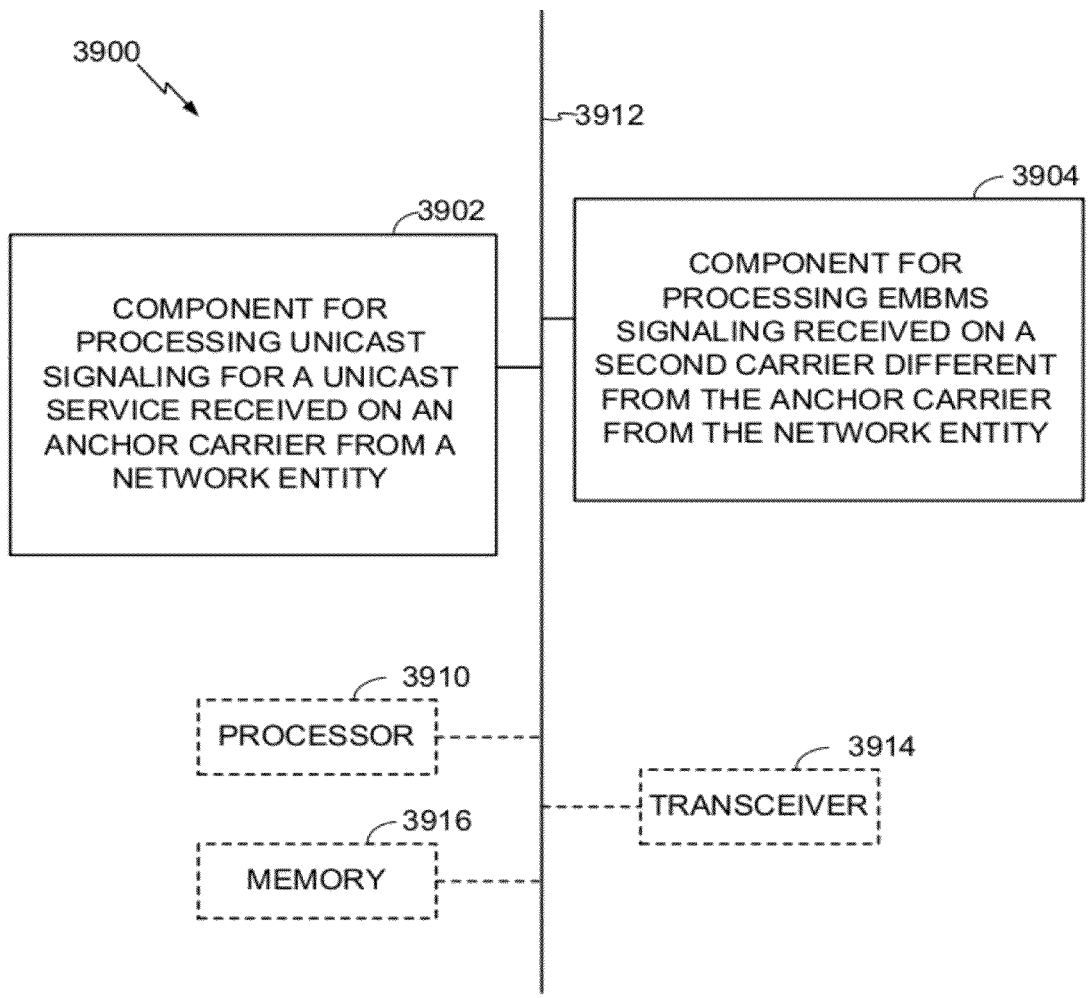
FIG. 39 illustrates an embodiment of an apparatus for eMBMS enhancements using carrier aggregation, in accordance with the methodologies of FIGS. 34 and 36A-C.

With reference to FIG. 39, there is provided an exemplary apparatus 3900 that may be configured as a mobile entity or UE in a wireless network, or as a processor or similar device for use within the ME or UE, for accessing an eMBMS over multiple carriers. The apparatus 3900 may include functional blocks that can represent functions implemented by a processor, software, or combination thereof (e.g., firmware).

In one embodiment, the apparatus 3900 may include an electrical component or module 3902 for processing unicast signaling for a unicast service received on an anchor carrier from a network entity. For example, the electrical component 3902 may include at least one control processor coupled to a transceiver or the like and to a memory with instructions for receiving and processing unicast signaling over an anchor one of multiple carriers. The electrical component 3902 may be, or may include, a means for receiving and processing unicast signaling over an anchor one of multiple carriers. Said means may include the control processor executing an algorithm. The algorithm may include, for example, receiving modulated information on an anchor carrier, and demodulating the information according to a unicast protocol.

The apparatus 3900 may include an electrical component 3904 for processing eMBMS signaling received from the network entity on a second carrier different from the anchor carrier. For example, the electrical component 3904 may include at least one control processor coupled to a transceiver or the like and to a memory holding instructions for receiving and processing eMBMS signaling over a second one of multiple carriers. The electrical component 3904 may be, or may include, a means for processing eMBMS signaling received from the network entity on a second carrier different from the anchor carrier. Said means may include the control processor executing an algorithm. The algorithm may include, for example, receiving modulated information on a second carrier other than the anchor carrier, and demodulating the information according to an eMBMS protocol. The algorithm may further include, for example, one or more of the more detailed operations disclosed in connection with FIG. 36A-36B or 37. The apparatus 3900 may include similar electrical components for performing any or all of the additional operations 3600 described in connection with FIGS. 36A, 36B and 37, which for illustrative simplicity are not shown in FIG. 39.

In related aspects, the apparatus 3900 may optionally include a processor component 3910 having at least one processor, in the case of the apparatus 3900 configured as a mobile entity. The processor 3910, in such case, may be in operative communication with the components 3902-3904 or similar components via a bus 3912 or similar communication coupling. The processor 3910 may effect initiation and scheduling of the processes or functions performed by electrical components 3902-3904.

In further related aspects, the apparatus 3900 may include a radio transceiver component 3939. A stand alone receiver and/or stand alone transmitter may be used in lieu of or in conjunction with the transceiver 3914. The apparatus 3900 may optionally include a component for storing information, such as, for example, a memory device/component 3916. The computer readable medium or the memory component 3916 may be operatively coupled to the other components of the apparatus 3900 via the bus 3912 or the like. The memory component 3916 may be adapted to store computer readable instructions and data for performing the activity of the components 3902-3904, and subcomponents thereof, or the processor 3910, or the additional aspects 3600, or the methods disclosed herein. The memory component 3916 may retain instructions for executing functions associated with the components 3902-3904. While shown as being external to the memory 3916, it is to be understood that the components 3902-3904 can exist within the memory 3916.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Non-transitory computer-readable media includes both computer storage media and temporary memory media, whether or not used to facilitate transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks refer to media holding data that is magnetically encoded, while discs refer to media holding data that is optically encoded. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein and should be accorded the widest scope consistent with the principles and novel features disclosed herein.

What is claimed is:

1. A method for transmitting evolved Multimedia Broadcast/Multicast Service (eMBMS) using multiple carriers of a wireless communications system, the method comprising:
    transmitting, from a base station on a secondary carrier, Multimedia Broadcast/Multicast Service (MBMS) on a Single Frequency Network (MBSFN) signal;
    transmitting, from the base station on a primary carrier, information used for acquiring a Multicast Control Channel (MCCH) of the MBMS;
    transmitting, from the base station on the primary carrier, at least unicast signaling; and
    conveying the information for acquiring the MCCH using dedicated signaling on the primary carrier for one or more backwardly-compatible carriers carrying eMBMS signals, while conveying the information for acquiring an MCCH using common signaling on the primary carrier for one or more non-backwardly compatible carriers carrying eMBMS signaling.

2. The method of claim 1, further comprising conveying the information for acquiring the MCCH using a System Information Block (SIB) of the primary carrier.

3. The method of claim 1, further comprising conveying at least a portion of the information for acquiring the MCCH using one or more System Information Blocks (SIBs) of the primary carrier.

4. The method of claim 3, further comprising conveying at least a portion of the information for acquiring the MCCH using a SIB13 of the primary carrier.

5. The method of claim 1, further comprising transmitting MBSFN signaling on the second carrier using a time division duplex (TDD) protocol configured differently from a TDD protocol used for the primary carrier.

6. An apparatus for transmitting evolved Multimedia Broadcast/Multicast Service (eMBMS) using multiple carriers of a wireless communications system, the apparatus comprising:
    means for transmitting, from a base station on a secondary carrier, Multimedia Broadcast/Multicast Service (MBMS) on a Single Frequency Network (MBSFN) signal;
    means for transmitting, from the base station on a primary carrier, information used for acquiring a Multicast Control Channel (MCCH) of the MBMS;
    means for transmitting, from the base station on the primary carrier, at least unicast signaling; and
    means for conveying the information for acquiring the MCCH using dedicated signaling on the primary carrier for one or more backwardly-compatible carriers carrying eMBMS signals, while conveying the information for acquiring an MCCH using common signaling on the primary carrier for one or more non-backwardly compatible carriers carrying eMBMS signaling.

7. The apparatus of claim 6, further comprising means for transmitting MBSFN signaling on the second carrier using a time division duplex (TDD) protocol configured differently from a TDD protocol used for the primary carrier.

8. An apparatus for transmitting evolved Multimedia Broadcast/Multicast Service (eMBMS) using multiple carriers of a wireless communications system, transmitting MBSFN signals from a base station on a secondary carrier, comprising:
    at least one processor configured for transmitting, from a base station on a secondary carrier, Multimedia Broadcast/Multicast Service (MBMS) on a Single Frequency Network (MBSFN) signal, transmitting, from the base station on a primary carrier, information used for acquiring a Multicast Control Channel (MCCH) of the MBMS, transmitting, from the base station on the primary carrier, at least unicast signaling, and conveying the information for acquiring the MCCH using dedicated signaling on the primary carrier for one or more backwardly-compatible carriers carrying eMBMS signals, while conveying the information for acquiring an MCCH using common signaling on the primary carrier for one or more non-backwardly compatible carriers carrying eMBMS signaling; and
    a memory coupled to the at least one processor for storing data.

9. The apparatus of claim 8, wherein the processor is further configured for conveying the information for acquiring the MCCH using a System Information Block (SIB) of the primary carrier.

10. The apparatus of claim 8, wherein the processor is further configured for conveying at least a portion of the information for acquiring the MCCH using one or more System Information Blocks (SIBs) of the primary carrier.

11. The apparatus of claim 10, wherein the processor is further configured for conveying at least a portion of the information for acquiring the MCCH using a SIB13 of the primary carrier.

12. The apparatus of claim 8, wherein the processor is further configured for transmitting MBSFN signaling on the second carrier using a time division duplex (TDD) protocol configured differently from a TDD protocol used for the primary carrier.

13. A non-transitory computer-readable medium for transmitting evolved Multimedia Broadcast/Multicast Service (eMBMS) using multiple carriers of a wireless communications system, comprising code for:

transmitting, from a base station on a secondary carrier, Multimedia Broadcast/Multicast Service (MBMS) on a Single Frequency Network (MBSFN) signal, transmitting, from the base station on a primary carrier, information used for acquiring a Multicast Control Channel (MCCH) of the MBMS, transmitting, from the base station on the primary carrier, at least unicast signaling, and conveying the information for acquiring the MCCH using dedicated signaling on the primary carrier for one or more backwardly-compatible carriers carrying eMBMS signals, while conveying the information for acquiring an MCCH using common signaling on the primary carrier for one or more non-backwardly compatible carriers carrying eMBMS signaling.

14. A method for receiving evolved Multimedia Broadcast/Multicast Service (eMBMS) using multiple carriers of a wireless communications system, the method comprising:

receiving, at a mobile entity on a secondary carrier, Multimedia Broadcast/Multicast Service (MBMS) on a Single Frequency Network (MBSFN) signal; and receiving, at the mobile entity on a primary carrier, at least a portion of information for acquiring a Multicast Control Channel (MCCH) of the MBMS in one or more System Information Blocks (SIBs) of the primary carrier, wherein the primary carrier also includes at least unicast signaling.

15. The method of claim 14, further comprising receiving the information for acquiring the MCCH in a System Information Block 13 (SIB13) of the primary carrier.

16. The method of claim 14, further comprising receiving at least a portion of the information for acquiring the MCCH in a SIB13 of the primary carrier.

17. The method of claim 14, further comprising processing MBSFN signaling on the second carrier using a time division duplex (TDD) protocol configured differently from a TDD protocol used for the primary carrier.

18. An apparatus for receiving evolved Multimedia Broadcast/Multicast Service (eMBMS) services using multiple carriers of a wireless communications system, the apparatus comprising:

means for receiving, at a mobile entity on a secondary carrier, Multimedia Broadcast/Multicast Service (MBMS) on a Single Frequency Network (MBSFN) signal; and means for receiving, at the mobile entity on a primary carrier, at least a portion of information for acquiring a Multicast Control Channel (MCCH) of the MBMS in one or more System Information Blocks (SIBs) of the primary carrier, wherein the primary carrier also includes at least unicast signaling.

19. The apparatus of claim 18, further comprising processing MBSFN signaling on the second carrier using a time division duplex (TDD) protocol configured differently from a TDD protocol used for the primary carrier.

20. An apparatus for receiving evolved Multimedia Broadcast/Multicast Service (eMBMS) using multiple carriers of a wireless communications system, comprising:

at least one processor configured for receiving, at a mobile entity on a secondary carrier, Multimedia Broadcast/Multicast Service (MBMS) on a Single Frequency Network (MBSFN) signal, and receiving, at the mobile entity on a primary carrier, at least a portion of information for acquiring a Multicast Control Channel (MCCH) of the MBMS in one or more System Information Blocks (SIBs) of the primary carrier, wherein the primary carrier also includes at least unicast signaling; and a memory coupled to the at least one processor for storing data.

21. The apparatus of claim 20, wherein the processor is further configured for receiving the information for acquiring the MCCH in a System Information Block 13 (SIB13) of the primary carrier.

22. The apparatus of claim 20, wherein the processor is further configured for receiving at least a portion of the information for acquiring the MCCH in a SIB13 of the primary carrier.

23. The apparatus of claim 20, wherein the processor is further configured for processing MBSFN signaling on the second carrier using a time division duplex (TDD) protocol configured differently from a TDD protocol used for the primary carrier.

24. A non-transitory computer-readable medium for receiving evolved Multimedia Broadcast/Multicast Service (eMBMS) using multiple carriers of a wireless communications system, comprising code for:

receiving, at a mobile entity on a secondary carrier, Multimedia Broadcast/Multicast Service (MBMS) on a Single Frequency Network (MBSFN) signal, and receiving, at the mobile entity on a primary carrier, at least a portion of information for acquiring a Multicast Control Channel (MCCH) of the MBMS in one or more System Information Blocks (SIBs) of the primary carrier, wherein the primary carrier also includes at least unicast signaling.

25. A method for allocating subframes used for Multimedia Broadcast/Multicast Service (MBMS) on a Single Frequency Network (MBSFN) of a wireless communications system, the method comprising:

allocating at least a portion of one or more subframes otherwise reserved for unicast subframes on a mixed carrier to provide an increased allocation of subframes carrying MBSFN information, the at least the portion of the one or more subframes being allocated to accommodate a period of use of the mixed carrier for MBSFN; and transmitting MBSFN signals on the increased allocation of subframes.

26. The method of claim 25, further comprising allocating subframe 5 in odd radio frames for MBSFN information.

27. The method of claim 25, further comprising scheduling System Information Blocks (SIBs) and paging in at least one of subframe 5 in even radio frames and subframe 0.

28. The method of claim 25, further comprising allocating subframes according to a Frequency-Division Duplexing (FDD) protocol.

29. The method of claim 28, further comprising allocating at least one of subframes 4 and 9 for MBSFN information.

30. The method of claim 25, further comprising allocating subframes according to a Time-Division Duplexing (TDD) protocol.

31. The method of claim 30, further comprising allocating at least one of subframes 1 and 6 for MBSFN information.

32. The method of claim 25, further comprising reallocating the at least a portion of one or more subframes otherwise reserved for unicast signaling, in response to an expiration of the period of use of the mixed carrier for MBSFN.

33. An apparatus for allocating subframes used for Multimedia Broadcast/Multicast Service (MBMS) on a Single Frequency Network (MBSFN) of a wireless communications system, the apparatus comprising:
 means for allocating at least a portion of one or more subframes otherwise reserved for unicast signaling on a mixed carrier to provide an increased allocation of subframes carrying MBSFN information, the at least the portion of the one or more subframes being allocated to accommodate a period of use of the mixed carrier for MBSFN; and
 means for transmitting MBSFN signals on the increased allocation of subframes.

34. An apparatus for allocating subframes used for Multimedia Broadcast/Multicast Service (MBMS) on a Single Frequency Network (MBSFN) of a wireless communications system, comprising:
 at least one processor configured for allocating at least a portion of one or more subframes otherwise reserved for unicast signals on a mixed carrier to provide an increased allocation of subframes carrying MBSFN information, the at least the portion of the one or more subframes being allocated to accommodate a period of use of the mixed carrier for MBSFN, transmitting MBSFN signals on the increased allocation of subframes; and
 a memory coupled to the at least one processor for storing data.

35. The apparatus of claim 34, wherein the processor is further configured for allocating subframe 5 in odd radio frames for MBSFN information.

36. The apparatus of claim 34, wherein the processor is further configured for scheduling System Information Blocks (SIBs) and paging in at least one of subframe 5 in even radio frames and subframe 0.

37. The apparatus of claim 34, wherein the processor is further configured for allocating subframes according to a Frequency-Division Duplexing (FDD) protocol.

38. The apparatus of claim 37, wherein the processor is further configured for allocating at least one of subframes 4 and 9 for MBSFN information.

39. The apparatus of claim 34, wherein the processor is further configured for allocating subframes according to a Time-Division Duplexing (TDD) protocol.

40. The apparatus of claim 39, wherein the processor is further configured for allocating at least one of subframes 1 and 6 for MBSFN information.

41. The apparatus of claim 34, wherein the processor is further configured for reallocating the at least a portion of one or more subframes otherwise reserved for unicast signaling, in response to an expiration of the period of use of the mixed carrier for MBSFN.

42. A non-transitory computer-readable medium for allocating subframes used for Multimedia Broadcast/Multicast Service (MBMS) on a Single Frequency Network (MBSFN) of a wireless communications system, comprising code for:
 allocating at least a portion of one or more subframes otherwise reserved for unicast signals on a mixed carrier to provide an increased allocation of subframes carrying MBSFN information, information, the at least the portion of the one or more subframes being allocated to accommodate a period of use of the mixed carrier for MBSFN, and transmitting MBSFN signals on the increased allocation of subframes.

43. A method for interpreting subframes used for Multimedia Broadcast/Multicast Service (MBMS) on a Single Frequency Network (MBSFN) of a wireless communications system, the method comprising:
 determining that an MBSFN signal includes an increased allocation of subframes carrying MBSFN information, wherein one or more subframes previously reserved for unicast signals is allocated instead to multicast signals; and
 decoding the subframes included in the MBSFN signal according to the increased allocation to provide a multicast content output and to obtain the increased allocation of subframes to accommodate a period of use of a mixed carrier for MBSFN.

44. The method of claim 43, further comprising decoding subframe 5 in odd radio frames for MBSFN information.

45. The method of claim 43, further comprising decoding System Information Blocks (SIBs) and paging in at least one of subframe 5 in even radio frames and subframe 0.

46. The method of claim 43, further comprising decoding subframes according to a Frequency-Division Duplexing (FDD) protocol.

47. The method of claim 46, further comprising decoding at least one of subframes 4 and 9 for MBSFN information.

48. The method of claim 43, further comprising decoding subframes according to a Time-Division Duplexing (TDD) protocol.

49. The method of claim 48, further comprising decoding at least one of subframes 1 and 6 for MBSFN information.

50. The method of claim 49, further comprising decoding the first four symbols of subframes 1 and 6 for non-MBSFN information.

51. The method of claim 43, further comprising decoding at least a portion of one or more subframes otherwise reserved for unicast signals and allocated to the MBSFN signal for unicast signaling, in response to an expiration of the period of use of the mixed carrier for MBSFN.

52. An apparatus for interpreting subframes used for Multimedia Broadcast/Multicast Service (MBMS) on a Single Frequency Network (MBSFN) of a wireless communications system, the apparatus comprising:
 means for determining that an MBSFN signal includes an increased allocation of subframes carrying MBSFN information, wherein one or more subframes previously reserved for unicast signals is allocated instead to multicast signals; and
 means for decoding the subframes included in the MBSFN signal according to the increased allocation to provide a multicast content output and to obtain the increased allocation of subframes to accommodate a period of use of a mixed carrier for MBSFN.

53. An apparatus for interpreting subframes used for Multimedia Broadcast/Multicast Service (MBMS) on a Single Frequency Network (MBSFN) of a wireless communications system, comprising:
 at least one processor configured for determining that an MBSFN signal includes an increased allocation of subframes carrying MBSFN information, wherein one or more subframes previously reserved for unicast signals is allocated instead to multicast signals, and decoding the MBSFN signal according to the increased allocation to provide a multicast content output and to obtain the increased allocation of subframes to accommodate a period of use of a mixed carrier for MBSFN; and
 a memory coupled to the at least one processor for storing data.

54. The apparatus of claim 53, wherein the processor is further configured for decoding subframe 5 in odd radio frames for MBSFN information.

55. The apparatus of claim 53, wherein the processor is further configured for decoding System Information Blocks (SIBs) and paging in at least one of subframe 5 in even radio frames and subframe 0.

56. The apparatus of claim 53, wherein the processor is further configured for decoding subframes according to a Frequency-Division Duplexing (FDD) protocol.

57. The apparatus of claim 56, wherein the processor is further configured for decoding at least one of subframes 4 and 9 for MBSFN information.

58. The apparatus of claim 53, wherein the processor is further configured for decoding subframes according to a Time-Division Duplexing (TDD) protocol.

59. The apparatus of claim 58, wherein the processor is further configured for decoding at least one of subframes 1 and 6 for MBSFN information.

60. The apparatus of claim 59, wherein the processor is further configured for decoding the first four symbols of subframes 1 and 6 for non-MBSFN information.

61. The apparatus of claim 53, wherein the processor is further configured for decoding at least a portion of one or more subframes otherwise reserved for unicast signals and temporarily allocated to the MBSFN signal for unicast signaling, in response to expiration of the period of use of the mixed carrier for MBSFN.

62. A non-transitory computer-readable medium for interpreting subframes used for Multimedia Broadcast/Multicast Service (MBMS) on a Single Frequency Network (MBSFN) of a wireless communications system, comprising code for:
determining that an MBSFN signal includes an increased allocation of subframes carrying MBSFN information, wherein one or more subframes previously reserved for unicast signals is allocated instead to multicast signals, and decoding the subframes included in the MBSFN signal according to the increased allocation to provide a multicast content output and to obtain the increased allocation of subframes to accommodate a period of use of a mixed carrier for MBSFN.

* * * * *